US012676766B2

(12) United States Patent
Tan et al.

(10) Patent No.: US 12,676,766 B2
(45) Date of Patent: Jul. 7, 2026

(54) COMMUNICATION METHOD AND COMMUNICATION APPARATUS

(71) Applicant: HUAWEI TECHNOLOGIES CO., LTD., Shenzhen (CN)

(72) Inventors: Wei Tan, Shenzhen (CN); Fei Liu, Singapore (SG); Donghui Wang, Beijing (CN); Chenchen Yang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 126 days.

(21) Appl. No.: 18/652,997

(22) Filed: May 2, 2024

(65) Prior Publication Data

US 2024/0283666 A1     Aug. 22, 2024

Related U.S. Application Data

(63) Continuation of application No. PCT/CN2022/127234, filed on Oct. 25, 2022.

(30) Foreign Application Priority Data

Nov. 8, 2021     (CN) .......................... 202111316007.0

(51) Int. Cl.
*H04L 9/00* (2022.01)
*H04L 67/1074* (2022.01)
(Continued)

(52) U.S. Cl.
CPC ............ *H04L 9/50* (2022.05); *H04L 67/1074* (2013.01); *H04L 67/141* (2013.01); *H04L 69/26* (2013.01)

(58) Field of Classification Search
CPC ..... H04L 9/50; H04L 67/1074; H04L 67/141; H04L 69/26; H04L 9/3239; H04L 67/104; (Continued)

(56) References Cited

U.S. PATENT DOCUMENTS

2017/0337534 A1 * 11/2017 Goeringer .............. G06Q 20/06
2020/0120157 A1     4/2020 Xie et al.

FOREIGN PATENT DOCUMENTS

CN          108667717 A     10/2018
CN          112968969 A     6/2021

OTHER PUBLICATIONS

Extended European Search Report issued in corresponding European Application No. 22889147.9, dated Jan. 22, 2025, pp. 1-7.
(Continued)

*Primary Examiner* — Brian Whipple
(74) *Attorney, Agent, or Firm* — HAUPTMAN HAM, LLP

(57) ABSTRACT

A communication method applied to a first communication apparatus includes sending a first message to a second communication apparatus. The first message is for requesting to set up data consensus protocol (DCP) initial access. The first message includes an identifier of the first communication apparatus and a blockchain identifier. The method also includes a second message from the second communication apparatus. The second message indicates a consensus mode set for blockchain communication. The method further includes sending a third message to the second communication apparatus. The third message indicates first consensus mode information in the consensus mode set. The method additionally includes receiving a fourth message from the second communication apparatus. The fourth message indicates that the DCP initial access succeeds or fails.

20 Claims, 15 Drawing Sheets

(51) Int. Cl.
H04L 67/141          (2022.01)
H04L 69/00          (2022.01)
(58) Field of Classification Search
CPC ..... H04W 48/16; H04W 76/11; H04W 76/30;
H04W 76/10
See application file for complete search history.

(56)                    References Cited

OTHER PUBLICATIONS

3GPP TS 23.501 V17.2.0, 3rd Generation Partnership Project; Technical Specification Group Services and System Aspects; System architecture for the 5G System (5GS); Stage 2 (Release 17), Sep. 2021, total 534 pages.
3GPP TS 23.502 V17.2.1 3rd Generation Partnership Project; Technical Specification Group Services and System Aspects; Procedures for the 5G System (5GS); Stage 2 (Release 17), Sep. 2021, total 705 pages.
3GPP TS 38.300 V16.7.0 3rd Generation Partnership Project; Technical Specification Group Radio Access Network; NR; NR and NG-RAN Overall Description; Stage 2 (Release 16), Sep. 2021, total 147 pages.

* cited by examiner

COMMUNICATION METHOD AND COMMUNICATION APPARATUS

CROSS-REFERENCE TO RELATED APPLICATIONS

This application is a continuation of International Application No. PCT/CN2022/127234, filed on Oct. 25, 2022, which claims priority to Chinese Patent Application No. 202111316007.0, filed on Nov. 8, 2021. The disclosures of the aforementioned applications are hereby incorporated by reference in their entireties.

TECHNICAL FIELD

This application relates to the field of wireless technologies, and in particular, to a communication method and a communication apparatus.

BACKGROUND

With development of communication technologies, a communication network may consist of space, air, ground, and sea in terms of space, and may consist of a plurality of players in terms of role composition. An actual network carrier may consist of a part or all of a satellite network, a low and medium altitude platform such as an uncrewed aerial vehicle, a cellular network, an internet of vehicles, an internet of things (IoT) network, an overwater network, an underwater network, and the like.

Currently, a unique consensus and smart contract mechanism of a blockchain brings a new opportunity for multiparty trust in dispersed networks, and the blockchain becomes one of potential candidate technologies for the communication network.

However, how to implement communication based on the blockchain is an urgent technical problem to be resolved.

SUMMARY

This application provides a communication method and apparatus, to implement a blockchain-based communication process.

A first aspect of this application provides a communication method. The method is performed by a first communication apparatus, the method is performed by a part of components (for example, a processor, a chip, or a chip system) in the first communication apparatus, or the method may be implemented by a logic module or software that can implement all or a part of functions of the first communication apparatus. In the first aspect and possible implementations thereof, an example in which the communication method is performed by the first communication apparatus is used for description. In the method, the first communication apparatus sends a first message to a second communication apparatus, where the first message is for requesting to set up data consensus protocol (DCP) initial access, and the first message includes an identifier of the first communication apparatus and a blockchain identifier. The first communication apparatus receives a second message from the second communication apparatus, where the second message indicates a consensus mode set for blockchain communication. The first communication apparatus sends a third message to the second communication apparatus, where the third message indicates first consensus mode information in the consensus mode set. The first communication apparatus receives a fourth message from the second communication apparatus, where the fourth message indicates that the DCP initial access succeeds or fails.

Based on the foregoing technical solution, different communication apparatuses may exchange messages based on a DCP communication protocol to complete a DCP initial access process, where the DCP communication protocol is a protocol for blockchain communication, so that a process of blockchain-based communication between the different communication apparatuses can be implemented without a need to take a longer path via an application server or an external blockchain, and a communication path can be shortened, thereby improving communication efficiency.

Optionally, the third message indicates the first consensus mode selected by the first communication apparatus from the consensus mode set, the third message indicates the first consensus mode information expected by the first communication apparatus, or the third message indicates the first consensus mode information supported by the first communication apparatus.

Optionally, the third message includes the identifier of the first communication apparatus, the blockchain identifier, and an identifier of the first consensus mode information in the consensus mode set.

In a possible implementation of the first aspect, the fourth message indicates that the DCP initial access succeeds; and after the first communication apparatus receives the fourth message from the second communication apparatus, the method further includes: The first communication apparatus sends a fifth message to the second communication apparatus, where the fifth message is for requesting to set up a DCP connection, and the fifth message includes the identifier of the first communication apparatus, the blockchain identifier, and an identifier of the first consensus mode information. The first communication apparatus receives a sixth message from the second communication apparatus, where the sixth message indicates a DCP connection setup response. The first communication apparatus sends a seventh message to the second communication apparatus, where the seventh message indicates that the setup of the DCP connection is completed.

Based on the foregoing technical solution, when the fourth message indicates that the DCP initial access succeeds, the first communication apparatus may further interact with the second communication apparatus, so that a process of setting up a DCP connection between the different communication apparatuses is implemented when the second communication apparatus configures a consensus mode based on the fifth message.

In a possible implementation of the first aspect, after the first communication apparatus sends the seventh message to the second communication apparatus, the method further includes: The first communication apparatus sends an eighth message to the second communication apparatus, where the eighth message is for requesting to release the DCP connection, and the eighth message includes the identifier of the first communication apparatus and the blockchain identifier. The first communication apparatus receives a ninth message from the second communication apparatus, where the ninth message indicates a DCP connection release response. The first communication apparatus sends a tenth message to the second communication apparatus, where the tenth message indicates that the release of the DCP connection is completed.

Based on the foregoing technical solution, after the first communication apparatus sends the seventh message to the second communication apparatus (that is, the DCP connection is set up between the first communication apparatus and the second communication apparatus), when the first communication apparatus expects (for reducing energy consumption, or when the communication based on the DCP connection is no longer required, or the like) to release the DCP connection, the first communication apparatus may interact with the second communication apparatus, to implement a DCP connection release process initiated by the first communication apparatus.

In a possible implementation of the first aspect, after the first communication apparatus sends the seventh message to the second communication apparatus, the method further includes: The first communication apparatus receives an eleventh message from the second communication apparatus, where the eleventh message is for requesting to release the DCP connection, and the eleventh message includes an identifier of the second communication apparatus and the blockchain identifier. The first communication apparatus sends a twelfth message to the second communication apparatus, where the twelfth message indicates that the release of the DCP connection is completed.

Based on the foregoing technical solution, after the first communication apparatus sends the seventh message to the second communication apparatus (that is, the DCP connection is set up between the first communication apparatus and the second communication apparatus), when the second communication apparatus expects (when determining that permission information of the first communication apparatus is changed, or communication based on DCP connections is no longer required, or the like) to release the DCP connection, the first communication apparatus may interact with the second communication apparatus, to implement a DCP connection release process initiated by the second communication apparatus.

In a possible implementation of the first aspect, the fourth message indicates that the DCP initial access succeeds; and after the first communication apparatus receives the fourth message from the second communication apparatus, the method further includes: The first communication apparatus sends a thirteenth message to the second communication apparatus, where the thirteenth message is for requesting to set up a DCP connection, and the thirteenth message includes the identifier of the first communication apparatus, the blockchain identifier, and an identifier of the first consensus mode information. The first communication apparatus receives a fourteenth message from the second communication apparatus, where the fourteenth message indicates that the setup of the DCP connection fails.

Based on the foregoing technical solution, when the fourth message indicates that the DCP initial access succeeds, the first communication apparatus may further interact with the second communication apparatus, to implement a process in which the second communication apparatus rejects the setup of the DCP connection to the first communication apparatus.

Optionally, a reason why the second communication apparatus rejects the setup of the DCP connection may be that the first communication apparatus is an unauthorized user, that a resource is inadequate, or the like.

In a possible implementation of the first aspect, the fourth message indicates that the DCP initial access succeeds; and after the first communication apparatus receives the fourth message from the second communication apparatus, the method further includes: The first communication apparatus sends a fifteenth message to the second communication apparatus, where the fifteenth message is for requesting consensus data transmission, and the fifteenth message includes the identifier of the first communication apparatus and the blockchain identifier. The first communication apparatus receives a sixteenth message from the second communication apparatus, where the sixteenth message indicates a consensus data transmission response. The first communication apparatus sends first consensus data to the second communication apparatus.

Based on the foregoing technical solution, after the first communication apparatus receives the fourth message from the second communication apparatus, and when the fourth message indicates that the DCP initial access succeeds, the first communication apparatus may interact with the second communication apparatus, to implement a blockchain consensus data transmission process initiated by the first communication apparatus.

In a possible implementation of the first aspect, the fourth message indicates that the DCP initial access succeeds; and after the first communication apparatus receives the fourth message from the second communication apparatus, the method further includes: The first communication apparatus receives a seventeenth message from the second communication apparatus, where the seventeenth message is for requesting consensus data transmission, and the seventeenth message includes the identifier of the second communication apparatus and the blockchain identifier. The first communication apparatus sends an eighteenth message to the second communication apparatus, where the eighteenth message indicates a consensus data transmission response. The first communication apparatus receives second consensus data from the second communication apparatus.

Based on the foregoing technical solution, after the first communication apparatus receives the fourth message from the second communication apparatus, and when the fourth message indicates that the DCP initial access succeeds, the first communication apparatus may interact with the second communication apparatus, to implement a blockchain consensus data transmission process initiated by the second communication apparatus.

A second aspect of this application provides a communication method. The method is performed by a second communication apparatus, the method is performed by a part of components (for example, a processor, a chip, or a chip system) in the second communication apparatus, or the method may be implemented by a logic module or software that can implement all or a part of functions of the second communication apparatus. In the second aspect and possible implementations thereof, an example in which the communication method is performed by the second communication apparatus is used for description. In the method, the second communication apparatus receives a first message from a first communication apparatus, where the first message is for requesting to set up data consensus protocol DCP initial access, and the first message includes an identifier of the first communication apparatus and a blockchain identifier. The second communication apparatus sends a second message to the first communication apparatus, where the second message indicates a consensus mode set for blockchain communication. The second communication apparatus receives a third message from the first communication apparatus, where the third message indicates first consensus mode information in the consensus mode set. The second communication apparatus sends a fourth message to the first communication apparatus, where the fourth message indicates that the DCP initial access succeeds or fails.

Based on the foregoing technical solution, different communication apparatuses may exchange messages based on a DCP communication protocol to complete a DCP initial access process, where the DCP communication protocol is a protocol for blockchain communication, so that a process of blockchain-based communication between the different communication apparatuses can be implemented without a need to take a longer path via an application server or an external blockchain, and a communication path can be shortened, thereby improving communication efficiency.

Optionally, the third message indicates the first consensus mode selected by the first communication apparatus from the consensus mode set, the third message indicates the first consensus mode information expected by the first communication apparatus, or the third message indicates the first consensus mode information supported by the first communication apparatus.

Optionally, the third message includes the identifier of the first communication apparatus, the blockchain identifier, and an identifier of the first consensus mode information in the consensus mode set.

In a possible implementation of the second aspect, the fourth message indicates that the DCP initial access succeeds; and after the second communication apparatus sends the fourth message to the first communication apparatus, the method further includes: The second communication apparatus receives a fifth message from the first communication apparatus, where the fifth message is for requesting to set up a DCP connection, and the fifth message includes the identifier of the first communication apparatus, the blockchain identifier, and an identifier of the first consensus mode information. The second communication apparatus sends a sixth message to the first communication apparatus, where the sixth message indicates a DCP connection setup response. The second communication apparatus receives a seventh message from the first communication apparatus, where the seventh message indicates that the setup of the DCP connection is completed.

Based on the foregoing technical solution, when the fourth message indicates that the DCP initial access succeeds, the first communication apparatus may further interact with the second communication apparatus, so that a process of setting up a DCP connection between the different communication apparatuses is implemented when the second communication apparatus configures a consensus mode based on the fifth message.

In a possible implementation of the second aspect, after the second communication apparatus receives the seventh message from the first communication apparatus, the method further includes: The second communication apparatus sends a nineteenth message to a third communication apparatus, where the nineteenth message indicates that the setup of the DCP connection is completed, and the nineteenth message includes the identifier of the first communication apparatus, the blockchain identifier, and the identifier of the first consensus mode information.

Based on the foregoing technical solution, after the second communication apparatus receives the seventh message from the first communication apparatus (that is, the DCP connection is set up between the first communication apparatus and the second communication apparatus), when the first communication apparatus expects (for reducing energy consumption, or when the communication based on the DCP connection is no longer required, or the like) to release the DCP connection, the second communication apparatus may interact with the third communication apparatus, to indicate, to another communication apparatus, that the first communication apparatus has set up the DCP connection.

In a possible implementation of the second aspect, after the second communication apparatus receives the seventh message from the first communication apparatus, the method further includes: The second communication apparatus receives an eighth message from the first communication apparatus, where the eighth message is for requesting to release the DCP connection, and the eighth message includes the identifier of the first communication apparatus and the blockchain identifier. The second communication apparatus sends a ninth message to the first communication apparatus, where the ninth message indicates a DCP connection release response. The second communication apparatus receives a tenth message from the first communication apparatus, where the tenth message indicates that the release of the DCP connection is completed.

Based on the foregoing technical solution, after the first communication apparatus sends the seventh message to the second communication apparatus (that is, the DCP connection is set up between the first communication apparatus and the second communication apparatus), when the second communication apparatus expects (a reason is that it is determined that permission information of the first communication apparatus is changed, a reason is that communication no longer needs to be performed based on the DCP connection, or the like) to release the DCP connection, the first communication apparatus may interact with the second communication apparatus, to implement a DCP connection release process initiated by the first communication apparatus.

In a possible implementation of the second aspect, after the second communication apparatus receives the tenth message from the first communication apparatus, the method further includes: The second communication apparatus sends a twentieth message to a third communication apparatus, where the twentieth message is for requesting to release the DCP connection, and the twentieth message includes the identifier of the first communication apparatus and the blockchain identifier. The second communication apparatus receives a twenty-first message from the third communication apparatus, where the twenty-first message indicates that the release of the DCP connection is completed.

Based on the foregoing technical solution, after the second communication apparatus receives the tenth message from the first communication apparatus (that is, the release of the DCP connection between the first communication apparatus and the second communication apparatus is completed), the second communication apparatus may interact with the third communication apparatus, so that in a scenario of the DCP connection release process initiated by the first communication apparatus, the second communication apparatus indicates, to the another communication apparatus, that the DCP connection of the first communication apparatus has been released.

In a possible implementation of the second aspect, after the second communication apparatus receives the seventh message from the first communication apparatus, the method further includes: The second communication apparatus sends an eleventh message to the first communication apparatus, where the eleventh message is for requesting to release the DCP connection, and the eleventh message includes an identifier of the second communication apparatus and the blockchain identifier. The second communication apparatus receives a twelfth message from the first communication apparatus, where the twelfth message indicates that the release of the DCP connection is completed.

Based on the foregoing technical solution, after the first communication apparatus sends the seventh message to the second communication apparatus (that is, the DCP connection is set up between the first communication apparatus and the second communication apparatus), the first communication apparatus may interact with the second communication apparatus, to implement a DCP connection release process initiated by the second communication apparatus.

In a possible implementation of the second aspect, after the second communication apparatus receives the twelfth message from the first communication apparatus, the method further includes: The second communication apparatus sends a twenty-second message to a third communication apparatus, where the twenty-second message is for requesting to release the DCP connection, and the twenty-second message includes the identifier of the first communication apparatus and the blockchain identifier. The second communication apparatus receives a twenty-third message from the third communication apparatus, where the twenty-third message indicates that the release of the DCP connection is completed.

Based on the foregoing technical solution, after the second communication apparatus receives the seventh message from the first communication apparatus (that is, the release of the DCP connection between the first communication apparatus and the second communication apparatus is completed), the second communication apparatus may interact with the third communication apparatus, so that in a scenario of the DCP connection release process initiated by the second communication apparatus, the second communication apparatus indicates, to another communication apparatus, that the DCP connection of the first communication apparatus has been released.

In a possible implementation of the second aspect, the fourth message indicates that the DCP initial access succeeds; and after the second communication apparatus sends the fourth message to the first communication apparatus, the method further includes: The second communication apparatus receives a thirteenth message from the first communication apparatus, where the thirteenth message is for requesting to set up a DCP connection, and the thirteenth message includes the identifier of the first communication apparatus, the blockchain identifier, and an identifier of the first consensus mode information. The second communication apparatus sends a fourteenth message to the first communication apparatus, where the fourteenth message indicates that the setup of the DCP connection fails.

Based on the foregoing technical solution, when the fourth message indicates that the DCP initial access succeeds, the first communication apparatus may further interact with the second communication apparatus, so that a process in which the second communication apparatus rejects the setup of the DCP connection to the first communication apparatus is implemented when the second communication apparatus determines, because the first communication apparatus is an unauthorized user, a resource is inadequate, or the like, to reject the request of the first communication apparatus.

In a possible implementation of the second aspect, the fourth message indicates that the DCP initial access succeeds; and after the second communication apparatus sends the fourth message to the first communication apparatus, the method further includes: The second communication apparatus receives a fifteenth message from the first communication apparatus, where the fifteenth message is for requesting consensus data transmission, and the fifteenth message includes the identifier of the first communication apparatus and the blockchain identifier. The second communication apparatus sends a sixteenth message to the first communication apparatus, where the sixteenth message indicates a consensus data transmission response. The second communication apparatus receives first consensus data from the first communication apparatus.

Based on the foregoing technical solution, after the first communication apparatus receives the fourth message from the second communication apparatus, and when the fourth message indicates that the DCP initial access succeeds, the first communication apparatus may interact with the second communication apparatus, to implement a blockchain consensus data transmission process initiated by the first communication apparatus.

In a possible implementation of the second aspect, after the second communication apparatus sends the sixteenth message to the first communication apparatus, the method further includes: The second communication apparatus sends a twenty-fourth message to the third communication apparatus, where the twenty-fourth message is for requesting consensus data transmission, and the twenty-fourth message includes the identifier of the first communication apparatus and the blockchain identifier. The second communication apparatus receives a twenty-fifth message from the third communication apparatus, where the twenty-fifth message indicates a consensus data transmission response. After the second communication apparatus receives the consensus data from the first communication apparatus, the method further includes: The second communication apparatus sends the first consensus data to the third communication apparatus.

Based on the foregoing technical solution, after the second communication apparatus sends the sixteenth message to the first communication apparatus (that is, it is determined that consensus data transmission is to be performed between the first communication apparatus and the second communication apparatus), the second communication apparatus may interact with the third communication apparatus, so that the second communication apparatus transmits blockchain consensus data to the another communication apparatus in a scenario of blockchain consensus data transmission initiated by the first communication apparatus.

In a possible implementation of the second aspect, the fourth message indicates that the DCP initial access succeeds; and after the second communication apparatus sends the fourth message to the first communication apparatus, the method further includes: The second communication apparatus sends a seventeenth message to the first communication apparatus, where the seventeenth message is for requesting consensus data transmission, and the seventeenth message includes the identifier of the second communication apparatus and the blockchain identifier. The second communication apparatus receives an eighteenth message from the first communication apparatus, where the eighteenth message indicates a consensus data transmission response. The second communication apparatus sends second consensus data to the first communication apparatus.

Based on the foregoing technical solution, after the first communication apparatus receives the fourth message from the second communication apparatus, and when the fourth message indicates that the DCP initial access succeeds, the first communication apparatus may interact with the second communication apparatus, to implement a blockchain consensus data transmission process initiated by the second communication apparatus.

In a possible implementation of the second aspect, the method further includes: The second communication apparatus sends a twenty-sixth message to a third communication apparatus, where the twenty-sixth message is for requesting consensus data transmission, and the twenty-sixth message includes the identifier of the second communication apparatus and the blockchain identifier. The second communication apparatus receives a twenty-seventh message from the third communication apparatus, where the twenty-seventh message indicates a consensus data transmission response. The second communication apparatus sends the second consensus data to the third communication apparatus.

Based on the foregoing technical solution, the second communication apparatus may interact with the third communication apparatus, so that the second communication apparatus transmits blockchain consensus data to the another communication apparatus in a scenario of blockchain consensus data transmission initiated by the second communication apparatus.

In a possible implementation of the second aspect, after the second communication apparatus receives the first message from the first communication apparatus, and before the second communication apparatus sends the second message to the first communication apparatus, the method further includes: The second communication apparatus sends a twenty-eighth message to a fourth communication apparatus, where the twenty-eighth message indicates to request to set up DCP initial access, and the twenty-eighth message includes the identifier of the first communication apparatus and the blockchain identifier. The second communication apparatus receives a twenty-ninth message from the fourth communication apparatus, where the twenty-ninth message is for requesting to set up DCP initial access. After the second communication apparatus receives the third message from the first communication apparatus, the method further includes: The second communication apparatus sends a thirtieth message to the fourth communication apparatus, where the thirtieth message indicates a DCP initial access response, and the thirtieth message includes the identifier of the first communication apparatus, the blockchain identifier, and the identifier of the first consensus mode information.

Based on the foregoing technical solution, in a process of the DCP initial access between the first communication apparatus and the second communication apparatus, the second communication apparatus may interact with the fourth communication apparatus, to implement a process in which the fourth communication apparatus verifies the DCP initial access of the first communication apparatus.

In a possible implementation of the second aspect, the fourth message indicates that the DCP initial access succeeds; and after the second communication apparatus sends the fourth message to the first communication apparatus, the method further includes: The second communication apparatus sends a thirty-first message to the third communication apparatus, where the thirty-first message indicates a DCP initial access response, and the thirty-first message includes the identifier of the first communication apparatus, the blockchain identifier, and the identifier of the first consensus mode information.

Based on the foregoing technical solution, in a scenario in which the fourth communication apparatus (or the second communication apparatus) verifies the DCP initial access of the first communication apparatus, the second communication apparatus may further interact with the third communication apparatus, to indicate, to the third communication apparatus, that the DCP initial access of the first communication apparatus succeeds.

A third aspect of this application provides a communication method. The method is performed by a first communication apparatus, the method is performed by a part of components (for example, a processor, a chip, or a chip system) in the first communication apparatus, or the method may be implemented by a logic module or software that can implement all or a part of functions of the first communication apparatus. In the third aspect and possible implementations thereof, an example in which the communication method is performed by the first communication apparatus is used for description. In the method, the first communication apparatus sends a fifth message to a second communication apparatus, where the fifth message is for requesting to set up a DCP connection, and the fifth message includes an identifier of the first communication apparatus, a blockchain identifier, and an identifier of first consensus mode information. The first communication apparatus receives a sixth message from the second communication apparatus, where the sixth message indicates a DCP connection setup response. The first communication apparatus sends a seventh message to the second communication apparatus, where the seventh message indicates that the setup of the DCP connection is completed.

Based on the foregoing technical solution, the first communication apparatus may interact with the second communication apparatus, so that a process of setting up a DCP connection between different communication apparatuses is implemented when the second communication apparatus configures a consensus mode based on the fifth message. In this way, the different communication apparatuses may exchange messages based on a DCP communication protocol to complete a DCP connection setup process, where the DCP communication protocol is a protocol for blockchain communication, so that a process of blockchain-based communication between the different communication apparatuses can be implemented without a need to take a longer path via an application server or an external blockchain, and a communication path can be shortened, thereby improving communication efficiency.

A fourth aspect of this application provides a communication method. The method is performed by a second communication apparatus, the method is performed by a part of components (for example, a processor, a chip, or a chip system) in the second communication apparatus, or the method may be implemented by a logic module or software that can implement all or a part of functions of the second communication apparatus. In the fourth aspect and possible implementations thereof, an example in which the communication method is performed by the second communication apparatus is used for description. In the method, the second communication apparatus receives a fifth message from a first communication apparatus, where the fifth message is for requesting to set up a DCP connection, and the fifth message includes an identifier of the first communication apparatus, a blockchain identifier, and an identifier of first consensus mode information. The second communication apparatus sends a sixth message to the first communication apparatus, where the sixth message indicates a DCP connection setup response. The second communication apparatus receives a seventh message from the first communication apparatus, where the seventh message indicates that the setup of the DCP connection is completed.

Based on the foregoing technical solution, the first communication apparatus may interact with the second communication apparatus, so that a process of setting up a DCP connection between different communication apparatuses is implemented when the second communication apparatus configures a consensus mode based on the fifth message. In this way, the different communication apparatuses may exchange messages based on a DCP communication protocol to complete a DCP connection setup process, where the DCP communication protocol is a protocol for blockchain communication, so that a process of blockchain-based communication between the different communication apparatuses can be implemented without a need to take a longer path via an application server or an external blockchain, and a communication path can be shortened, thereby improving communication efficiency.

In a possible implementation of the fourth aspect, after the second communication apparatus receives the seventh message from the first communication apparatus, the method further includes: The second communication apparatus sends a nineteenth message to a third communication apparatus, where the nineteenth message indicates that the setup of the DCP connection is completed, and the nineteenth message includes the identifier of the first communication apparatus, the blockchain identifier, and the identifier of the first consensus mode information.

Based on the foregoing technical solution, after the second communication apparatus receives the seventh message from the first communication apparatus (that is, the DCP connection is set up between the first communication apparatus and the second communication apparatus), the second communication apparatus may interact with the third communication apparatus, to indicate, to another communication apparatus, that the first communication apparatus has set up the DCP connection.

A fifth aspect of this application provides a communication method. The method is performed by a first communication apparatus, the method is performed by a part of components (for example, a processor, a chip, or a chip system) in the first communication apparatus, or the method may be implemented by a logic module or software that can implement all or a part of functions of the first communication apparatus. In the fifth aspect and possible implementations thereof, an example in which the communication method is performed by the first communication apparatus is used for description. In the method, the first communication apparatus sends an eighth message to a second communication apparatus, where the eighth message is for requesting to release a DCP connection, and the eighth message includes an identifier of the first communication apparatus and a blockchain identifier. The first communication apparatus receives a ninth message from the second communication apparatus, where the ninth message indicates a DCP connection release response. The first communication apparatus sends a tenth message to the second communication apparatus, where the tenth message indicates that the release of the DCP connection is completed.

Based on the foregoing technical solution, when the first communication apparatus expects (for reducing energy consumption, or when the communication based on the DCP connection is no longer required, or the like) to release the DCP connection, the first communication apparatus may interact with the second communication apparatus, to implement a DCP connection release process initiated by the first communication apparatus. In this way, different communication apparatuses may exchange messages based on a DCP communication protocol to complete a DCP connection release process, where the DCP communication protocol is a protocol for blockchain communication, so that a process of blockchain-based communication between the different communication apparatuses can be implemented without a need to take a longer path via an application server or an external blockchain, and a communication path can be shortened, thereby improving communication efficiency.

A sixth aspect of this application provides a communication method. The method is performed by a second communication apparatus, the method is performed by a part of components (for example, a processor, a chip, or a chip system) in the second communication apparatus, or the method may be implemented by a logic module or software that can implement all or a part of functions of the second communication apparatus. In the sixth aspect and possible implementations thereof, an example in which the communication method is performed by the second communication apparatus is used for description. In the method, the second communication apparatus receives an eighth message from a first communication apparatus, where the eighth message is for requesting to release a DCP connection, and the eighth message includes an identifier of the first communication apparatus and a blockchain identifier. The second communication apparatus sends a ninth message to the first communication apparatus, where the ninth message indicates a DCP connection release response. The second communication apparatus receives a tenth message from the first communication apparatus, where the tenth message indicates that the release of the DCP connection is completed.

Based on the foregoing technical solution, when the first communication apparatus expects (for reducing energy consumption, when the communication based on the DCP connection is no longer required, or the like) to release the DCP connection, the first communication apparatus may interact with the second communication apparatus, to implement a DCP connection release process initiated by the first communication apparatus. In this way, different communication apparatuses may exchange messages based on a DCP communication protocol to complete a DCP connection release process, where the DCP communication protocol is a protocol for blockchain communication, so that a process of blockchain-based communication between the different communication apparatuses can be implemented without a need to take a longer path via an application server or an external blockchain, and a communication path can be shortened, thereby improving communication efficiency.

In a possible implementation of the sixth aspect, after the second communication apparatus receives the tenth message from the first communication apparatus, the method further includes: The second communication apparatus sends a twentieth message to a third communication apparatus, where the twentieth message is for requesting to release the DCP connection, and the twentieth message includes the identifier of the first communication apparatus and the blockchain identifier. The second communication apparatus receives a twenty-first message from the third communication apparatus, where the twenty-first message indicates that the release of the DCP connection is completed.

Based on the foregoing technical solution, after the second communication apparatus receives the tenth message from the first communication apparatus (that is, the release of the DCP connection between the first communication apparatus and the second communication apparatus is completed), the second communication apparatus may interact with the third communication apparatus, so that in a scenario of the DCP connection release process initiated by the first communication apparatus, the second communication apparatus indicates, to another communication apparatus, that the DCP connection of the first communication apparatus has been released.

A seventh aspect of this application provides a communication method. The method is performed by a first communication apparatus, the method is performed by a part of components (for example, a processor, a chip, or a chip system) in the first communication apparatus, or the method may be implemented by a logic module or software that can implement all or a part of functions of the first communication apparatus. In the seventh aspect and possible implementations thereof, an example in which the communication method is performed by the first communication apparatus is used for description. In the method, the first communication apparatus receives an eleventh message from a second communication apparatus, where the eleventh message is for requesting to release a DCP connection, and the eleventh message includes an identifier of the second communication apparatus and a blockchain identifier. The first communication apparatus sends a twelfth message to the second communication apparatus, where the twelfth message indicates that the release of the DCP connection is completed.

Based on the foregoing technical solution, when the second communication apparatus expects (a reason is that it is determined that permission information of the first communication apparatus is changed, a reason is that communication no longer needs to be performed based on the DCP connection, or the like) to release the DCP connection, the first communication apparatus may interact with the second communication apparatus, to implement a DCP connection release process initiated by the second communication apparatus. In this way, different communication apparatuses may exchange messages based on a DCP communication protocol to complete a DCP connection release process, where the DCP communication protocol is a protocol for blockchain communication, so that a process of blockchain-based communication between the different communication apparatuses can be implemented without a need to take a longer path via an application server or an external blockchain, and a communication path can be shortened, thereby improving communication efficiency.

An eighth aspect of this application provides a communication method. The method is performed by a second communication apparatus, the method is performed by a part of components (for example, a processor, a chip, or a chip system) in the second communication apparatus, or the method may be implemented by a logic module or software that can implement all or a part of functions of the second communication apparatus. In the eighth aspect and possible implementations thereof, an example in which the communication method is performed by the second communication apparatus is used for description. In the method, the second communication apparatus sends an eleventh message to a first communication apparatus, where the eleventh message is for requesting to release a DCP connection, and the eleventh message includes an identifier of the second communication apparatus and a blockchain identifier. The second communication apparatus receives a twelfth message from the first communication apparatus, where the twelfth message indicates that the release of the DCP connection is completed.

Based on the foregoing technical solution, when the second communication apparatus expects (a reason is that it is determined that permission information of the first communication apparatus is changed, a reason is that communication no longer needs to be performed based on the DCP connection, or the like) to release the DCP connection, the first communication apparatus may interact with the second communication apparatus, to implement a DCP connection release process initiated by the second communication apparatus. In this way, different communication apparatuses may exchange messages based on a DCP communication protocol to complete a DCP connection release process, where the DCP communication protocol is a protocol for blockchain communication, so that a process of blockchain-based communication between the different communication apparatuses can be implemented without a need to take a longer path via an application server or an external blockchain, and a communication path can be shortened, thereby improving communication efficiency.

In a possible implementation of the eighth aspect, after the second communication apparatus receives the twelfth message from the first communication apparatus, the method further includes: The second communication apparatus sends a twenty-second message to a third communication apparatus, where the twenty-second message is for requesting to release the DCP connection, and the twenty-second message includes an identifier of the first communication apparatus and the blockchain identifier. The second communication apparatus receives a twenty-third message from the third communication apparatus, where the twenty-third message indicates that the release of the DCP connection is completed.

Based on the foregoing technical solution, the second communication apparatus may interact with the third communication apparatus, so that in a scenario of the DCP connection release process initiated by the second communication apparatus, the second communication apparatus indicates, to another communication apparatus, that the DCP connection of the first communication apparatus has been released.

A ninth aspect of this application provides a communication method. The method is performed by a first communication apparatus, the method is performed by a part of components (for example, a processor, a chip, or a chip system) in the first communication apparatus, or the method may be implemented by a logic module or software that can implement all or a part of functions of the first communication apparatus. In the ninth aspect and possible implementations thereof, an example in which the communication method is performed by the first communication apparatus is used for description. In the method, the first communication apparatus sends a thirteenth message to a second communication apparatus, where the thirteenth message is for requesting to set up a DCP connection, and the thirteenth message includes an identifier of the first communication apparatus, a blockchain identifier, and an identifier of first consensus mode information. The first communication apparatus receives a fourteenth message from the second communication apparatus, where the fourteenth message indicates that the setup of the DCP connection fails.

Based on the foregoing technical solution, the first communication apparatus may interact with the second communication apparatus, to implement a process in which the second communication apparatus rejects the setup of the DCP connection to the first communication apparatus. In this way, different communication apparatuses may exchange messages based on a DCP communication protocol to complete a DCP connection setup rejection process, where the DCP communication protocol is a protocol for blockchain communication, so that a process of blockchain-based communication between the different communication apparatuses can be implemented without a need to take a longer path via an application server or an external blockchain, and a communication path can be shortened, thereby improving communication efficiency.

Optionally, a reason why the second communication apparatus rejects the setup of the DCP connection may be that the first communication apparatus is an unauthorized user, that a resource is inadequate, or the like.

A tenth aspect of this application provides a communication method. The method is performed by a second communication apparatus, the method is performed by a part of components (for example, a processor, a chip, or a chip system) in the second communication apparatus, or the method may be implemented by a logic module or software that can implement all or a part of functions of the second communication apparatus. In the tenth aspect and possible implementations thereof, an example in which the communication method is performed by the second communication apparatus is used for description. In the method, the second communication apparatus receives a thirteenth message from a first communication apparatus, where the thirteenth message is for requesting to set up a DCP connection, and the thirteenth message includes an identifier of the first communication apparatus, a blockchain identifier, and an identifier of first consensus mode information. The second communication apparatus sends a fourteenth message to the first communication apparatus, where the fourteenth message indicates that the setup of the DCP connection fails.

Based on the foregoing technical solution, the first communication apparatus may interact with the second communication apparatus, to implement a process in which the second communication apparatus rejects the setup of the DCP connection to the first communication apparatus. In this way, different communication apparatuses may exchange messages based on a DCP communication protocol to complete a DCP connection setup rejection process, where the DCP communication protocol is a protocol for blockchain communication, so that a process of blockchain-based communication between the different communication apparatuses can be implemented without a need to take a longer path via an application server or an external blockchain, and a communication path can be shortened, thereby improving communication efficiency.

Optionally, a reason why the second communication apparatus rejects the setup of the DCP connection may be that the first communication apparatus is an unauthorized user, that a resource is inadequate, or the like.

An eleventh aspect of this application provides a communication method. The method is performed by a first communication apparatus, the method is performed by a part of components (for example, a processor, a chip, or a chip system) in the first communication apparatus, or the method may be implemented by a logic module or software that can implement all or a part of functions of the first communication apparatus. In the eleventh aspect and possible implementations thereof, an example in which the communication method is performed by the first communication apparatus is used for description. In the method, the first communication apparatus sends a fifteenth message to a second communication apparatus, where the fifteenth message is for requesting consensus data transmission, and the fifteenth message includes an identifier of the first communication apparatus and a blockchain identifier. The first communication apparatus receives a sixteenth message from the second communication apparatus, where the sixteenth message indicates a consensus data transmission response. The first communication apparatus sends first consensus data to the second communication apparatus.

Based on the foregoing technical solution, the first communication apparatus may interact with the second communication apparatus, to implement a blockchain consensus data transmission process initiated by the first communication apparatus. In this way, different communication apparatuses may exchange messages based on a DCP communication protocol to complete the blockchain consensus data transmission process initiated by the first communication apparatus, where the DCP communication protocol is a protocol for blockchain communication, so that a process of blockchain-based communication between the different communication apparatuses can be implemented without a need to take a longer path via an application server or an external blockchain, and a communication path can be shortened, thereby improving communication efficiency.

A twelfth aspect of this application provides a communication method. The method is performed by a second communication apparatus, the method is performed by a part of components (for example, a processor, a chip, or a chip system) in the second communication apparatus, or the method may be implemented by a logic module or software that can implement all or a part of functions of the second communication apparatus. In the twelfth aspect and possible implementations thereof, an example in which the communication method is performed by the second communication apparatus is used for description. In the method, the second communication apparatus receives a fifteenth message from a first communication apparatus, where the fifteenth message is for requesting consensus data transmission, and the fifteenth message includes an identifier of the first communication apparatus and a blockchain identifier. The second communication apparatus sends a sixteenth message to the first communication apparatus, where the sixteenth message indicates a consensus data transmission response. The second communication apparatus receives first consensus data from the first communication apparatus.

Based on the foregoing technical solution, the first communication apparatus may interact with the second communication apparatus, to implement a blockchain consensus data transmission process initiated by the first communication apparatus. In this way, different communication apparatuses may exchange messages based on a DCP communication protocol to complete the blockchain consensus data transmission process initiated by the first communication apparatus, where the DCP communication protocol is a protocol for blockchain communication, so that a process of blockchain-based communication between the different communication apparatuses can be implemented without a need to take a longer path via an application server or an external blockchain, and a communication path can be shortened, thereby improving communication efficiency.

In a possible implementation of the twelfth aspect, after the second communication apparatus sends the sixteenth message to the first communication apparatus, the method further includes: The second communication apparatus sends a twenty-fourth message to a third communication apparatus, where the twenty-fourth message is for requesting consensus data transmission, and the twenty-fourth message includes the identifier of the first communication apparatus and the blockchain identifier. The second communication apparatus receives a twenty-fifth message from the third communication apparatus, where the twenty-fifth message indicates a consensus data transmission response. After the second communication apparatus receives the consensus data from the first communication apparatus, the method further includes: The second communication apparatus sends the first consensus data to the third communication apparatus.

Based on the foregoing technical solution, after the second communication apparatus sends the sixteenth message to the first communication apparatus (that is, it is determined that consensus data transmission is to be performed between the first communication apparatus and the second communication apparatus), the second communication apparatus may interact with the third communication apparatus, so that the second communication apparatus transmits blockchain consensus data to another communication apparatus in a scenario of blockchain consensus data transmission initiated by the first communication apparatus.

A thirteenth aspect of this application provides a communication method. The method is performed by a first communication apparatus, the method is performed by a part of components (for example, a processor, a chip, or a chip system) in the first communication apparatus, or the method may be implemented by a logic module or software that can implement all or a part of functions of the first communication apparatus. In the thirteenth aspect and possible implementations thereof, an example in which the communication method is performed by the first communication apparatus is used for description. In the method, the first communication apparatus receives a seventeenth message from a second communication apparatus, where the seventeenth message is for requesting consensus data transmission, and the seventeenth message includes an identifier of the second communication apparatus and a blockchain identifier. The first communication apparatus sends an eighteenth message to the second communication apparatus, where the eighteenth message indicates a consensus data transmission response. The first communication apparatus receives second consensus data from the second communication apparatus.

Based on the foregoing technical solution, after the first communication apparatus receives a fourth message from the second communication apparatus, and when the fourth message indicates that DCP initial access succeeds, the first communication apparatus may interact with the second communication apparatus, to implement a blockchain consensus data transmission process initiated by the second communication apparatus. In this way, different communication apparatuses may exchange messages based on a DCP communication protocol to implement the blockchain consensus data transmission process initiated by the second communication apparatus, where the DCP communication protocol is a protocol for blockchain communication, so that a process of blockchain-based communication between the different communication apparatuses can be implemented without a need to take a longer path via an application server or an external blockchain, and a communication path can be shortened, thereby improving communication efficiency.

A fourteenth aspect of this application provides a communication method. The method is performed by a second communication apparatus, the method is performed by a part of components (for example, a processor, a chip, or a chip system) in the second communication apparatus, or the method may be implemented by a logic module or software that can implement all or a part of functions of the second communication apparatus. In the fourteenth aspect and possible implementations thereof, an example in which the communication method is performed by the second communication apparatus is used for description. In the method, the second communication apparatus sends a seventeenth message to a first communication apparatus, where the seventeenth message is for requesting consensus data transmission, and the seventeenth message includes an identifier of the second communication apparatus and a blockchain identifier. The second communication apparatus receives an eighteenth message from the first communication apparatus, where the eighteenth message indicates a consensus data transmission response. The second communication apparatus sends second consensus data to the first communication apparatus.

Based on the foregoing technical solution, after the first communication apparatus receives a fourth message from the second communication apparatus, and when the fourth message indicates that DCP initial access succeeds, the first communication apparatus may interact with the second communication apparatus, to implement a blockchain consensus data transmission process initiated by the second communication apparatus. In this way, different communication apparatuses may exchange messages based on a DCP communication protocol to implement the blockchain consensus data transmission process initiated by the second communication apparatus, where the DCP communication protocol is a protocol for blockchain communication, so that a process of blockchain-based communication between the different communication apparatuses can be implemented without a need to take a longer path via an application server or an external blockchain, and a communication path can be shortened, thereby improving communication efficiency.

In a possible implementation of the fourteenth aspect, the method further includes: The second communication apparatus sends a twenty-sixth message to a third communication apparatus, where the twenty-sixth message is for requesting consensus data transmission, and the twenty-sixth message includes the identifier of the second communication apparatus and the blockchain identifier. The second communication apparatus receives a twenty-seventh message from the third communication apparatus, where the twenty-seventh message indicates a consensus data transmission response. The second communication apparatus sends the second consensus data to the third communication apparatus.

Based on the foregoing technical solution, the second communication apparatus may interact with the third communication apparatus, so that the second communication apparatus transmits blockchain consensus data to another communication apparatus in a scenario of blockchain consensus data transmission initiated by the second communication apparatus.

In a possible implementation of any one of the first aspect to the fourteenth aspect, the first message further includes permission information and contract information.

Optionally, any one of the second message to the thirty-first message may also include the permission information and the contract information.

In a possible implementation of any one of the first aspect to the fourteenth aspect, the DCP is for completing at least one of the following blockchain communication: blockchain configuration information broadcasting, node access chain confirmation, data consensus connection management, consensus algorithm selection, or consensus data transmission.

In a possible implementation of any one of the first aspect to the fourteenth aspect, the consensus mode set includes one or more consensus modes, and each consensus mode includes at least one of the following information: a blockchain type, a chain structure, a consensus algorithm, an incentive mechanism, a contract template, a resource type, a packet delay budget, a packet error rate, energy consumption, or a computation amount.

A fifteenth aspect of this application provides a communication apparatus. The apparatus may implement the method according to any one of the first aspect or the possible implementations of the first aspect. The apparatus includes a corresponding unit or module configured to perform the foregoing method. The unit or the module included in the apparatus may be implemented by software and/or hardware. For example, the apparatus may be a first communication apparatus, the apparatus may be a component (for example, a processor, a chip, or a chip system) in the first communication apparatus, or the apparatus may be a logic module or software that can implement all or a part of functions of the first communication apparatus.

The apparatus includes a sending unit and a receiving unit, where the sending unit is configured to send a first message to a second communication apparatus, where the first message is for requesting to set up data consensus protocol DCP initial access, and the first message includes an identifier of the first communication apparatus and a blockchain identifier: the receiving unit is configured to receive a second message from the second communication apparatus, where the second message indicates a consensus mode set for blockchain communication: the sending unit is configured to send a third message to the second communication apparatus, where the third message indicates first consensus mode information in the consensus mode set; and the receiving unit is configured to receive a fourth message from the second communication apparatus, where the fourth message indicates that the DCP initial access succeeds or fails.

Optionally, the third message includes the identifier of the first communication apparatus, the blockchain identifier, and an identifier of the first consensus mode information in the consensus mode set.

A sixteenth aspect of this application provides a communication apparatus. The apparatus may implement the method according to any one of the second aspect or the possible implementations of the second aspect. The apparatus includes a corresponding unit or module configured to perform the foregoing method. The unit or the module included in the apparatus may be implemented by software and/or hardware. For example, the apparatus may be a second communication apparatus, the apparatus may be a component (for example, a processor, a chip, or a chip system) in the second communication apparatus, or the apparatus may be a logic module or software that can implement all or a part of functions of the second communication apparatus.

The apparatus includes a sending unit and a receiving unit, where the receiving unit is configured to receive a first message from a first communication apparatus, where the first message is for requesting to set up data consensus protocol DCP initial access, and the first message includes an identifier of the first communication apparatus and a blockchain identifier; the sending unit is configured to send a second message to the first communication apparatus, where the second message indicates a consensus mode set for blockchain communication; the receiving unit is configured to receive a third message from the first communication apparatus, where the third message indicates first consensus mode information in the consensus mode set; and the sending unit is configured to send a fourth message to the first communication apparatus, where the fourth message indicates that the DCP initial access succeeds or fails.

Optionally, the third message includes the identifier of the first communication apparatus, the blockchain identifier, and an identifier of the first consensus mode information in the consensus mode set.

It should be noted that, for an implementation process of the communication apparatus provided in the sixteenth aspect of this application, refer to the implementation process described in the second aspect. In addition, corresponding technical effects are implemented. Details are not described herein again.

A seventeenth aspect of this application provides a communication apparatus. The apparatus may implement the method according to any one of the third aspect or the possible implementations of the third aspect. The apparatus includes a corresponding unit or module configured to perform the foregoing method. The unit or the module included in the apparatus may be implemented by software and/or hardware. For example, the apparatus may be a first communication apparatus, the apparatus may be a component (for example, a processor, a chip, or a chip system) in the first communication apparatus, or the apparatus may be a logic module or software that can implement all or a part of functions of the first communication apparatus.

The apparatus includes a sending unit and a receiving unit, where the sending unit is configured to send a fifth message to a second communication apparatus, where the fifth message is for requesting to set up a DCP connection, and the fifth message includes an identifier of the first communication apparatus, a blockchain identifier, and an identifier of first consensus mode information: the receiving unit is configured to receive a sixth message from the second communication apparatus, where the sixth message indicates a DCP connection setup response; and the sending unit is configured to send a seventh message to the second communication apparatus, where the seventh message indicates that the setup of the DCP connection is completed.

It should be noted that, for an implementation process of the communication apparatus provided in the seventeenth aspect of this application, refer to the implementation process described in the third aspect. In addition, corresponding technical effects are implemented. Details are not described herein again.

An eighteenth aspect of this application provides a communication apparatus. The apparatus may implement the method according to any one of the fourth aspect or the possible implementations of the fourth aspect. The apparatus includes a corresponding unit or module configured to perform the foregoing method. The unit or the module included in the apparatus may be implemented by software and/or hardware. For example, the apparatus may be a second communication apparatus, the apparatus may be a component (for example, a processor, a chip, or a chip system) in the second communication apparatus, or the apparatus may be a logic module or software that can implement all or a part of functions of the second communication apparatus.

The apparatus includes a sending unit and a receiving unit, where the receiving unit is configured to receive a fifth message from a first communication apparatus, where the fifth message is for requesting to set up a DCP connection, and the fifth message includes an identifier of the first communication apparatus, a blockchain identifier, and an identifier of first consensus mode information: the sending unit is configured to send a sixth message to the first communication apparatus, where the sixth message indicates a DCP connection setup response; and the receiving unit is configured to receive a seventh message from the first communication apparatus, where the seventh message indicates that the setup of the DCP connection is completed.

It should be noted that, for an implementation process of the communication apparatus provided in the eighteenth aspect of this application, refer to the implementation process described in the fourth aspect. In addition, corresponding technical effects are implemented. Details are not described herein again.

A nineteenth aspect of this application provides a communication apparatus. The apparatus may implement the method according to any one of the fifth aspect or the possible implementations of the fifth aspect. The apparatus includes a corresponding unit or module configured to perform the foregoing method. The unit or the module included in the apparatus may be implemented by software and/or hardware. For example, the apparatus may be a first communication apparatus, the apparatus may be a component (for example, a processor, a chip, or a chip system) in the first communication apparatus, or the apparatus may be a logic module or software that can implement all or a part of functions of the first communication apparatus.

The apparatus includes a sending unit and a receiving unit, where the sending unit is configured to send an eighth message to a second communication apparatus, where the eighth message is for requesting to release a DCP connection, and the eighth message includes an identifier of the first communication apparatus and a blockchain identifier: the receiving unit is configured to receive a ninth message from the second communication apparatus, where the ninth message indicates a DCP connection release response; and the sending unit is configured to send a tenth message to the second communication apparatus, where the tenth message indicates that the release of the DCP connection is completed.

It should be noted that, for an implementation process of the communication apparatus provided in the nineteenth aspect of this application, refer to the implementation process described in the fifth aspect. In addition, corresponding technical effects are implemented. Details are not described herein again.

A twentieth aspect of this application provides a communication apparatus. The apparatus may implement the method according to any one of the sixth aspect or the possible implementations of the sixth aspect. The apparatus includes a corresponding unit or module configured to perform the foregoing method. The unit or the module included in the apparatus may be implemented by software and/or hardware. For example, the apparatus may be a second communication apparatus, the apparatus may be a component (for example, a processor, a chip, or a chip system) in the second communication apparatus, or the apparatus may be a logic module or software that can implement all or a part of functions of the second communication apparatus.

The apparatus includes a sending unit and a receiving unit, where the receiving unit is configured to receive an eighth message from a first communication apparatus, where the eighth message is for requesting to release a DCP connection, and the eighth message includes an identifier of the first communication apparatus and a blockchain identifier: the sending unit is configured to send a ninth message to the first communication apparatus, where the ninth message indicates a DCP connection release response; and the receiving unit is configured to receive a tenth message from the first communication apparatus, where the tenth message indicates that the release of the DCP connection is completed.

It should be noted that, for an implementation process of the communication apparatus provided in the twentieth aspect of this application, refer to the implementation process described in the sixth aspect. In addition, corresponding technical effects are implemented. Details are not described herein again.

A twenty-first aspect of this application provides a communication apparatus. The apparatus may implement the method according to any one of the seventh aspect or the possible implementations of the seventh aspect. The apparatus includes a corresponding unit or module configured to perform the foregoing method. The unit or the module included in the apparatus may be implemented by software and/or hardware. For example, the apparatus may be a first communication apparatus, the apparatus may be a component (for example, a processor, a chip, or a chip system) in the first communication apparatus, or the apparatus may be a logic module or software that can implement all or a part of functions of the first communication apparatus.

The apparatus includes a sending unit and a receiving unit, where the receiving unit is configured to receive an eleventh message from a second communication apparatus, where the eleventh message is for requesting to release a DCP connection, and the eleventh message includes an identifier of the second communication apparatus and a blockchain identifier; and the sending unit is configured to send a twelfth message to the second communication apparatus, where the twelfth message indicates that the release of the DCP connection is completed.

It should be noted that, for an implementation process of the communication apparatus provided in the twenty-first aspect of this application, refer to the implementation process described in the seventh aspect. In addition, corresponding technical effects are implemented. Details are not described herein again.

A twenty-second aspect of this application provides a communication apparatus. The apparatus may implement the method according to any one of the eighth aspect or the possible implementations of the eighth aspect. The apparatus includes a corresponding unit or module configured to perform the foregoing method. The unit or the module included in the apparatus may be implemented by software and/or hardware. For example, the apparatus may be a second communication apparatus, the apparatus may be a component (for example, a processor, a chip, or a chip system) in the second communication apparatus, or the apparatus may be a logic module or software that can implement all or a part of functions of the second communication apparatus.

The apparatus includes a sending unit and a receiving unit, where the sending unit is configured to send an eleventh message to a first communication apparatus, where the eleventh message is for requesting to release a DCP connection, and the eleventh message includes an identifier of the second communication apparatus and a blockchain identifier; and the receiving unit is configured to receive a twelfth message from the first communication apparatus, where the twelfth message indicates that the release of the DCP connection is completed.

It should be noted that, for an implementation process of the communication apparatus provided in the twenty-second aspect of this application, refer to the implementation process described in the eighth aspect. In addition, corresponding technical effects are implemented. Details are not described herein again.

A twenty-third aspect of this application provides a communication apparatus. The apparatus may implement the method according to any one of the ninth aspect or the possible implementations of the ninth aspect. The apparatus includes a corresponding unit or module configured to perform the foregoing method. The unit or the module included in the apparatus may be implemented by software and/or hardware. For example, the apparatus may be a first communication apparatus, the apparatus may be a component (for example, a processor, a chip, or a chip system) in the first communication apparatus, or the apparatus may be a logic module or software that can implement all or a part of functions of the first communication apparatus.

The apparatus includes a sending unit and a receiving unit, where the sending unit is configured to send a thirteenth message to a second communication apparatus, where the thirteenth message is for requesting to set up a DCP connection, and the thirteenth message includes an identifier of the first communication apparatus, a blockchain identifier, and an identifier of first consensus mode information; and the receiving unit is configured to receive a fourteenth message from the second communication apparatus, where the fourteenth message indicates that the setup of the DCP connection fails.

It should be noted that, for an implementation process of the communication apparatus provided in the twenty-third aspect of this application, refer to the implementation process described in the ninth aspect. In addition, corresponding technical effects are implemented. Details are not described herein again.

A twenty-fourth aspect of this application provides a communication apparatus. The apparatus may implement the method according to any one of the tenth aspect or the possible implementations of the tenth aspect. The apparatus includes a corresponding unit or module configured to perform the foregoing method. The unit or the module included in the apparatus may be implemented by software and/or hardware. For example, the apparatus may be a second communication apparatus, the apparatus may be a component (for example, a processor, a chip, or a chip system) in the second communication apparatus, or the apparatus may be a logic module or software that can implement all or a part of functions of the second communication apparatus.

The apparatus includes a sending unit and a receiving unit, where the receiving unit is configured to receive a thirteenth message from a first communication apparatus, where the thirteenth message is for requesting to set up a DCP connection, and the thirteenth message includes an identifier of the first communication apparatus, a blockchain identifier, and an identifier of the first consensus mode information; and the sending unit is configured to send a fourteenth message to the first communication apparatus, where the fourteenth message indicates that the setup of the DCP connection fails.

It should be noted that, for an implementation process of the communication apparatus provided in the twenty-fourth aspect of this application, refer to the implementation process described in the tenth aspect. In addition, corresponding technical effects are implemented. Details are not described herein again.

A twenty-fifth aspect of this application provides a communication apparatus. The apparatus may implement the method according to any one of the eleventh aspect or the possible implementations of the eleventh aspect. The apparatus includes a corresponding unit or module configured to perform the foregoing method. The unit or the module included in the apparatus may be implemented by software and/or hardware. For example, the apparatus may be a first communication apparatus, the apparatus may be a component (for example, a processor, a chip, or a chip system) in the first communication apparatus, or the apparatus may be a logic module or software that can implement all or a part of functions of the first communication apparatus.

The apparatus includes a sending unit and a receiving unit, where the sending unit is configured to send a fifteenth message to a second communication apparatus, where the fifteenth message is for requesting consensus data transmission, and the fifteenth message includes an identifier of the first communication apparatus and a blockchain identifier: the receiving unit is configured to receive a sixteenth message from the second communication apparatus, where the sixteenth message indicates a consensus data transmission response; and the sending unit is configured to send first consensus data to the second communication apparatus.

It should be noted that, for an implementation process of the communication apparatus provided in the twenty-fifth aspect of this application, refer to the implementation process described in the eleventh aspect. In addition, corresponding technical effects are implemented. Details are not described herein again.

A twenty-sixth aspect of this application provides a communication apparatus. The apparatus may implement the method according to any one of the twelfth aspect or the possible implementations of the twelfth aspect. The apparatus includes a corresponding unit or module configured to perform the foregoing method. The unit or the module included in the apparatus may be implemented by software and/or hardware. For example, the apparatus may be a second communication apparatus, the apparatus may be a component (for example, a processor, a chip, or a chip system) in the second communication apparatus, or the apparatus may be a logic module or software that can implement all or a part of functions of the second communication apparatus.

The apparatus includes a sending unit and a receiving unit, where the receiving unit is configured to receive a fifteenth message from a first communication apparatus, where the fifteenth message is for requesting consensus data transmission, and the fifteenth message includes an identifier of the first communication apparatus and a blockchain identifier: the sending unit is configured to send a sixteenth message to the first communication apparatus, where the sixteenth message indicates a consensus data transmission response; and the receiving unit is configured to receive first consensus data from the first communication apparatus.

It should be noted that, for an implementation process of the communication apparatus provided in the twenty-sixth aspect of this application, refer to the implementation process described in the twelfth aspect. In addition, corresponding technical effects are implemented. Details are not described herein again.

A twenty-seventh aspect of this application provides a communication apparatus. The apparatus may implement the method according to any one of the thirteenth aspect or the possible implementations of the thirteenth aspect. The apparatus includes a corresponding unit or module configured to perform the foregoing method. The unit or the module included in the apparatus may be implemented by software and/or hardware. For example, the apparatus may be a first communication apparatus, the apparatus may be a component (for example, a processor, a chip, or a chip system) in the first communication apparatus, or the apparatus may be a logic module or software that can implement all or a part of functions of the first communication apparatus.

The apparatus includes a sending unit and a receiving unit, where the receiving unit is configured to receive a seventeenth message from a second communication apparatus, where the seventeenth message is for requesting consensus data transmission, and the seventeenth message includes an identifier of the second communication apparatus and a blockchain identifier: the sending unit is configured to send an eighteenth message to the second communication apparatus, where the eighteenth message indicates a consensus data transmission response; and the receiving unit is configured to receive second consensus data from the second communication apparatus.

It should be noted that, for an implementation process of the communication apparatus provided in the twenty-seventh aspect of this application, refer to the implementation process described in the thirteenth aspect. In addition, corresponding technical effects are implemented. Details are not described herein again.

A twenty-eighth aspect of this application provides a communication apparatus. The apparatus may implement the method according to any one of the fourteenth aspect or the possible implementations of the fourteenth aspect. The apparatus includes a corresponding unit or module configured to perform the foregoing method. The unit or the module included in the apparatus may be implemented by software and/or hardware. For example, the apparatus may be a second communication apparatus, the apparatus may be a component (for example, a processor, a chip, or a chip system) in the second communication apparatus, or the apparatus may be a logic module or software that can implement all or a part of functions of the second communication apparatus.

The apparatus includes a sending unit and a receiving unit, where the sending unit is configured to send a seventeenth message to a first communication apparatus, where the seventeenth message is for requesting consensus data transmission, and the seventeenth message includes an identifier of the second communication apparatus and a blockchain identifier: the receiving unit is configured to receive an eighteenth message from the first communication apparatus, where the eighteenth message indicates a consensus data transmission response; and the sending unit is configured to send second consensus data to the first communication apparatus.

It should be noted that, for an implementation process of the communication apparatus provided in the twenty-eighth aspect of this application, refer to the implementation process described in the fourteenth aspect. In addition, corresponding technical effects are implemented. Details are not described herein again.

A twenty-ninth aspect of embodiments of this application provides a communication apparatus, including at least one processor, where the at least one processor is coupled to a memory; the memory is configured to store a program or instructions; and the at least one processor is configured to execute the program or the instructions, so that the apparatus implements the method according to any one of the first aspect (or any one of the second aspect to the fourteenth aspect) or the possible implementations of the first aspect (or any one of the second aspect to the fourteenth aspect).

A thirtieth aspect of embodiments of this application provides a computer-readable storage medium storing one or more computer-executable instructions. When the computer-executable instructions are executed by a processor, the processor performs the method according to any one of the first aspect (or any one of the second aspect to the fourteenth aspect) or the possible implementations of the first aspect (or any one of the second aspect to the fourteenth aspect).

A thirty-first aspect of embodiments of this application provides a computer program product (which is also referred to as a computer program) that stores one or more computers. When the computer program product is executed by a processor, the processor performs the method according to any one of the first aspect (or any one of the second aspect to the fourteenth aspect) or the possible implementations of the first aspect (or any one of the second aspect to the fourteenth aspect).

A thirty-second aspect of embodiments of this application provides a chip system. The chip system includes at least one processor, configured to support a communication apparatus in implementing the function in any one of the first aspect (or any one of the second aspect to the fourteenth aspect) or the possible implementations of the first aspect (or any one of the second aspect to the fourteenth aspect).

In a possible design, the chip system may further include a memory, configured to store program instructions and data that are necessary for the communication apparatus. The chip system may consist of a chip, or may include the chip and another discrete device. Optionally, the chip system further includes an interface circuit. The interface circuit provides program instructions and/or data for the at least one processor.

A thirty-third aspect of embodiments of this application provides a communication system. The communication system includes the communication apparatus in the fifteenth aspect and the communication apparatus in the sixteenth aspect, the communication system includes the communication apparatus in the seventeenth aspect and the communication apparatus in the eighteenth aspect, the communication system includes the communication apparatus in the nineteenth aspect and the communication apparatus in the twentieth aspect, the communication system includes the communication apparatus in the twenty-first aspect and the communication apparatus in the twenty-second aspect, the communication system includes the communication apparatus in the twenty-third aspect and the communication apparatus in the twenty-fourth aspect, the communication system includes the communication apparatus in the twenty-fifth aspect and the communication apparatus in the twenty-sixth aspect, the communication system includes the communication apparatus in the twenty-seventh aspect and the communication apparatus in the twenty-eighth aspect, and/or the communication system includes the communication apparatus in the twenty-ninth aspect.

For technical effects brought by any design manner of the fifteenth aspect to the thirty-third aspect, refer to the technical effects brought by different implementations of the first aspect to the fourteenth aspect. Details are not described herein again.

It can be learned from the foregoing technical solutions that the different communication apparatuses may exchange the messages based on the DCP communication protocol to complete the process such as the DCP initial access process, the DCP connection setup, the DCP connection setup rejection, or the blockchain consensus data transmission, where the DCP communication protocol is the protocol for the blockchain communication, so that the process of the blockchain-based communication between the different communication apparatuses can be implemented without the need to take the longer path via the application server or the external blockchain, and the communication path can be shortened, thereby improving the communication efficiency.

DESCRIPTION OF EMBODIMENTS

Figure 1:
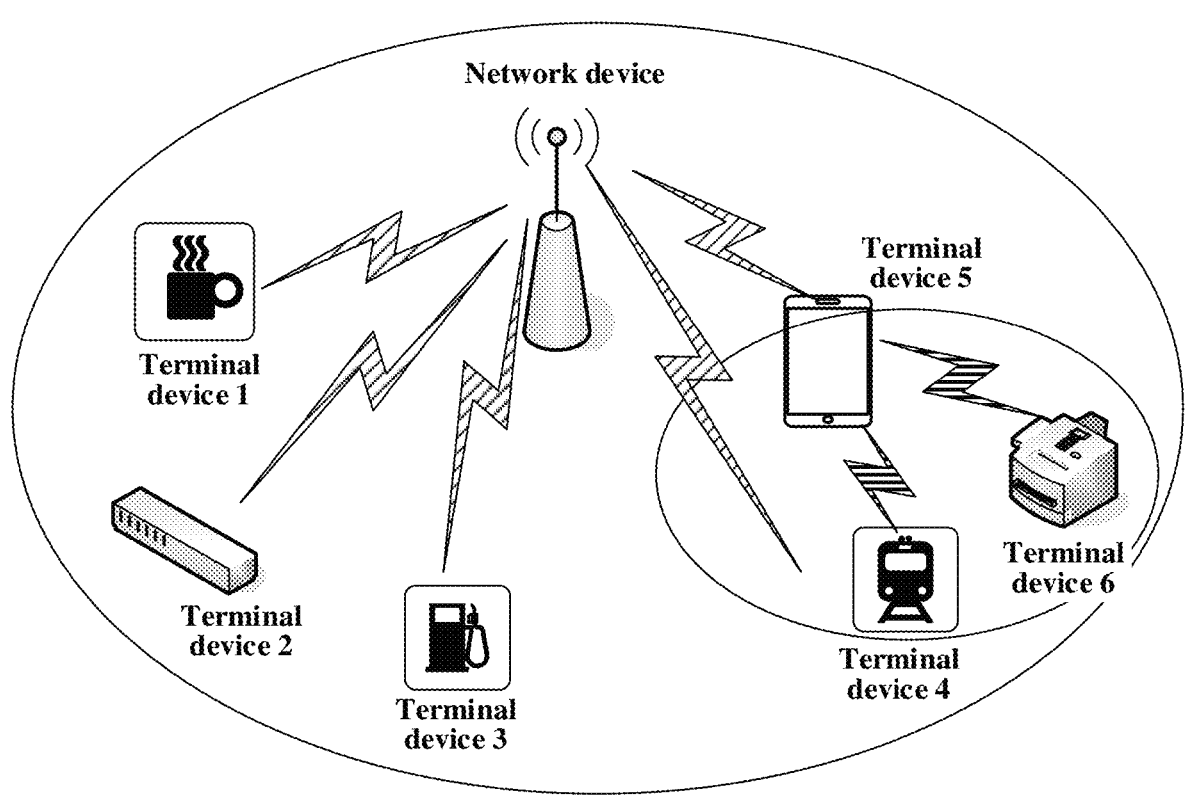
FIG. 1 is a schematic diagram of a communication system according to this application.

The following describes the technical solutions in embodiments of this application with reference to the accompanying drawings in embodiments of this application. All other embodiments obtained by a person of ordinary skill in the art based on embodiments of this application without creative efforts shall fall within the protection scope of this application.

First, some terms in embodiments of this application are explained and described, to facilitate understanding of a person skilled in the art.

(1) A terminal device may be a wireless terminal device that can receive scheduling and indication information of a network device. The wireless terminal device may be a device that provides voice and/or data connectivity for a user, a handheld device with a wireless connection function, or another processing device connected to a wireless modem.

The terminal device may communicate with one or more core networks or the internet through a radio access network (RAN). The terminal device may be a mobile terminal device such as a mobile phone (which is also referred to as a "cellular" phone or a mobile phone (mobile phone)), a computer, and a data card. For example, the terminal device may be a portable, pocket-sized, handheld, computer built-in, or in-vehicle mobile apparatus that exchanges a voice and/or data with the radio access network. For example, the terminal device may be a device such as a personal communication service (PCS) phone, a cordless phone, a session initiation protocol (SIP) phone, a wireless local loop (WLL) station, a personal digital assistant (PDA), a tablet computer (Pad), and a computer with a wireless transceiving function. The wireless terminal device may also be referred to as a system, a subscriber unit (subscriber unit), a mobile station (mobile station, MS), a remote station (remote station), an access point (access point, AP), a remote terminal device (access terminal), an access terminal device (access terminal), a user terminal device (user terminal), a user agent (user agent), a subscriber station (SS), customer premises equipment (CPE), a terminal (terminal), user equipment (UE), a mobile terminal (MT), or the like.

By way of example but not limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

In addition, the terminal device may alternatively be a terminal device in a future communication system (for example, a sixth generation (6G) communication system), a terminal device in a future evolved public land mobile network (PLMN), or the like. For example, a 6G network may further expand a form and a function of a fifth generation (5G) communication terminal. A 6G terminal includes but is not limited to a vehicle, a cellular network terminal (integrating a satellite terminal function), an uncrewed aerial vehicle, and an IoT.

(2) A network device may be a device in a wireless network. For example, the network device may be a RAN node (or device) that enables a terminal device to access the wireless network, and may also be referred to as a base station. Currently, some examples of the RAN device are a base station gNB (gNodeB) in a 5G communication system, a transmission reception point (TRP), an evolved NodeB (eNB), a radio network controller (RNC), a NodeB (NB), a home base station (for example, a home evolved NodeB, or a home NodeB, HNB), a base band unit (BBU), or a wireless fidelity (Wi-Fi) access point AP. In addition, in a network structure, the network device may include a central unit (CU) node, a distributed unit (DU) node, or a RAN device including the CU node and the DU node.

The network device can send configuration information (for example, carried in a scheduling message and/or an indication message) to the terminal device, and the terminal device further performs network configuration based on the configuration information, so that network configurations of the network device and the terminal device are aligned. Alternatively, network configurations of the network device and the terminal device are aligned by using a network configuration preset in the network device and a network configuration preset in the terminal device. "Alignment" means that when there is a message exchange between the network device and the terminal device, the network device and the terminal device have a consistent understanding of a carrier frequency for sending and receiving an exchanged message, determining of a type of the exchanged message, a meaning of field information carried in the exchanged message, or another configuration of the exchanged message.

In addition, in another possible case, the network device may be another apparatus that provides a wireless communication function for the terminal device. A specific technology and a specific device form that are used for the network device are not limited in embodiments of this application. For ease of description, this is not limited in embodiments of this application.

The network device may further include a core network device. For example, the core network device includes network elements such as a mobility management entity (MME), a home subscriber server (HSS), a serving gateway (S-GW), a policy and charging rules function (PCRF), and a public data network gateway (P-GW) in a fourth generation (4G) network and an access and mobility management function (AMF), a user plane function (UPF), or a session management function (SMF) in a 5G network. In addition, the core network device may further include another core network device in the 5G network and a next generation network of the 5G network.

In embodiments of this application, an apparatus configured to implement a function of the network device may be the network device, or may be an apparatus, for example, a chip system, that can support the network device in implementing the function. The apparatus may be installed in network device. In the technical solutions provided in embodiments of this application, an example in which the apparatus configured to implement the function of the network device is the network device is used to describe the technical solutions provided in embodiments of this application.

(3) Both configuration and preconfiguration are used in this application. The configuration means that a base station/a server sends configuration information of some parameters or parameter values to a terminal via a message or signaling, so that the terminal determines a communication parameter or a transmission resource based on the values or the information. Similar to the configuration, the pre-configuration may mean that the base station/the server negotiates parameter information or a parameter value with the terminal device in advance, may mean that a standard protocol specifies parameter information or a parameter value used by the base station/the server or the terminal device, or may mean that the base station/the server or the terminal device pre-stores parameter information or a parameter value. This is not limited in this application.

Further, these values and parameters may be changed or updated.

(4) Terms "system" and "network" in embodiments of this application may be used interchangeably. "A plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following" or a similar expression thereof indicates any combination of the items, and includes a singular item or any combination of plural items. For example, "at least one of A, B, and C" includes A, B, C, AB, AC, BC, or ABC. In addition, unless otherwise stated, ordinal numbers such as "first" and "second" in embodiments of this application are for distinguishing between a plurality of objects, but are not for limiting an order, a time sequence, priorities, or importance of the plurality of objects.

In this application, unless otherwise specified, for identical or similar parts in embodiments, refer to each other. In embodiments of this application and the implementations/ implementation methods in embodiments, unless otherwise specified or a logical conflict occurs, terms and/or descriptions are consistent and may be mutually referenced between different embodiments and between the implementations/ implementation methods in embodiments. Technical features in the different embodiments and the implementations/ implementation methods in embodiments may be combined to form a new embodiment, implementation, or implementation method based on an internal logical relationship thereof. The following implementations of this application do not limit the protection scope of this application.

This application may be applied to a long term evolution (LTE) system, a new radio (NR) system, or another communication system (for example, 6G). The communication system includes a network device and a terminal device. The network device is used as a configuration information sending entity, and the terminal device is used as a configuration information receiving entity. In the communication system, an entity sends configuration information to another entity: and sends data to the another entity, or receives data sent by the another entity. The another entity receives the configuration information; and sends the data to the configuration information sending entity based on the configuration information, or receives the data sent by the configuration information sending entity.

FIG. 1 is a schematic diagram of a communication system according to this application. FIG. 1 shows an example of a network device 101 and six terminal devices. The six terminal devices are a terminal device 1, a terminal device 2, a terminal device 3, a terminal device 4, a terminal device 5, and a terminal device 6. In the example shown in FIG. 1, an example in which the terminal device 1 is a smart teacup, the terminal device 2 is a smart air conditioner, the terminal device 3 is a smart fuel dispenser, the terminal device 4 is a transport means, the terminal device 5 is a mobile phone, and the terminal device 6 is a printer is used for description.

As shown in FIG. 1, a configuration information sending entity may be the network device. Configuration information receiving entities may be the terminal device 1 to the terminal device 6. In this case, the communication system consists of the network device and the terminal device 1 to the terminal device 6. In the communication system, the terminal device 1 to the terminal device 6 may send uplink data to the network device, and the network device needs to receive the uplink data sent by the terminal device 1 to the terminal device 6. In addition, the network device may send configuration information to the terminal device 1 to the terminal device 6.

For example, in FIG. 1, a communication system may alternatively consist of the terminal device 4 to the terminal device 6. The terminal device 5 is used as a network device, namely, a configuration information sending entity. The terminal device 4 and the terminal device 6 are used as terminal devices, namely, configuration information receiving entities. For example, in an internet of vehicles system, the terminal device 5 separately sends configuration information to the terminal device 4 and the terminal device 6, and receives uplink data sent by the terminal device 4 and the terminal device 6. Accordingly, the terminal device 4 and the terminal device 6 receive the configuration information sent by the terminal device 5, and send the uplink data to the terminal device 5.

The communication system shown in FIG. 1 may be used in a communication network that consists of space, air, ground, and sea in terms of space and that may consist of a plurality of players in terms of role composition. An actual network carrier may consist of a part or all of a satellite network, a low and medium altitude platform such as an uncrewed aerial vehicle, a cellular network, an internet of vehicles, an internet of things (IoT) network, an overwater network, an underwater network, and the like.

In the communication network, a new trustworthiness technology needs to be introduced, where the trustworthiness technology includes security, privacy, reliability, and resilience. A unique consensus and smart contract mechanism of a blockchain brings a new opportunity for multiparty trust in dispersed networks, and the blockchain becomes one of potential candidate technologies for the communication network (for example, 6G). In an ultralarge-scale access and decentralized networking mode of the communication network, fast mutual trust, and effective recording and reviewing of network behavior and operational data are wide requirements. Currently, a blockchain technology may satisfy the foregoing security requirement. The communication network and the blockchain may be independently expanded, evolved, and developed, and there is no tightly coupled interaction or gap. New trustworthiness technology systems such as a wireless communication network and the blockchain will bring more security assurance means and a more flexible security mechanism for the communication network. Adding an independent security function to implement the wireless communication network and a bidirectional blockchain/a trustworthiness technology is a key to satisfying this requirement.

It is usually considered that the blockchain generates and stores data in a unit of a block, and connects the data into a chain data structure based on a time sequence. All nodes participate in data verification, storage, and maintenance in a blockchain system together. A consensus needs to be reached to create a block. In addition, the created block is broadcast to the nodes to implement network-wide synchronization, and then cannot be changed or deleted. As a new-type decentralized distributed ledger, the unique consensus and smart contract mechanism of the blockchain brings a new opportunity for a multi-party joint network trustworthiness capability in a decentralized network.

In conclusion, an objective of the solutions is to combine the communication network, a communication terminal, and the blockchain, to implement a multi-party mutual trust mechanism and platform. The 6G communication network is used as an example. In the 6G communication network, a terminal is an important component that supports a 6G service application, and a form and a function of the terminal also greatly change. For example, computing and communication capabilities of a vehicle are greatly improved, and a basic requirement for blockchain running may be satisfied. In addition, a blockchain that is precisely designed based on a communication network requirement may also support terminals in more forms.

However, how to implement communication based on the blockchain is an urgent technical problem to be resolved.

Currently, it is proposed that the blockchain be used as an external database. When nodes in a network work as blockchain nodes, the nodes need to join and access the blockchain and complete interaction as applications by using protocols at and above an internet protocol (IP) layer. This greatly increases a quantity of interaction nodes and a processing hierarchy. However, the increase of the quantity of blockchain nodes and a processing layer severely affects performance such as network service response time and a throughput. In many scenarios of the communication network, a plurality of players need to participate together, and there is a higher performance requirement on a delay and the like. In addition, closed loops of some services in the communication network are completed on a RAN side, and the services do not need to access a core network or an application server as applications.

Therefore, that the communication network uses the blockchain, which is commonly mentioned in the industry, means that a service application based on a basic communication network uses the blockchain. For example, an IoT application set up in a 5G network uses a tamper resistance capability and a consensus and smart contract capability of the blockchain. Therefore, the concept of the blockchain in the communication network is a general concept. From the technical perspective, the communication network is not deeply integrated with the foregoing capabilities of the blockchain.

In conclusion, a design of the blockchain in the communication network needs to be considered, to provide a blockchain-based communication method and apparatus.

To resolve the foregoing problem, this application provides a communication method and apparatus, to implement a blockchain-based communication process. The following describes this application in a plurality of aspects with reference to the accompanying drawings.

In embodiments of this application, different nodes in a communication network can complete blockchain-based communication in a data consensus protocol (DCP) interaction process. Optionally, a DCP protocol layer may include a control plane (Control Plane) and a user plane (User Plane). The following provides detailed descriptions by using examples shown in FIG. 2 and FIG. 3. It should be noted that, in the following examples, an example in which a first communication apparatus is a terminal device (denoted as an xUE) and a second communication apparatus is an access network device (denoted as an xNB) is used for description.

Figure 2:
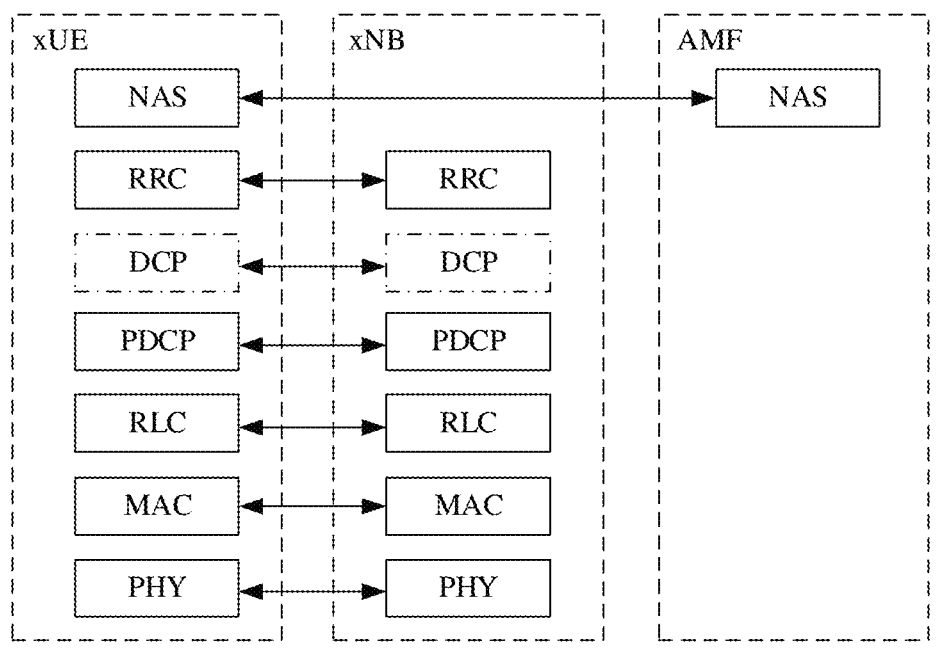
FIG. 2 is a schematic diagram of protocol stack interaction in a communication method according to this application.

As shown in FIG. 2, for a control plane function, a communication protocol supported between the xUE and the xNB may include at least one of a radio resource control (RRC) protocol, a packet data convergence protocol (packet data convergence protocol, PDCP), a radio link control (RLC) protocol, a media access control (MAC) layer protocol, and a physical (PHY) layer protocol. In addition, transmission of a non-access stratum (NAS) message may be implemented between the xUE and a core network device (for example, an AMF) through forwarding of the xNB. In this application, for the control plane function, DCP is newly added between the UE and the xNB, to implement a part or all of functions such as blockchain configuration information broadcasting, access of a blockchain node to a blockchain, DCP connection setup, retention, and release, and consensus algorithm selection.

Figure 3:
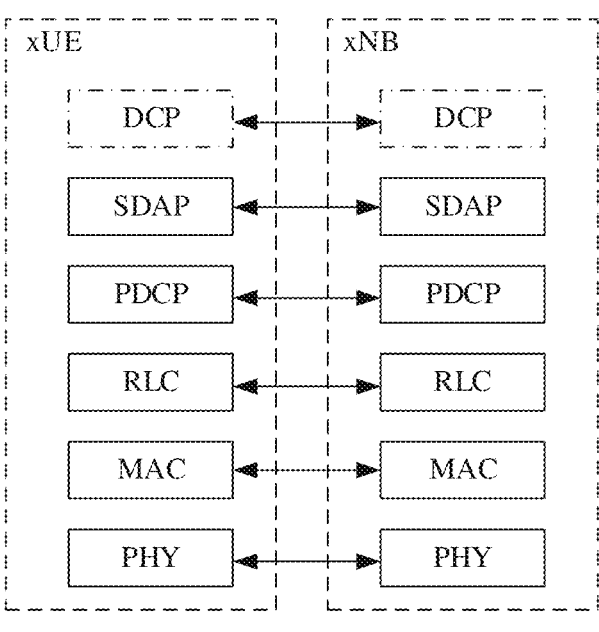
FIG. 3 is another schematic diagram of protocol stack interaction in a communication method according to this application.

As shown in FIG. 3, for a user plane function, a communication protocol supported between the xUE and the xNB may include at least one of a service data adaptation protocol (SDAP), PDCP, an RLC protocol, a MAC layer protocol, and a PHY layer protocol. In this application, for the user plane function, DCP is newly added between the UE and the xNB, to implement a part or all of functions such as transmission of data on which a consensus needs to be reached, consensus algorithm running, and reaching of a consensus between nodes.

Figure 4:
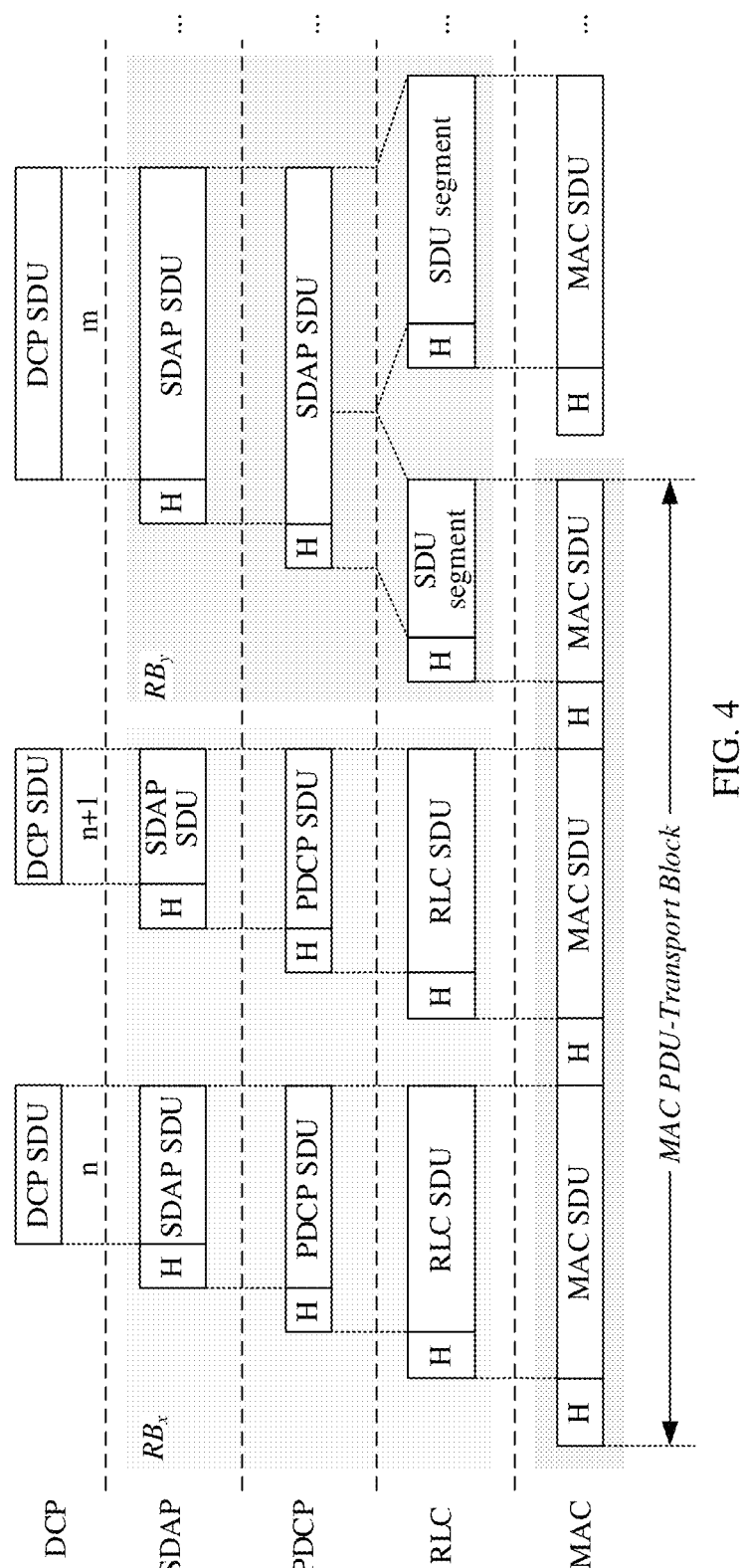
FIG. 4 is a schematic diagram of data processing in a communication method according to this application.

Optionally, a data transmission process of the user plane function shown in FIG. 3 may be further implemented by using an example shown in FIG. 4. FIG. 4 is a schematic diagram of a data stream transmission process of network nodes. Data blocks that need to be communicated include a first resource block (RB) (denoted as an RBx) and a second resource block (denoted as an RBy).

In a processing process of DCP, generated data units include a DCP service data unit (service data unit, SDU) numbered n, a DCP SDU numbered n+1, and a DCP SDU numbered m.

In a processing process of SDAP, processing is performed based on each DCP SDU of DCP, and a corresponding SDAP SDU may be generated.

In a processing process of PDCP, processing is performed based on each SDAP SDU of SDAP, and a corresponding PDCP SDU may be generated.

In a processing process of an RLC protocol, processing is performed based on each PDCP SDU of PDCP, and a corresponding RLC SDU may be generated. It should be noted that, in the implementation example shown in FIG. 4, because the DCP SDU numbered m is excessively large (e.g., greater than a first threshold), a PDCP SDU corresponding to the DCP SDU numbered m needs to be segmented to obtain at least two SDU segments.

Optionally, because the DCP SDU numbered n and the DCP SDU numbered n+1 are not excessively large (e.g., less than a second threshold, where the second threshold is less than or equal to the first threshold), the DCP SDU numbered n and the DCP SDU numbered n+1 do not need to be segmented.

In a processing process of a MAC protocol, a transport block is generated by connecting two RLC protocol data units (PDUs) from the RBx and one RLC PDU from the RBy.

Optionally, in the implementation example shown in FIG. 4, because a data unit in the MAC protocol has a fixed length, the length needs to be filled. In this way, in the first media access control protocol data unit-transport block (MAC PDU-Transport Block) generated in the MAC protocol, one part includes the DCP SDUs (numbered n and numbered n+1) respectively corresponding to the two RLC PDUs from the RBx, and the other part includes the RLC PDU from the RBy, which is a former segment obtained through segmentation of a DCP SDU data packet (numbered m).

Optionally, in the implementation example shown in FIG. 4, the second MAC PDU-transport block generated in the MAC protocol includes the RLC PDU from the RBy, where the RLC PDU is a latter segment obtained through the segmentation of the DCP SDU data packet (numbered m).

For example, the DCP protocol layer provided in this application may be for completing at least one of the following blockchain communication: blockchain configuration information broadcasting, node access chain confirmation, data consensus connection management, consensus algorithm selection, or consensus data transmission.

The following describes this application by using more accompanying drawings and embodiments.

Figure 5:
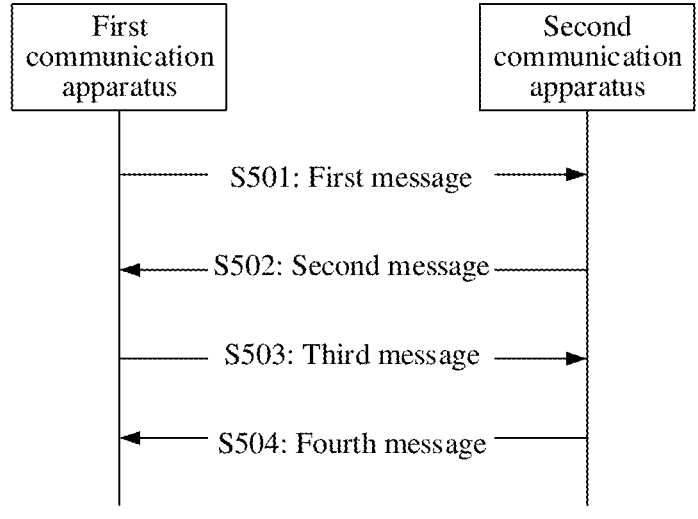
FIG. 5 is a schematic diagram of a communication method according to this application.

FIG. 5 is a schematic diagram of a communication method according to this application. The method includes the following steps.

S501: A first communication apparatus sends a first message to a second communication apparatus.

In this embodiment, the first communication apparatus sends the first message to the second communication apparatus in step S501. Accordingly, the second communication apparatus receives the first message from the first communication apparatus in step S501.

In step S501, the first message is for requesting to set up DCP initial access, and the first message includes an identifier (which is also referred to as a player identifier (player ID)) of the first communication apparatus and a group identifier (Group ID). For example, the group identifier may be a blockchain identifier.

Optionally, the identifier that is of the first communication apparatus and that is carried in the first message indicates that the first message is for requesting to set up DCP initial access of the first communication apparatus, and the blockchain identifier carried in the first message indicates that the first message is for requesting to set up DCP initial access on a blockchain corresponding to the identifier.

Optionally, the first message further includes permission information and contract information (for example, a group contract identifier (Group contract ID), where an example is a blockchain contract identifier). The permission information indicates operation permission of the first communication apparatus on the blockchain, for example, read/write permission (read/write permission, R/W permission). The contract information indicates that the first message is for requesting to set up initial access on a blockchain contract corresponding to the contract information.

It should be noted that, in communication methods shown in FIG. 2 and other subsequent accompanying drawings, the first communication apparatus may be a terminal device, the second communication apparatus may be a network device (for example, an access network device, a core network device, or a terminal device other than the first communication apparatus in a sidelink (SL) communication system). Alternatively, the second communication apparatus may be a terminal device other than the first communication apparatus in an SL communication system. This is not limited herein.

S502: The second communication apparatus sends a second message to the first communication apparatus.

In this embodiment, the second communication apparatus sends the second message to the first communication apparatus in step S502. Accordingly, the first communication apparatus receives the second message from the second communication apparatus in step S502.

Optionally, after the second communication apparatus receives the first message in step S501, the second communication apparatus may determine, based on the first message (at least one of the identifier of the first communication apparatus, the blockchain identifier, the permission information, and the contract information that are included), a consensus mode set for which access of the first communication apparatus is allowed (which is also referred to as a consensus mode set for which the first communication apparatus supports access), and send the second message to the first communication apparatus in step S502, to indicate the consensus mode set.

Optionally, the consensus mode set may include one or more consensus modes.

For example, if the second communication apparatus determines, based on the first message, that there is only one consensus mode for which the access of the first communication apparatus is allowed (or in other words, there is only one consensus mode for which the first communication apparatus supports the access), the consensus mode set indicated by the second message may include the only one consensus mode.

For another example, if the second communication apparatus determines, based on the first message, that there are a plurality of consensus modes for which the access of the first communication apparatus is allowed (or in other words, there are a plurality of consensus modes for which the first communication apparatus supports the access), the consensus mode set indicated by the second message may include the plurality of consensus modes.

For example, if the second communication apparatus determines, based on the first message, that there is no consensus mode for which the access of the first communication apparatus is allowed (or in other words, there is no consensus mode for which the first communication apparatus supports the access), the second communication apparatus may skip step S502 and step S503, but perform step S504, and indicate, by using a fourth message sent in step S504, that the DCP initial access fails.

In step S502, the second message indicates the consensus mode set for blockchain communication. In other words, the second message indicates a parameter that needs to be reported by the first communication apparatus (the parameter is included in the consensus mode set).

In a possible implementation, the consensus mode set includes the one or more consensus modes, and each consensus mode includes at least one of the following information: a blockchain type, a chain structure, a consensus algorithm, an incentive mechanism, a contract template, a resource type, a packet delay budget, a packet error rate, energy consumption, or a computation amount.

For example, the blockchain type may include a public chain, a consortium chain, a private chain, and the like. The chain structure may include an undirected acyclic graph, a directed acyclic graph (DAG), and the like. The consensus algorithm may include a proof-of-work (PoW) algorithm, a Byzantine algorithm, and the like. The incentive mechanism may include a block currency token, a wireless resource, and the like. The resource type may include a block in time domain, a block in frequency domain, and the like.

Optionally, the second message sent by the second communication apparatus in step S502 may include an index value of the consensus mode included in the consensus mode set, include an identifier of the consensus mode included in the consensus mode set, or indicate the consensus mode set in another manner. This is not limited herein.

S503: The first communication apparatus sends a third message to the second communication apparatus.

In this embodiment, the first communication apparatus sends the third message to the second communication apparatus in step S503. Accordingly, the second communication apparatus receives the third message from the first communication apparatus in step S503. The third message indicates first consensus mode information in the consensus mode set.

Optionally, after the first communication apparatus receives the second message in step S502, the first communication apparatus may determine the first consensus mode based on the consensus mode set indicated by the second message, and send the third message to the second communication apparatus in step S503, to indicate the first consensus mode.

Optionally, in step S503, the third message includes the identifier of the first communication apparatus, the blockchain identifier, and an identifier of the first consensus mode information in the consensus mode set. The identifier of the first consensus mode information indicates a consensus mode selected by the first communication apparatus from the consensus mode set indicated by the second message. In other words, a parameter indicated by the first consensus mode information is a parameter selected by the first communication apparatus, for example, one or more of the blockchain type, the chain structure, the consensus algorithm, the incentive mechanism, the contract template, the resource type, the packet delay budget, the packet error rate, the energy consumption, or the computation amount.

Optionally, the third message indicates the first consensus mode selected by the first communication apparatus from the consensus mode set, the third message indicates the first consensus mode information expected by the first communication apparatus, or the third message indicates the first consensus mode information supported by the first communication apparatus.

S504: The second communication apparatus sends the fourth message to the first communication apparatus.

In this embodiment, the second communication apparatus sends the fourth message to the first communication apparatus in step S504. Accordingly, the first communication apparatus receives the fourth message from the second communication apparatus in step S504. The fourth message indicates that the DCP initial access succeeds or fails.

Optionally, after the second communication apparatus receives the third message in step S503, the second communication apparatus may determine, based on the third message (at least one of the identifier of the first communication apparatus, the blockchain identifier, and the identifier of the first consensus mode information in the consensus mode set that are included), whether to allow the DCP initial access of the first communication apparatus, and send the fourth message to the first communication apparatus in step S504, to indicate that the DCP initial access succeeds or fails.

Optionally, in step S504, a reason why the fourth message indicates that the DCP initial access fails may be that the first communication apparatus is an unauthorized user, that a resource is inadequate, or the like. Optionally, after step S504, the first communication apparatus may start a timer, and re-initiate the DCP initial access when the timer expires: after step S504, the first communication apparatus may re-initiate DCP initial access for a second consensus mode to the second communication apparatus, where the second consensus mode is a consensus mode other than the first consensus mode in the consensus mode set indicated by the second message: or after step S504, the first communication apparatus performs another operation. This is not limited herein.

Optionally, in step S504, a reason why the fourth message indicates that the DCP initial access succeeds may be that the first communication apparatus is an authorized user, that a resource is adequate, or the like.

Optionally, in step S504, if the fourth message indicates that the DCP initial access succeeds, after the second communication apparatus sends the fourth message to the first communication apparatus in step S504, the method further includes: The second communication apparatus sends a thirty-first message to a third communication apparatus, where the thirty-first message indicates a DCP initial access response, and the thirty-first message includes the identifier of the first communication apparatus, the blockchain identifier, and the identifier of the first consensus mode information. The second communication apparatus may further exchange, with the third communication apparatus, the thirty-first message that indicates the DCP initial access response, to indicate, to the third communication apparatus, that the DCP initial access of the first communication apparatus succeeds. The third communication apparatus may include a terminal device other than the first communication apparatus, or the third communication apparatus may include a network device (for example, an access network device or a core network device) other than the second communication apparatus.

Based on the technical solution shown in FIG. 5, after the first communication apparatus sends, to the second communication apparatus in step S501, the first message that is for requesting to set up the DCP initial access, the first communication apparatus receives, from the second communication apparatus in step S502, the second message that indicates the consensus mode set for the blockchain communication. Then, the first communication apparatus sends, to the second communication apparatus in step S503, the third message that includes the identifier of the first consensus mode information selected by the first communication apparatus from the consensus mode set, so that the second communication apparatus sends, to the first communication apparatus based on the third message in step S504, the fourth message that indicates that the DCP initial access succeeds or fails. In this way, different communication apparatuses may exchange messages based on a DCP communication protocol to complete a DCP initial access process, where the DCP communication protocol is a protocol for blockchain communication, so that a process of blockchain-based communication between the different communication apparatuses can be implemented without a need to take a longer path via an application server or an external blockchain, and a communication path can be shortened, thereby improving communication efficiency.

In the communication process shown in FIG. 5, different nodes in a communication network can complete a blockchain-based communication process in a communication protocol interaction process. In a specific implementation process, a process of verifying the first message that is for requesting to set up the DCP initial access may be implemented based on a plurality of manners. The following separately provides descriptions.

Implementation 1: An Access Network Device Performs the Verification Process.

In the implementation 1, the second communication apparatus includes the access network device. After receiving the first message in step S501, the second communication apparatus verifies the first message based on at least one of the identifier of the first communication apparatus, the blockchain identifier, the permission information, and the contract information that are included in the first message. The second communication apparatus performs step S502 only after the verification succeeds and it is determined that the DCP initial access to the first communication apparatus is to be set up.

Figure 6:
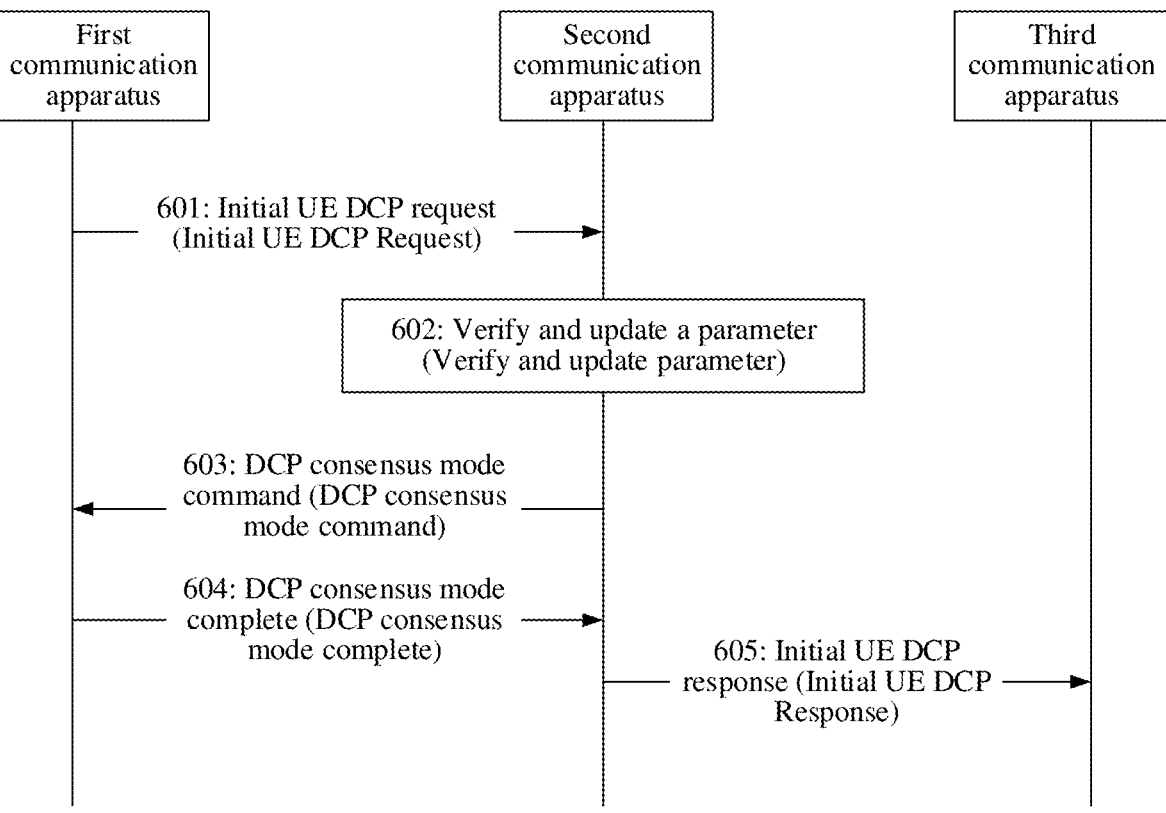
FIG. 6 is another schematic diagram of a communication method according to this application.

The following uses an implementation process shown in FIG. 6 as an example to describe the implementation 1. It should be noted that, in the implementation process shown in FIG. 6, an example in which the first communication apparatus that initiates the DCP initial access is a terminal device and the access network device (namely, the second communication apparatus) that performs a DCP initial access verification process is a network device is used for description.

FIG. 6 is another schematic diagram of a communication method according to this application. The method includes the following steps.

601: A first communication apparatus sends an initial UE DCP request message to a second communication apparatus. Accordingly, the second communication apparatus receives the initial UE DCP request message. The initial UE DCP request message carries a player ID, a group ID, a group contract ID, and R/W permission. 602: The second communication apparatus verifies and updates a parameter.

Optionally, in step 602, the second communication apparatus may perform verification and update based on a parameter (namely, at least one of the player ID, the group ID, the group contract ID, and the R/W permission) included in the initial UE DCP request message received in step 601.

Optionally, a verification process may include the following examples:

Example 1: The second communication apparatus may verify the player ID included in the initial UE DCP request message. That is, the second communication apparatus verifies, based on the player ID, whether the first communication apparatus is an authorized user. If yes, step 603 is performed: or if no, the second communication apparatus sends, to the first communication apparatus, a message that indicates that DCP initial access fails.

Example 2: The second communication apparatus may verify the R/W permission included in the initial UE DCP request message. That is, the second communication apparatus verifies, based on the R/W permission, whether the first communication apparatus has permission. If yes, step 603 is performed: or if no, the second communication apparatus sends, to the first communication apparatus, a message that indicates that DCP initial access fails.

Example 3: The second communication apparatus may verify the group ID or the group contract ID included in the initial UE DCP request message. That is, the second communication apparatus verifies, based on the group ID or the group contract ID, whether the second communication apparatus has a capability of performing communication on a blockchain corresponding to the group ID or the group contract ID. If yes, step 603 is performed: or if no, the second communication apparatus sends, to the first communication apparatus, a message that indicates that DCP initial access fails.

Optionally, an update process may include: The second communication apparatus updates, based on the parameter included in the initial UE DCP request message, a parameter (for example, information about a blockchain to which the first communication apparatus supports access and permission information of the first communication apparatus on the blockchain corresponding to the group ID or the group contract ID) that is associated with the first communication apparatus and that is prestored in the second communication apparatus.

603: The second communication apparatus sends a DCP consensus mode command message to the first communication apparatus. Accordingly, the first communication apparatus receives the DCP consensus mode command message.

Optionally, after the second communication apparatus receives the initial UE DCP request message, the second communication apparatus may determine, based on the initial UE DCP request message (at least one of the player ID, the group ID, the group contract ID, and the R/W permission that are included), a consensus mode set for which access of the first communication apparatus is allowed (which is also referred to as a consensus mode set for which the first communication apparatus supports access), and send the DCP consensus mode command message to the first communication apparatus in step 603, to indicate the consensus mode set.

604: The first communication apparatus sends a DCP consensus mode complete message to the second communication apparatus. Accordingly, the second communication apparatus receives the DCP consensus mode complete message. The DCP consensus mode complete message carries the player ID, the group ID, and a consensus mode.

Optionally, after the first communication apparatus receives the DCP consensus mode command message, the first communication apparatus may determine a first consensus mode based on the consensus mode set indicated by the DCP consensus mode command message, and send the DCP consensus mode complete message to the second communication apparatus in step 604, to indicate the first consensus mode.

In addition, after step 604, the second communication apparatus may further send a response message (not shown in FIG. 6) to the first communication apparatus, to indicate that the DCP initial access succeeds or fails.

605: The second communication apparatus sends an initial UE DCP response to a third communication apparatus, where the initial UE DCP response carries the player ID, the group ID, and the consensus mode.

In the implementation process shown in FIG. 6, the initial UE DCP request message is an implementation example of the first message sent by the first communication apparatus in step S501 in the example shown in FIG. 5, the DCP consensus mode command message is an implementation example of the second message sent by the second communication apparatus in step S502 in the example shown in FIG. 5, and the DCP consensus mode complete message is an implementation example of the third message sent by the first communication apparatus in step S503 in the example shown in FIG. 5. In addition, for related steps shown in FIG. 6, refer to the related steps in FIG. 5. In addition, corresponding technical effects are implemented. Details are not described herein again.

In this way, based on the implementation shown in FIG. 6, the second communication apparatus may locally implement the process of verifying the DCP initial access of the first communication apparatus, so that a closed loop of a process of communication performed between different communication apparatuses based on a DCP protocol is implemented on a RAN side, to reduce a delay and improve a throughput.

Implementation 2: A Core Network Device Performs the Verification Process.

In the implementation 2, the second communication apparatus includes an access network device and the core network device. After the access network device receives the first message in step S501, the access network device forwards the first message to the core network device. Then, the core network device verifies the first message, and notifies the access network device of a verification result after the verification succeeds and it is determined that the DCP initial access to the first communication apparatus is to be set up, so that the access network device performs step S502.

Figure 7:
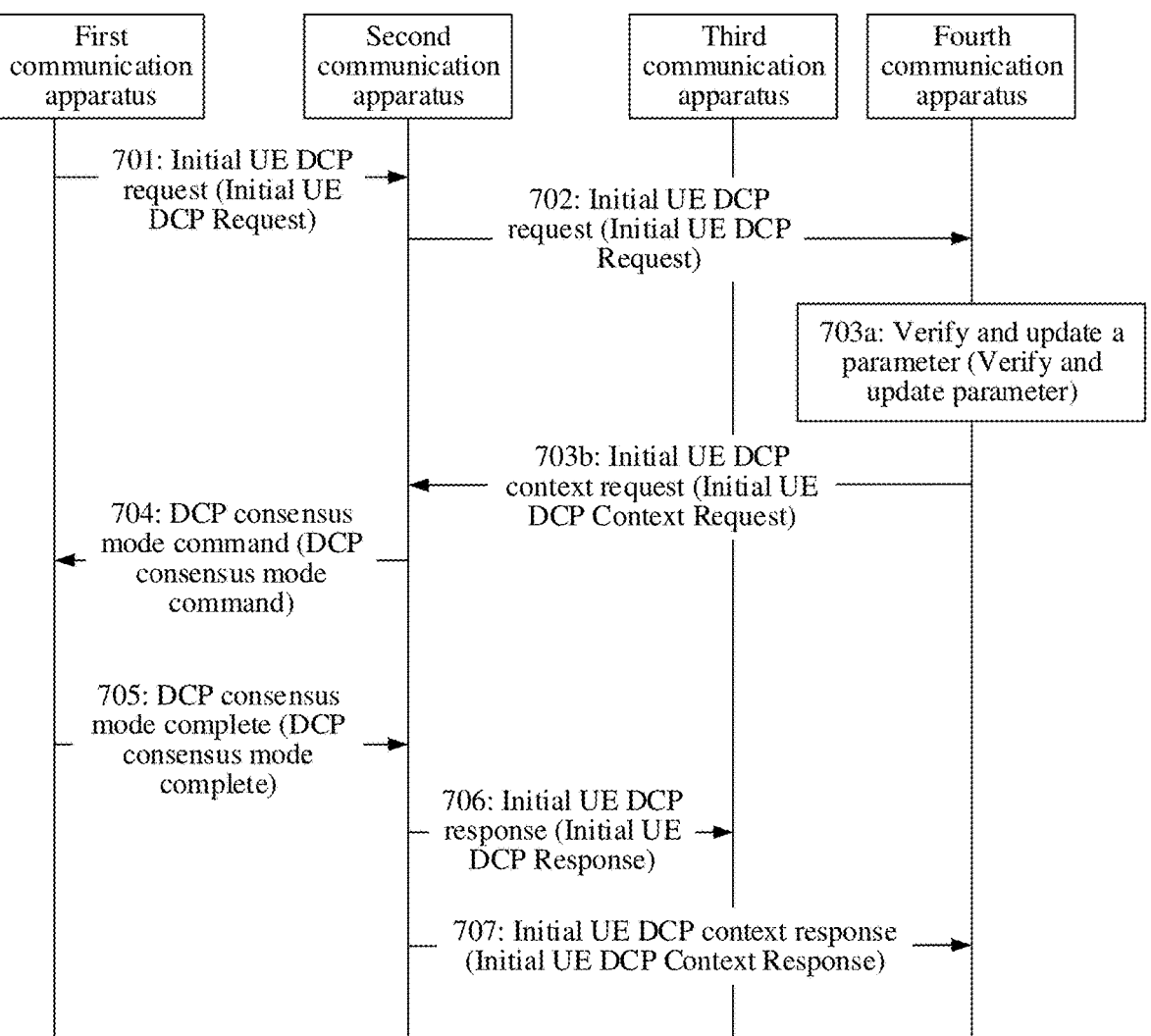
FIG. 7 is another schematic diagram of a communication method according to this application.

The following uses an implementation process shown in FIG. 7 as an example to describe the implementation 2. It should be noted that, in an implementation process shown in FIG. 7, an example in which the first communication apparatus that initiates the DCP initial access is a terminal device and the core network device that performs a DCP initial access verification process is a fourth communication apparatus is used for description.

FIG. 7 is another schematic diagram of a communication method according to this application. The method includes the following steps.

701: A first communication apparatus sends an initial UE DCP request to a second communication apparatus. Accordingly, the second communication apparatus receives the initial UE DCP request from the first communication apparatus.

The initial UE DCP request message carries at least one of a player identifier (Player ID) of the first communication apparatus, a group identifier (Group ID), a group contract identifier (Group contract ID), and permission information (read/write permission, R/W permission).

702: The second communication apparatus sends an initial UE DCP request to a fourth communication apparatus. Accordingly, the fourth communication apparatus receives the initial UE DCP request from the second communication apparatus.

The initial UE DCP request carries at least one of the player ID of the first communication apparatus, the group ID, the group contract ID, and the R/W permission.

703a: The fourth communication apparatus verifies and updates a parameter.

Optionally, in step 703a, the fourth communication apparatus may perform verification and update based on a parameter (namely, the at least one of the player ID, the group ID, the group contract ID, and the R/W permission) included in the initial UE DCP request message received in step 702.

Optionally, a verification process may include the following examples:

Example 1: The fourth communication apparatus may verify the player ID included in the initial UE DCP request message. That is, the fourth communication apparatus verifies, based on the player ID, whether the first communication apparatus is an authorized user. If yes, step 703b is performed: or if no, the second communication apparatus sends, to the first communication apparatus, a message that indicates that DCP initial access fails.

Example 2: The fourth communication apparatus may verify the R/W permission included in the initial UE DCP request message. That is, the fourth communication apparatus verifies, based on the R/W permission, whether the first communication apparatus has permission. If yes, step 703b is performed: or if no, the second communication apparatus sends, to the first communication apparatus, a message that indicates that DCP initial access fails.

Example 3: The fourth communication apparatus may verify the group ID or the group contract ID included in the initial UE DCP request message. That is, the fourth communication apparatus verifies, based on the group ID or the group contract ID, whether the second communication apparatus has a capability of performing communication on a blockchain corresponding to the group ID or the group contract ID. If yes, step 703b is performed: or if no, the second communication apparatus sends, to the first communication apparatus, a message that indicates that DCP initial access fails.

Optionally, an update process may include: The fourth communication apparatus updates, based on the parameter included in the initial UE DCP request message, a parameter (for example, information about a blockchain to which the first communication apparatus supports access and permission information of the first communication apparatus on the blockchain corresponding to the group ID or the group contract ID) that is associated with the first communication apparatus and that is prestored in the fourth communication apparatus.

703b: The fourth communication apparatus sends an initial UE DCP context request to the second communication apparatus.

Optionally, after the fourth communication apparatus receives the initial UE DCP request message, the fourth communication apparatus may determine, based on the initial UE DCP request message (the at least one of the player ID, the group ID, the group contract ID, and the R/W permission that are included), to allow access of the first communication apparatus, and then the fourth communication apparatus sends the initial UE DCP context request message to the second communication apparatus in step 703*b*, to request to set up a DCP context corresponding to the first communication apparatus.

704: The second communication apparatus sends a DCP consensus mode command to the first communication apparatus. Accordingly, the first communication apparatus receives the DCP consensus mode command message from the second communication apparatus.

Optionally, after the second communication apparatus receives the initial UE DCP context request message, the second communication apparatus may determine, based on the initial UE DCP context request message, a consensus mode set for which access of the first communication apparatus is allowed (which is also referred to as a consensus mode set for which the first communication apparatus supports access), and send the DCP consensus mode command message to the first communication apparatus in step 704, to indicate the consensus mode set.

705: The first communication apparatus sends a DCP consensus mode complete message to the second communication apparatus. Accordingly, the second communication apparatus receives the DCP consensus mode complete message from the first communication apparatus.

The DCP consensus mode complete message carries at least one of the player ID, the group ID, and a consensus mode.

In addition, after step 705, the second communication apparatus may further send a response message (not shown in FIG. 7) to the first communication apparatus, to indicate that the DCP initial access succeeds or fails.

706: The second communication apparatus sends an initial UE DCP response to a third communication apparatus, to indicate, to the third communication apparatus, that DCP initial access of the first communication apparatus succeeds. Accordingly, the third communication apparatus receives the initial UE DCP response message from the second communication apparatus.

The initial UE DCP response carries the player ID, the group ID, and the consensus mode.

707: The second communication apparatus sends an initial UE DCP context response to the fourth communication apparatus, where the initial UE DCP context response carries the player ID, the group ID, and the consensus mode.

In the implementation process shown in FIG. 7, the initial UE DCP request message is an implementation example of the first message sent by the first communication apparatus in step S501 in the example shown in FIG. 5, the DCP consensus mode command message is an implementation example of the second message sent by the second communication apparatus in step S502 in the example shown in FIG. 5, and the DCP consensus mode complete message is an implementation example of the third message sent by the first communication apparatus in step S503 in the example shown in FIG. 5. In addition, for related steps shown in FIG. 7, refer to the related steps in FIG. 5. In addition, corresponding technical effects are implemented. Details are not described herein again.

In this way, based on the implementation shown in FIG. 7, the second communication apparatus may implement, on a fourth communication apparatus side, the process of verifying the DCP initial access of the first communication apparatus. Because the core network device usually has higher computing power and a higher capability than the access network device, implementing a DCP initial access process between different communication apparatuses based on an indication of the core network device can reduce processing complexity of the second communication apparatus, and can improve a DCP initial access success rate of the first communication apparatus.

It is described in the foregoing implementation processes shown in FIG. 5 to FIG. 7 that the different communication apparatuses may exchange the messages based on the DCP communication protocol to complete the DCP initial access process. In addition, the different communication apparatuses may further exchange messages based on the DCP communication protocol to complete other blockchain-based communication processes, for example, a process of successfully setting up a DCP connection, a DCP connection setup failure processing process, a DCP connection release process, consensus data transmission, and a blockchain configuration process. The following separately provides descriptions.

It should be noted that subsequent implementation processes shown in FIG. 8 to FIG. 15 may be performed after step S504 (that is, the fourth message indicates that the DCP initial access succeeds) shown in FIG. 5 to FIG. 7, or may be performed independently of the implementation processes shown in FIG. 5 to FIG. 7.

In an implementation, a communication method provided in this application may be for implementing a process of successfully setting up a DCP connection, and includes the following steps.

Step 1.1: A first communication apparatus sends a fifth message to a second communication apparatus, where the fifth message is for requesting to set up a DCP connection. Accordingly, the second communication apparatus receives the fifth message. The fifth message includes an identifier of the first communication apparatus, a blockchain identifier, and an identifier of first consensus mode information.

Step 1.2: The second communication apparatus sends a sixth message to the first communication apparatus. Accordingly, the first communication apparatus receives the sixth message from the second communication apparatus. The sixth message indicates a DCP connection setup response.

Step 1.3: The first communication apparatus sends a seventh message to the second communication apparatus. Accordingly, the second communication apparatus receives the seventh message. The seventh message indicates that the setup of the DCP connection is completed.

The first communication apparatus may further exchange, with the second communication apparatus, the fifth message that is for requesting to set up the DCP connection, the sixth message that indicates the DCP connection setup response, and the seventh message that indicates the setup of the DCP connection is completed, so that when the second communication apparatus configures a consensus mode based on the fifth message, a process of setting up a DCP connection between different communication apparatuses is implemented.

In an optional manner, after the second communication apparatus receives the seventh message from the first communication apparatus, the method further includes the following step.

Step 1.4: The second communication apparatus sends a nineteenth message to a third communication apparatus. Accordingly, the third communication apparatus receives the nineteenth message. The nineteenth message indicates that the setup of the DCP connection is completed, and the nineteenth message includes the identifier of the first communication apparatus, the blockchain identifier, and the identifier of the first consensus mode information.

After the second communication apparatus receives the seventh message from the first communication apparatus (that is, the DCP connection is set up between the first communication apparatus and the second communication apparatus), the second communication apparatus may exchange, with the third communication apparatus, the nineteenth message that indicates that the setup of the DCP connection is complete, to indicate, to another communication apparatus, that the first communication apparatus has set up the DCP connection.

Figure 8:
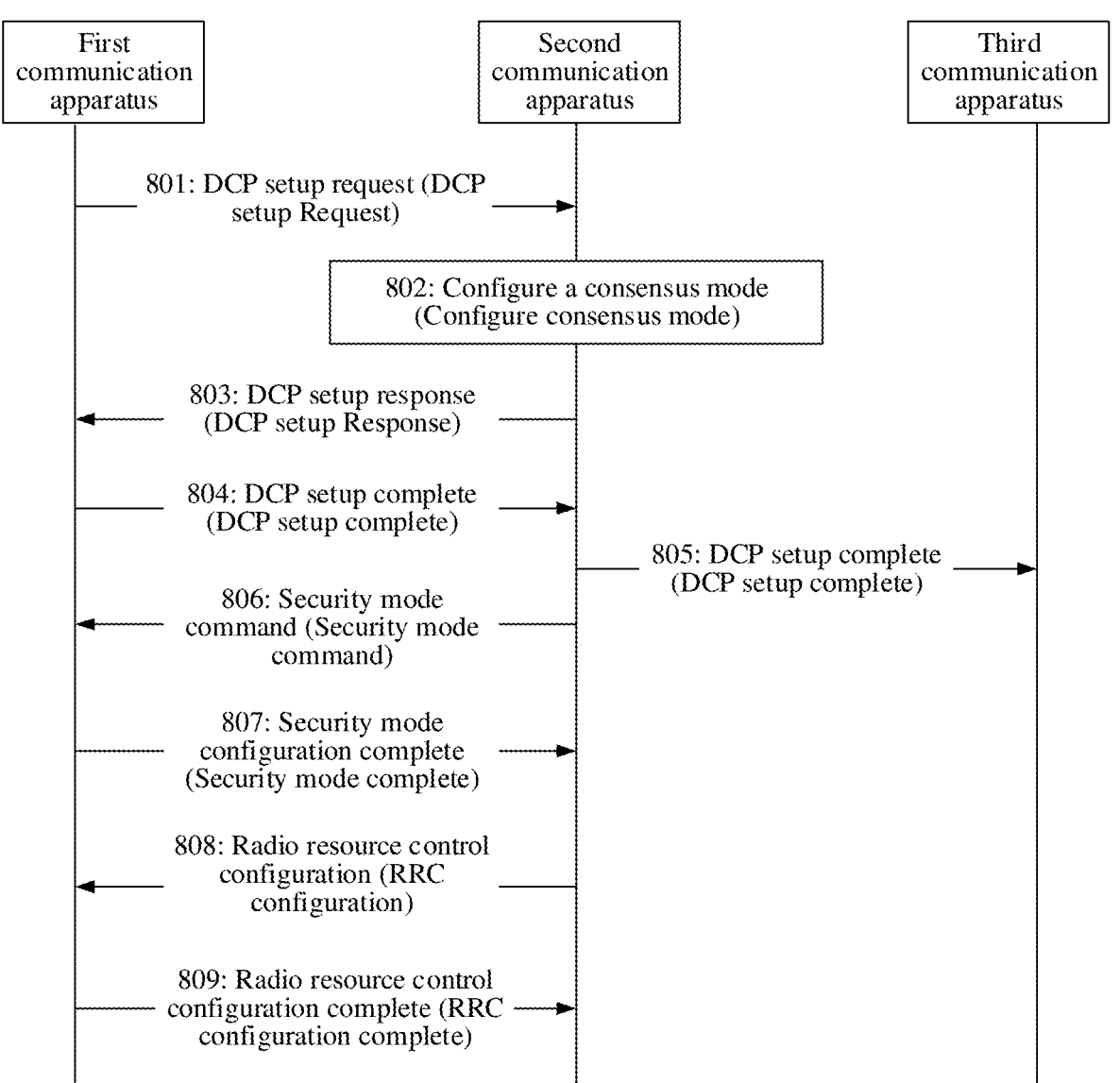
FIG. 8 is another schematic diagram of a communication method according to this application.

The following uses the implementation process shown in FIG. 8 as an example for description. It should be noted that, in the implementation process shown in FIG. 8, a first communication apparatus may be a terminal device, a second communication apparatus may be a network device, and a third communication apparatus may be a network device other than the second communication apparatus.

FIG. 8 is another schematic diagram of a communication method according to this application. The method includes the following steps.

801: A first communication apparatus sends a DCP setup request message to a second communication apparatus, to request to set up a DCP connection. Accordingly, the second communication apparatus receives the DCP setup request message.

The DCP setup request message carries at least one of a player ID, a group ID, and a consensus mode.

In a possible implementation, the player ID is an identifier of the first communication apparatus.

In a possible implementation, the consensus mode indicates a first consensus mode.

802: The second communication apparatus configures a consensus mode.

Optionally, the second communication apparatus configures a corresponding consensus mode based on the consensus mode carried in the DCP setup request message. The first consensus mode may include at least one of the following information: a blockchain type, a chain structure, a consensus algorithm, an incentive mechanism, a contract template, a resource type, a packet delay budget, a packet error rate, energy consumption, or a computation amount.

803: The second communication apparatus sends a DCP setup response message to the first communication apparatus. Accordingly, the first communication apparatus receives the DCP setup response message.

Optionally, after the second communication apparatus determines, in step 802, that the configuration of the consensus mode is completed, the second communication apparatus sends the DCP setup response message to the first communication apparatus in step 803.

Optionally, the DCP setup response message indicates that the first communication apparatus is allowed to set up the DCP connection, or the DCP setup response message indicates that the second communication apparatus completes configuration of the consensus mode.

804: The first communication apparatus sends a DCP setup complete to the second communication apparatus, to indicate that the first communication apparatus has set up the DCP connection. Accordingly, the second communication apparatus receives the DCP setup complete message.

Optionally, after the first communication apparatus receives the DCP setup response message, the first communication apparatus determines to set up the DCP connection to the second communication apparatus, and sends the DCP setup complete message to the second communication apparatus.

805: The second communication apparatus sends a DCP setup complete message to a third communication apparatus, to indicate that the first communication apparatus has set up the DCP connection. Accordingly, the third communication apparatus receives the DCP setup complete message. The DCP setup complete message carries the player ID, the group ID, and the consensus mode.

Optionally, the player ID is the identifier of the first communication apparatus.

Optionally, after step 805, processes in step 806 to step 809 are optional steps. Step 806 and step 807 are for configuring a security mode, and step 808 and step 809 are for configuring an RRC connection.

806: The second communication apparatus sends a security mode command message to the first communication apparatus. Accordingly, the first communication apparatus receives the security mode command message.

807: The first communication apparatus sends a security mode complete message to the second communication apparatus. Accordingly, the second communication apparatus receives the security mode complete message.

808: The second communication apparatus sends a radio resource control configuration (RRC configuration) message to the first communication apparatus. Accordingly, the first communication apparatus receives the radio resource control configuration message.

809: The first communication apparatus sends a radio resource control configuration complete (RRC configuration complete) message to the second communication apparatus. Accordingly, the second communication apparatus receives the radio resource control configuration complete message.

In the implementation process shown in FIG. 8, the DCP setup request message is an implementation example of the fifth message in the foregoing example, the DCP setup response message is an implementation example of the sixth message in the foregoing example, the DCP setup complete message in step 804 is an implementation example of the seventh message in the foregoing example, and the DCP setup complete message in step 805 is an implementation example of the nineteenth message in the foregoing example. In addition, for related steps shown in FIG. 8, refer to the related steps in the foregoing examples. In addition, corresponding technical effects are implemented. Details are not described herein again.

In an implementation, a communication method provided in this application provides a DCP connection setup failure processing process, and includes the following steps.

Step 2.1: A first communication apparatus sends a thirteenth message to a second communication apparatus. Accordingly, the second communication apparatus receives the thirteenth message. The thirteenth message is for requesting to set up a DCP connection, and the thirteenth message includes an identifier of the first communication apparatus, a blockchain identifier, and an identifier of first consensus mode information.

Step 2.2: The second communication apparatus sends a fourteenth message to the first communication apparatus. Accordingly, the first communication apparatus receives the fourteenth message from the second communication apparatus. The fourteenth message indicates that the setup of the DCP connection fails.

Optionally, the second communication apparatus may be triggered, based on a reason such as that the first communication apparatus is an unauthorized user or that a resource is inadequate, to send, to the first communication apparatus, the fourteenth message that indicates that the setup of the DCP connection fails.

The first communication apparatus may exchange, with the second communication apparatus, the thirteenth message that is for requesting to set up the DCP connection and the fourteenth message that indicates that the setup of the DCP connection fails, so that when the second communication apparatus determines, because the first communication apparatus is the unauthorized user, the resource is inadequate, or the like, to reject the request of the first communication apparatus, a processing process in which the second communication apparatus rejects the setup of the DCP connection to the first communication apparatus is implemented.

Figure 9:
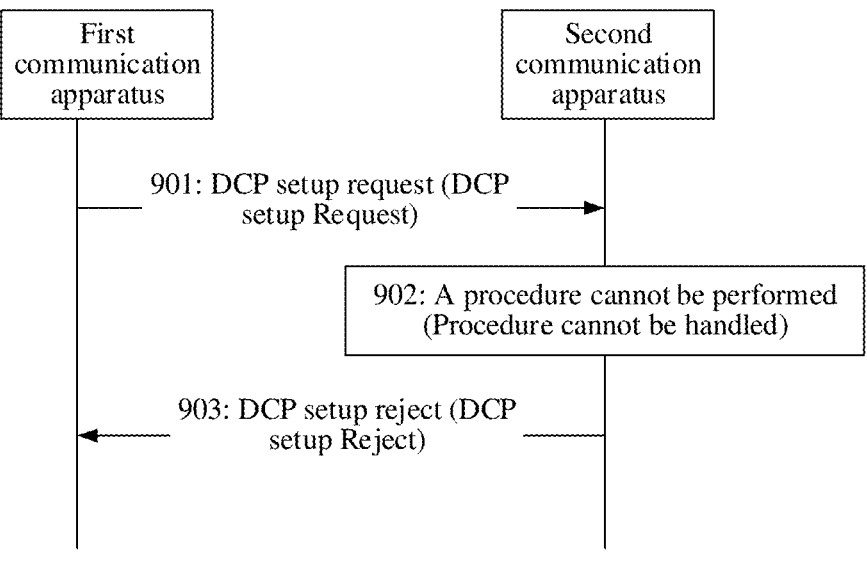
FIG. 9 is another schematic diagram of a communication method according to this application.

The following uses the implementation process shown in FIG. 9 as an example for description. It should be noted that, in the implementation process shown in FIG. 9, a first communication apparatus may be a terminal device, and a second communication apparatus may be a network device.

FIG. 9 is another schematic diagram of a communication method according to this application. The method includes the following steps.

901: A first communication apparatus sends a DCP setup request message to a second communication apparatus, to request to set up a DCP connection. Accordingly, the second communication apparatus receives the DCP setup request message.

The DCP setup request message carries at least one of a player ID, a group ID, and a consensus mode.

Optionally, the player ID is the identifier of the first communication apparatus.

902: The second communication apparatus determines that a procedure cannot be performed (Procedure cannot be handled).

Optionally, the second communication apparatus may be triggered, based on a reason such as that the first communication apparatus is an unauthorized user or that a resource is inadequate, to determine the procedure that cannot be performed.

903: The second communication apparatus sends a DCP setup reject message to the first communication apparatus. Accordingly, the first communication apparatus receives the DCP setup reject message.

In the implementation process shown in FIG. 9, the DCP setup request message is an implementation example of the thirteenth message in the foregoing example, and the DCP setup reject message is an implementation example of the fourteenth message in the foregoing example. In addition, for related steps shown in FIG. 9, refer to the related steps in the foregoing examples. In addition, corresponding technical effects are implemented. Details are not described herein again.

In an implementation, a communication method provided in this application may be for implementing a DCP connection release process initiated by a first communication apparatus, and includes the following steps.

Step 3.1: The first communication apparatus sends an eighth message to a second communication apparatus. Accordingly, the second communication apparatus receives the eighth message. The eighth message is for requesting to release a DCP connection, and the eighth message includes an identifier of the first communication apparatus and a blockchain identifier.

Step 3.2: The second communication apparatus sends a ninth message to the first communication apparatus. Accordingly, the first communication apparatus receives the ninth message from the second communication apparatus.

Optionally, the ninth message indicates a DCP connection release response, the ninth message indicates that the release of the DCP connection is allowed, or the ninth message indicates that the second communication apparatus has determined to release the DCP connection.

Step 3.3: The first communication apparatus sends a tenth message to the second communication apparatus. Accordingly, the second communication apparatus receives the tenth message.

Optionally, the tenth message indicates that the release of the DCP connection is completed, or the tenth message indicates that the first communication apparatus has released the DCP connection.

After the first communication apparatus sends a seventh message to the second communication apparatus (that is, the DCP connection is set up between the first communication apparatus and the second communication apparatus), when the first communication apparatus expects (for reducing energy consumption, when the communication based on the DCP connection is no longer required, or the like) to release the DCP connection, the first communication apparatus may exchange, with the second communication apparatus, the eighth message that is for requesting to release the DCP connection, the ninth message that indicates the DCP connection release response, and the tenth message that indicates that the release of the DCP connection is completed, to implement the DCP connection release process initiated by the first communication apparatus. In a possible implementation, after the second communication apparatus receives the tenth message from the first communication apparatus, the method further includes the following steps.

Step 3.4: The second communication apparatus sends a twentieth message to a third communication apparatus. Accordingly, the third communication apparatus receives the twentieth message. The twentieth message is for requesting to release the DCP connection, and the twentieth message includes the identifier of the first communication apparatus and the blockchain identifier.

Step 3.5: The third communication apparatus sends a twenty-first message to the second communication apparatus. Accordingly, the second communication apparatus receives the twenty-first message from the third communication apparatus. The twenty-first message indicates that the release of the DCP connection is completed.

After the second communication apparatus receives the tenth message from the first communication apparatus (that is, the release of the DCP connection between the first communication apparatus and the second communication apparatus is completed), the second communication apparatus may exchange, with the third communication apparatus, the twentieth message that is for requesting to release the DCP connection and the twenty-first message that indicates that the release of the DCP connection is completed, so that in a scenario of the DCP connection release process initiated by the first communication apparatus, the second communication apparatus indicates, to another communication apparatus, that the DCP connection of the first communication apparatus has been released.

Figure 10:
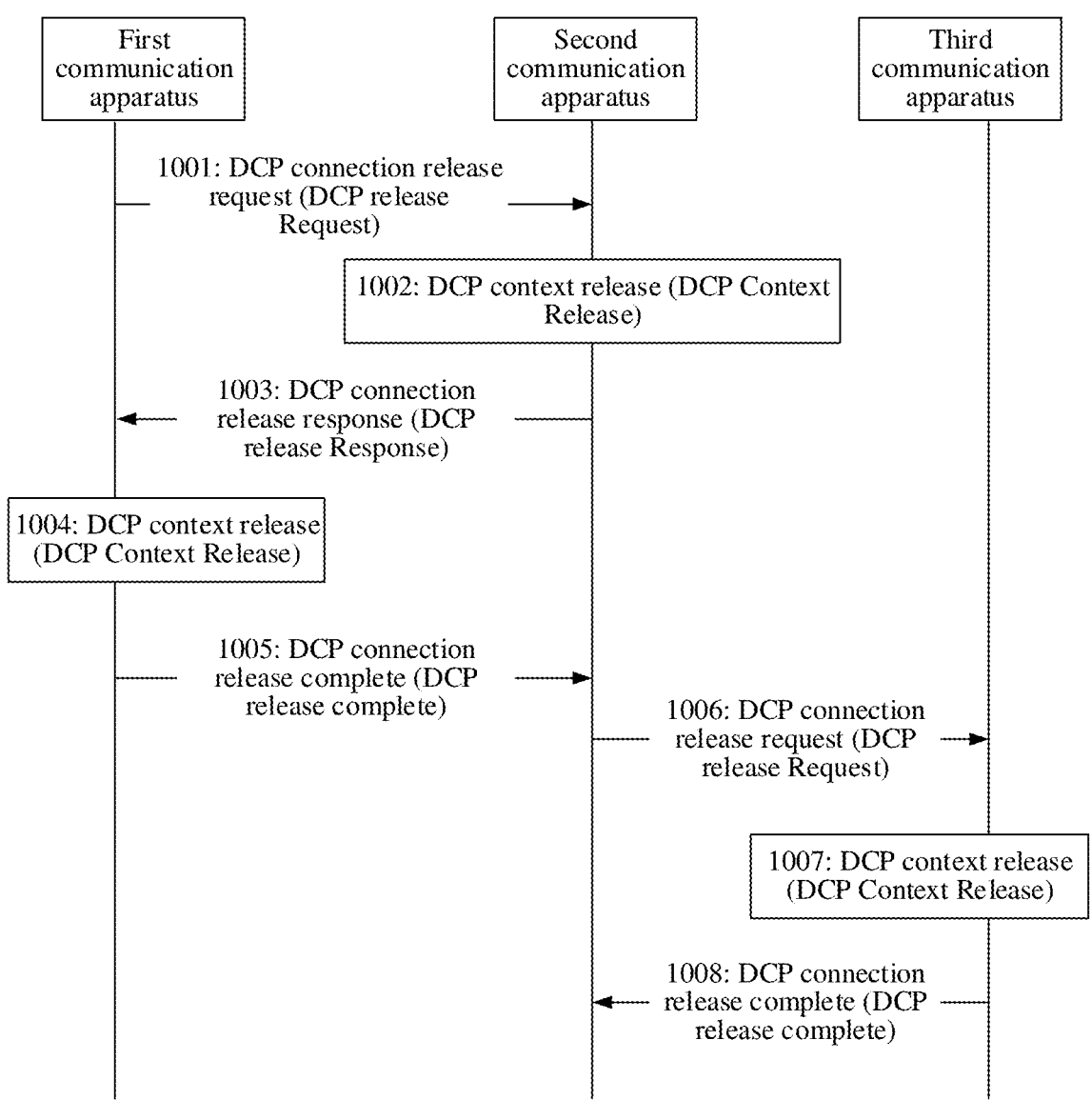
FIG. 10 is another schematic diagram of a communication method according to this application.

The following uses the implementation process shown in FIG. 10 as an example for description. It should be noted that, in the implementation process shown in FIG. 10, a first communication apparatus may be a terminal device, a second communication apparatus may be a network device, and a third communication apparatus is a network device other than the second communication apparatus.

FIG. 10 is another schematic diagram of a communication method according to this application. The method includes the following steps.

1001: A first communication apparatus sends a DCP connection release request message to a second communication apparatus. Accordingly, the second communication apparatus receives the DCP connection release request message.

The DCP connection release request message carries at least one of a player ID and a group ID.

1002: The second communication apparatus performs DCP context release.

Optionally, after the second communication apparatus receives the DCP connection release request message, the second communication apparatus determines, based on the DCP connection release request message, that a DCP connection needs to be released. That is, the second communication apparatus releases a DCP context of the first communication apparatus, that is, performs DCP context release.

1003: The second communication apparatus sends a DCP connection release response message to the first communication apparatus. Accordingly, the first communication apparatus receives the DCP connection release response message.

Optionally, after the second communication apparatus determines that the DCP context of the first communication apparatus has been released, the second communication apparatus may send the DCP connection release response message to the first communication apparatus in step 1003, to indicate that the DCP connection of the first communication apparatus has been released.

1004: The first communication apparatus performs DCP context release.

Optionally, after the first communication apparatus receives the DCP connection release response message, the first communication apparatus determines, based on the DCP connection release response message, to release the DCP connection. That is, the first communication apparatus releases the DCP context of the first communication apparatus, that is, performs DCP context release.

1005: The first communication apparatus sends a DCP connection release complete message to the second communication apparatus. Accordingly, the second communication apparatus receives the DCP connection release complete message.

Optionally, after the first communication apparatus determines that the DCP context of the first communication apparatus has been released, the first communication apparatus may send the DCP connection release complete message to the second communication apparatus in step 1005, to indicate that the DCP connection of the first communication apparatus has been released.

1006: The second communication apparatus sends a DCP connection release request message to a third communication apparatus. Accordingly, the third communication apparatus receives the DCP connection release request message.

Optionally, the DCP connection release request message carries at least one of the player ID of the first communication apparatus and the group ID, to indicate to release the DCP connection of the first communication apparatus.

Optionally, after the second communication apparatus performs DCP context release in step 1002 or the second communication apparatus receives the DCP connection release complete message from the first communication apparatus in step 1005, the second communication apparatus performs step 1006.

1007: The third communication apparatus performs DCP context release.

Optionally, after the third communication apparatus receives the DCP connection release request message, the third communication apparatus determines, based on the DCP connection release request message, to release the DCP connection. That is, the third communication apparatus releases the DCP context of the first communication apparatus, that is, performs DCP context release.

1008: The third communication apparatus sends a DCP connection release complete message to the second communication apparatus. Accordingly, the second communication apparatus receives the DCP connection release complete message.

Optionally, after the third communication apparatus determines that the DCP context of the first communication apparatus has been released, the third communication apparatus may send the DCP connection release complete message to the second communication apparatus in step 1008, to indicate that the DCP connection of the first communication apparatus has been released.

In the implementation process shown in FIG. 10, the DCP connection release request in step 1001 is an implementation example of the eighth message in the foregoing example, the DCP connection release response message in step 1003 is an implementation example of the ninth message in the foregoing example, the DCP release complete message in step 1005 is an implementation example of the tenth message in the foregoing example, the DCP connection release request in step 1006 is an implementation example of the twentieth message in the foregoing example, and the DCP connection release complete message in step 1008 is an implementation example of the twenty-first message in the foregoing example. In addition, for related steps shown in FIG. 10, refer to the related steps in the foregoing examples. In addition, corresponding technical effects are implemented. Details are not described herein again.

In an implementation, a communication method provided in this application may be for implementing a DCP connection release process initiated by a second communication apparatus, and includes the following steps.

Step 4.1: The second communication apparatus sends an eleventh message to a first communication apparatus. Accordingly, the first communication apparatus receives the eleventh message from the second communication apparatus. The eleventh message is for requesting to release a DCP connection, and the eleventh message includes an identifier of the second communication apparatus and a blockchain identifier.

Step 4.2: The first communication apparatus sends a twelfth message to the second communication apparatus. Accordingly, the second communication apparatus receives the twelfth message. The twelfth message indicates that the release of the DCP connection is completed.

After the first communication apparatus sends a seventh message to the second communication apparatus (that is, the DCP connection is set up between the first communication apparatus and the second communication apparatus), when the second communication apparatus expects (a reason is that it is determined that permission information of the first communication apparatus is changed, a reason is that communication no longer needs to be performed based on the DCP connection, or the like) to release the DCP connection, the first communication apparatus may exchange, with the second communication apparatus, the eleventh message that is for requesting to release the DCP connection and the twelfth message that indicates that the release of the DCP connection is completed, to implement the DCP connection release process initiated by the second communication apparatus.

In a possible implementation, after the second communication apparatus receives the twelfth message from the first communication apparatus, the method further includes the following steps.

Step 4.3: The second communication apparatus sends a twenty-second message to a third communication apparatus. Accordingly, the third communication apparatus receives the twenty-second message. The twenty-second message is for requesting to release the DCP connection, and the twenty-second message includes an identifier of the first communication apparatus and the blockchain identifier.

Step 4.4: The third communication apparatus sends a twenty-third message to the second communication apparatus. Accordingly, the second communication apparatus receives the twenty-third message from the third communication apparatus. The twenty-third message indicates that the release of the DCP connection is completed.

After the second communication apparatus receives the seventh message from the first communication apparatus (that is, the release of the DCP connection between the first communication apparatus and the second communication apparatus is completed), the second communication apparatus may exchange, with the third communication apparatus, the twenty-second message that is for requesting to release the DCP connection and the twenty-third message that indicates that the release of the DCP connection is completed, so that in a scenario of the DCP connection release process initiated by the second communication apparatus, the second communication apparatus indicates, to another communication apparatus, that the DCP connection of the first communication apparatus has been released.

Figure 11:
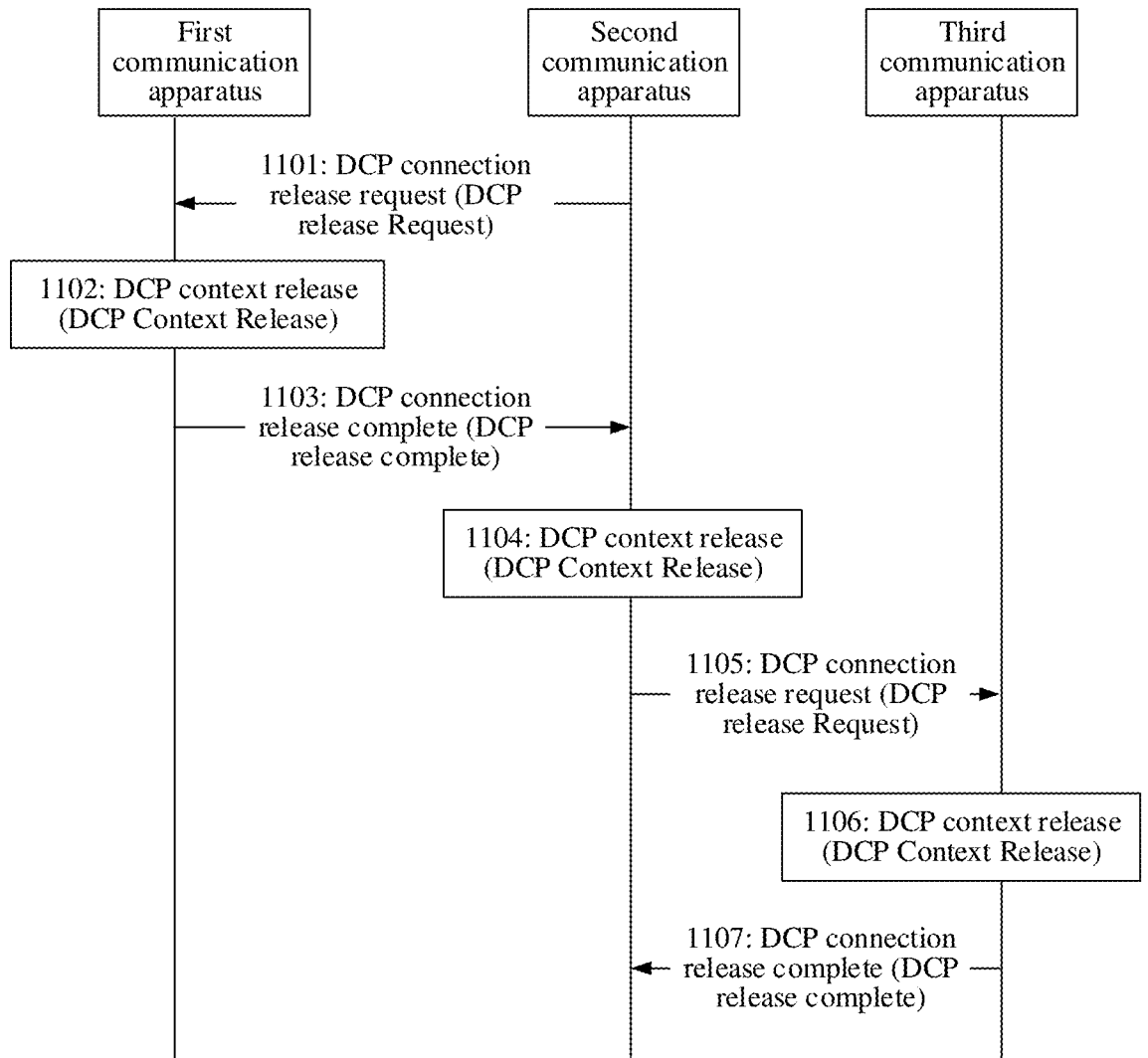
FIG. 11 is another schematic diagram of a communication method according to this application.

The following uses the implementation process shown in FIG. 11 as an example for description. It should be noted that, in the implementation process shown in FIG. 11, a first communication apparatus may be a terminal device, a second communication apparatus may be a network device, and a third communication apparatus may be a network device other than the second communication apparatus.

FIG. 11 is another schematic diagram of a communication method according to this application. The method includes the following steps.

1101: A second communication apparatus sends a DCP connection release request message to a first communication apparatus. Accordingly, the first communication apparatus receives the DCP connection release request message.

The DCP connection release request message carries at least one of a player ID of the second communication apparatus and a group ID.

1102: The first communication apparatus performs DCP context release.

Optionally, after the first communication apparatus receives the DCP connection release request message, the first communication apparatus determines, based on the DCP connection release request message, that a DCP connection needs to be released. That is, the first communication apparatus releases a DCP context of the first communication apparatus, that is, performs DCP context release.

1103: The first communication apparatus sends a DCP connection release complete message to the second communication apparatus.

Optionally, after the first communication apparatus determines that the DCP context of the first communication apparatus has been released, the first communication apparatus may send the DCP connection release complete message to the second communication apparatus in step 1103, to indicate that the DCP connection of the first communication apparatus has been released.

1104: The second communication apparatus performs DCP context release.

Optionally, after the second communication apparatus receives the DCP connection release complete message, the second communication apparatus determines, based on the DCP connection release complete message, to release the DCP connection. That is, the second communication apparatus releases the DCP context of the first communication apparatus, that is, performs DCP context release.

1105: The second communication apparatus sends a DCP connection release request message to a third communication apparatus. Accordingly, the third communication apparatus receives the DCP connection release request message.

Optionally, the DCP connection release request message carries at least one of a player ID of the first communication apparatus and the group ID, to indicate to release the DCP connection of the first communication apparatus.

1106: The third communication apparatus performs DCP context release.

Optionally, after the third communication apparatus receives the DCP connection release request message, the third communication apparatus determines, based on the DCP connection release request message, to release the DCP connection. That is, the third communication apparatus releases the DCP context of the first communication apparatus, that is, performs DCP context release.

1107: The third communication apparatus sends a DCP connection release complete message to the second communication apparatus. Accordingly, the second communication apparatus receives the DCP connection release complete message.

Optionally, after the third communication apparatus determines that the DCP context of the first communication apparatus has been released, the third communication apparatus may send the DCP connection release complete message to the second communication apparatus in step 1107, to indicate that the DCP connection of the first communication apparatus has been released.

In the implementation process shown in FIG. 11, the DCP connection release request in step 1101 is an implementation example of the eleventh message in the foregoing example, the DCP connection release complete message in step 1103 is an implementation example of the twelfth message in the foregoing example, the DCP connection release request in step 1105 is an implementation example of the twenty-second message in the foregoing example, and the DCP connection release complete message in step 1107 is an implementation example of the twenty-third message in the foregoing example. In addition, for related steps shown in FIG. 11, refer to the related steps in the foregoing examples. In addition, corresponding technical effects are implemented. Details are not described herein again.

In an implementation, a communication method provided in this application may be for implementing a consensus data transmission process initiated by a first communication apparatus, and includes the following steps.

Step 5.1: The first communication apparatus sends a fifteenth message to a second communication apparatus. Accordingly, the second communication apparatus receives the fifteenth message. The fifteenth message is for requesting consensus data transmission, and the fifteenth message includes an identifier of the first communication apparatus and a blockchain identifier.

Step 5.2: The second communication apparatus sends a sixteenth message to the first communication apparatus. Accordingly, the first communication apparatus receives the sixteenth message from the second communication apparatus. The sixteenth message indicates a consensus data transmission response.

Step 5.3: The first communication apparatus sends first consensus data to the second communication apparatus. Accordingly, the second communication apparatus receives the first consensus data.

After the first communication apparatus receives a fourth message from the second communication apparatus, and when the fourth message indicates that DCP initial access succeeds, the first communication apparatus may exchange, with the second communication apparatus, the fifteenth message that is for requesting the consensus data transmission, the sixteenth message that indicates the consensus data transmission response, and the first consensus data, to implement the blockchain consensus data transmission process initiated by the first communication apparatus. In a possible implementation, after the second communication apparatus sends the sixteenth message to the first communication apparatus, the method further includes the following steps.

Step 5.4: The second communication apparatus sends a twenty-fourth message to a third communication apparatus. Accordingly, the third communication apparatus receives the twenty-fourth message. The twenty-fourth message is for requesting consensus data transmission, and the twenty-fourth message includes the identifier of the first communication apparatus and the blockchain identifier.

Step 5.5: The third communication apparatus sends a twenty-fifth message to the second communication apparatus. Accordingly, the second communication apparatus receives the twenty-fifth message from the third communication apparatus. The twenty-fifth message indicates a consensus data transmission response.

Optionally, after the second communication apparatus receives the consensus data from the first communication apparatus in step 5.3, the method further includes the following step.

Step 5.6: The second communication apparatus sends the first consensus data to the third communication apparatus. Accordingly, the third communication apparatus receives the first consensus data.

After the second communication apparatus sends the sixteenth message to the first communication apparatus (that is, it is determined that consensus data transmission is to be performed between the first communication apparatus and the second communication apparatus), the second communication apparatus may exchange, with the third communication apparatus, the twenty-fourth message that is for requesting the consensus data transmission, the twenty-fifth message that indicates the consensus data transmission response, and the first consensus data, so that the second communication apparatus transmits blockchain consensus data to another communication apparatus in a scenario of blockchain consensus data transmission initiated by the first communication apparatus.

Figure 12:
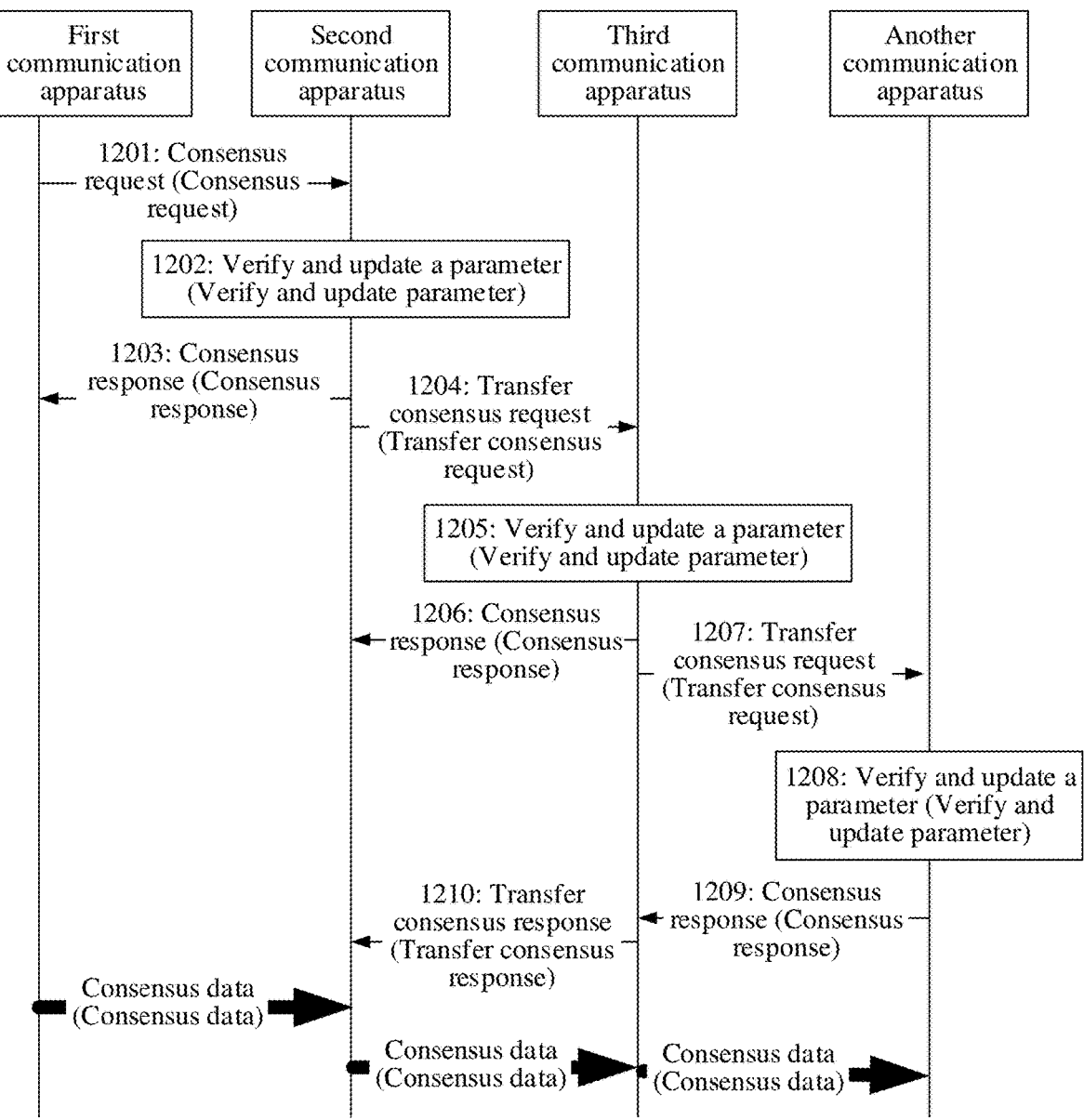
FIG. 12 is another schematic diagram of a communication method according to this application.

The following uses the implementation process shown in FIG. 12 as an example for description. It should be noted that, in the implementation process shown in FIG. 12, a first communication apparatus may be a terminal device, a second communication apparatus may be a network device, a third communication apparatus may be a network device other than the second communication apparatus, and another communication apparatus may be a terminal device other than the first communication apparatus.

FIG. 12 is another schematic diagram of a communication method according to this application. The method includes the following steps.

1201: A first communication apparatus sends a consensus request message to a second communication apparatus. Accordingly, the second communication apparatus receives the consensus request message. The consensus request message carries at least one of a player ID of the first communication apparatus and a group ID.

Optionally, the consensus request message is for requesting consensus data transmission.

1202: The second communication apparatus verifies and updates a parameter.

Optionally, for a process in which the second communication apparatus verifies and updates the parameter, refer to the foregoing implementation process. Details are not described herein again.

1203: The second communication apparatus sends a consensus response message to the first communication apparatus. Accordingly, the first communication apparatus receives the consensus response message.

Optionally, after the verification performed by the second communication apparatus in step 1202 succeeds, the second communication apparatus sends the consensus response message to the first communication apparatus in step 1203, to indicate that the first communication apparatus is allowed to perform consensus data transmission.

1204: The second communication apparatus sends a transfer consensus request message to a third communication apparatus. Accordingly, the third communication apparatus receives the transfer consensus request message. The transfer consensus request message carries at least one of the player ID of the first communication apparatus and the group ID.

Optionally, after the verification performed by the second communication apparatus in step 1202 succeeds, the second communication apparatus sends the consensus response message to the first communication apparatus in step 1204, to indicate that the consensus data transmission is allowed.

1205: The third communication apparatus verifies and updates a parameter.

Optionally, for a process in which the third communication apparatus verifies and updates the parameter, refer to the foregoing implementation process. Details are not described herein again.

1206: The third communication apparatus sends a consensus response message to the second communication apparatus. Accordingly, the second communication apparatus receives the consensus response message.

Optionally, after the verification performed by the third communication apparatus in step 1205 succeeds, the third communication apparatus sends the consensus response message to the second communication apparatus in step 1206, to indicate that consensus data transmission is allowed.

1207: The third communication apparatus sends a transfer consensus request message to another communication apparatus. Accordingly, the another communication apparatus receives the transfer consensus request message. The transfer consensus request message carries at least one of the player ID of the first communication apparatus and the group ID.

Optionally, after the verification performed by the third communication apparatus in step 1205 succeeds, the third communication apparatus sends the transfer consensus request message to the another communication apparatus in step 1207.

1208: The another communication apparatus verifies and updates a parameter.

Optionally, for a process in which the another communication apparatus verifies and updates the parameter, refer to the foregoing implementation process. Details are not described herein again.

1209: The another communication apparatus sends a consensus response message to the third communication apparatus. Accordingly, the third communication apparatus receives the consensus response message.

Optionally, after the verification performed by the another communication apparatus in step 1208 succeeds, the another communication apparatus sends the transfer consensus response message to the third communication apparatus in step 1209.

1210: The third communication apparatus sends a transfer consensus response message to the second communication apparatus. Accordingly, the second communication apparatus receives the transfer consensus response message.

After step 1210, a consensus data message is communicated between the first communication apparatus, the second communication apparatus, the third communication apparatus, and the another communication apparatus.

In the implementation process shown in FIG. 12, the consensus request message in step 1201 is an implementation example of the fifteenth message in the foregoing example, the consensus response message in step 1203 is an implementation example of the sixteenth message in the foregoing example, the transfer consensus request message in step 1204 is an implementation example of the twenty-fourth message in the foregoing example, and the consensus response message in step 1206 is an implementation example of the twenty-fifth message in the foregoing example. In addition, for related steps shown in FIG. 12, refer to the related steps in the foregoing examples. In addition, corresponding technical effects are implemented. Details are not described herein again.

In an implementation, a communication method provided in this application may be for implementing a consensus data transmission process initiated by a second communication apparatus, and includes the following steps.

Step 6.1: The second communication apparatus sends a seventeenth message to a first communication apparatus. Accordingly, the first communication apparatus receives the seventeenth message from the second communication apparatus. The seventeenth message is for requesting consensus data transmission, and the seventeenth message includes an identifier of the second communication apparatus and a blockchain identifier.

Step 6.2: The first communication apparatus sends an eighteenth message to the second communication apparatus. Accordingly, the second communication apparatus receives the eighteenth message. The eighteenth message indicates a consensus data transmission response.

Optionally, after the first communication apparatus receives the seventeenth message, if the second communication apparatus determines that consensus data from the second communication apparatus is to be communicated, the first communication apparatus sends the eighteenth message to the second communication apparatus.

Step 6.3: The second communication apparatus sends the second consensus data to the first communication apparatus. Accordingly, the first communication apparatus receives the second consensus data from the second communication apparatus.

After the first communication apparatus receives a fourth message from the second communication apparatus, and when the fourth message indicates that DCP initial access succeeds, the first communication apparatus may exchange, with the second communication apparatus, the seventeenth message that is for requesting the consensus data transmission, the eighteenth message that indicates the consensus data transmission response, and the second consensus data, to implement the blockchain consensus data transmission process initiated by the second communication apparatus.

In a possible implementation, the method further includes the following steps.

Step 6.4: The second communication apparatus sends a twenty-sixth message to a third communication apparatus. Accordingly, the third communication apparatus receives the twenty-sixth message. The twenty-sixth message is for requesting consensus data transmission, and the twenty-sixth message includes the identifier of the second communication apparatus and the blockchain identifier.

Step 6.5: The third communication apparatus sends a twenty-seventh message to the second communication apparatus. Accordingly, the second communication apparatus receives the twenty-seventh message from the third communication apparatus, where the twenty-seventh message indicates a consensus data transmission response.

Optionally, after the third communication apparatus receives the twenty-sixth message, if the third communication apparatus determines that the consensus data from the second communication apparatus is to be communicated, the third communication apparatus sends the twenty-seventh message to the second communication apparatus.

Step 6.6: The second communication apparatus sends the second consensus data to the third communication apparatus. Accordingly, the third communication apparatus receives the second consensus data.

The second communication apparatus may exchange, with the third communication apparatus, the twenty-sixth message that is for requesting the consensus data transmission, the twenty-seventh message that indicates the consensus data transmission response, and the second consensus data, so that the second communication apparatus transmits blockchain consensus data to another communication apparatus in a scenario of blockchain consensus data transmission initiated by the second communication apparatus.

Figure 13:
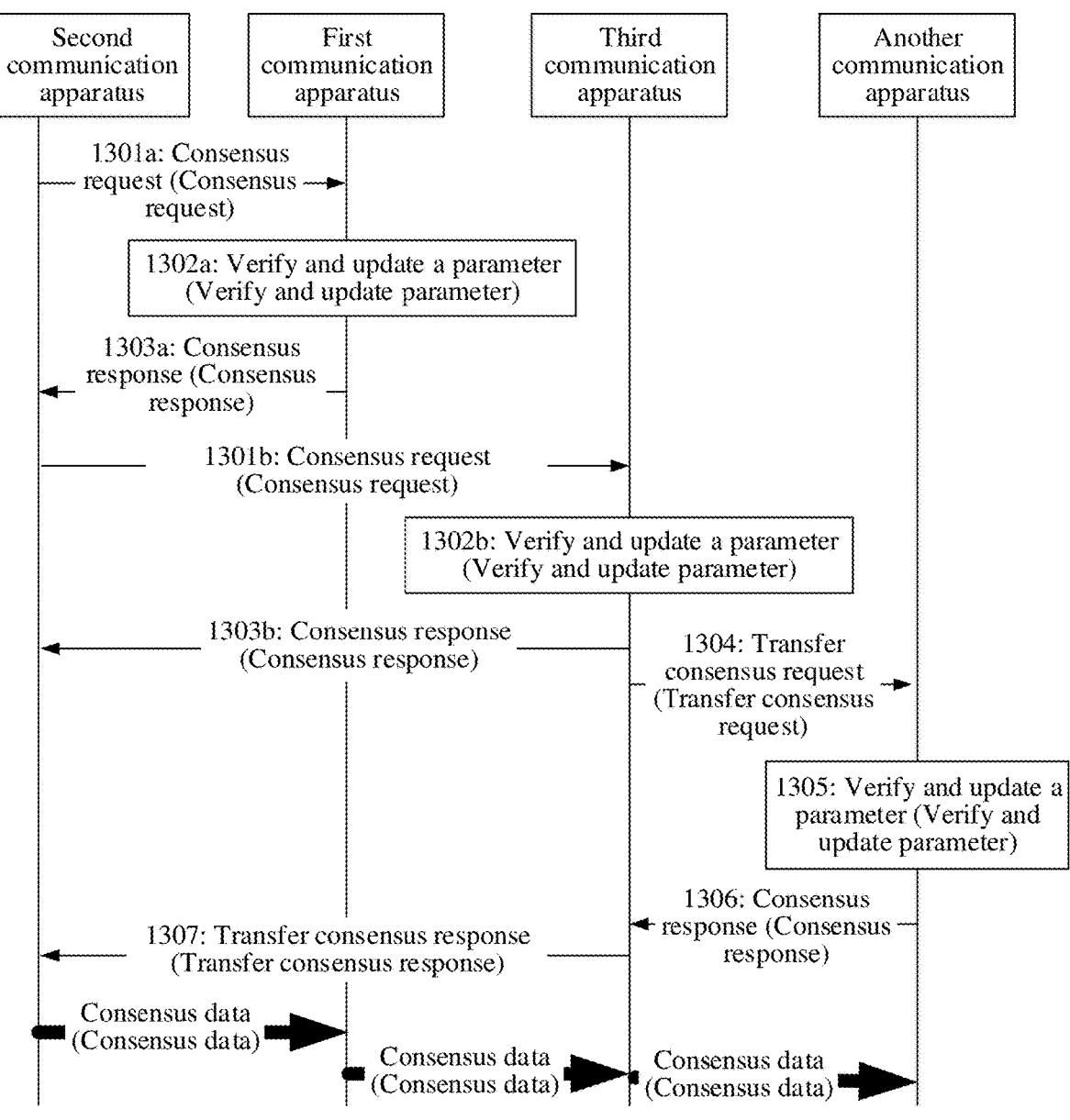
FIG. 13 is another schematic diagram of a communication method according to this application.

The following uses the implementation process shown in FIG. 13 as an example for description. It should be noted that, in the implementation process shown in FIG. 13, a first communication apparatus may be a terminal device, a second communication apparatus may be a network device, a third communication apparatus may be a network device other than the second communication apparatus, and another communication apparatus may be a terminal device other than the first communication apparatus.

FIG. 13 is another schematic diagram of a communication method according to this application. The method includes the following steps.

1301*a*: A second communication apparatus sends a consensus request message to a first communication apparatus. Accordingly, the first communication apparatus receives the consensus request message. The consensus request message carries at least one of a player ID of the second communication apparatus and a group ID.

Optionally, the consensus request message is for requesting consensus data transmission.

1302*a*: The first communication apparatus verifies and updates a parameter.

Optionally, for a process in which the first communication apparatus verifies and updates the parameter, refer to the foregoing implementation process. Details are not described herein again.

1303*a*. The first communication apparatus sends a consensus response message to the second communication apparatus. Accordingly, the second communication apparatus receives the consensus response message.

Optionally, after the verification performed by the first communication apparatus in step 1302*a* succeeds, the first communication apparatus sends the consensus response message to the second communication apparatus in step 1303*a*, to indicate that the second communication apparatus is allowed to perform consensus data transmission.

1301*b*: The second communication apparatus sends a consensus request message to a third communication apparatus. Accordingly, the third communication apparatus receives the consensus request message. The consensus request message carries at least one of the player ID of the second communication apparatus and the group ID.

Optionally, the consensus request message is for requesting consensus data transmission.

1302*b*: The third communication apparatus verifies and updates a parameter.

Optionally, for a process in which the third communication apparatus verifies and updates the parameter, refer to the foregoing implementation process. Details are not described herein again.

1303*b*: The third communication apparatus sends a consensus response message to the second communication apparatus. Accordingly, the second communication apparatus receives the consensus response message.

Optionally, after the verification performed by the third communication apparatus in step 1302*b* succeeds, the third communication apparatus sends the consensus response message to the second communication apparatus in step 1303*b*, to indicate that the consensus data transmission is allowed.

1304: The third communication apparatus sends a transfer consensus request message to another communication apparatus. Accordingly, the another communication apparatus receives the transfer consensus request message. The transfer consensus request message carries at least one of the player ID of the second communication apparatus and the group ID.

Optionally, after the verification performed by the third communication apparatus in step 1302*b* succeeds, the third communication apparatus sends the transfer consensus request message to the another communication apparatus in step 1304.

1305: The another communication apparatus verifies and updates a parameter.

Optionally, for a process in which the another communication apparatus verifies and updates the parameter, refer to the foregoing implementation process. Details are not described herein again.

1306: The another communication apparatus sends a consensus response message to the third communication apparatus. Accordingly, the third communication apparatus receives the consensus response message.

Optionally, after the verification performed by the another communication apparatus in step 1305 succeeds, the another communication apparatus sends the transfer consensus response message to the third communication apparatus in step 1306.

1307: The third communication apparatus sends a transfer consensus response message to the second communication apparatus. Accordingly, the second communication apparatus receives the transfer consensus response message.

After step 1307, a consensus data message is communicated between the first communication apparatus, the second communication apparatus, the third communication apparatus, and the another communication apparatus.

In the implementation process shown in FIG. 13, the consensus request message in step 1301*a* is an implementation example of the seventeenth message in the foregoing example, the consensus response message in step 1303*a* is an implementation example of the eighteenth message in the foregoing example, the consensus request message in step 1301*b* is an implementation example of the twenty-sixth message in the foregoing example, and the consensus response message in step 1303*b* is an implementation example of the twenty-seventh message in the foregoing example. In addition, for related steps shown in FIG. 13, refer to the related steps in the foregoing examples. In addition, corresponding technical effects are implemented. Details are not described herein again.

In an implementation, a communication method provided in this application may be for implementing a blockchain configuration process initiated by a first communication apparatus. It should be noted that, in the implementation process shown in FIG. 14, a first communication apparatus may be a terminal device, a second communication apparatus may be a network device, a third communication apparatus may be a network device other than the second communication apparatus, and another communication apparatus may be a terminal device other than the first communication apparatus.

Figure 14:
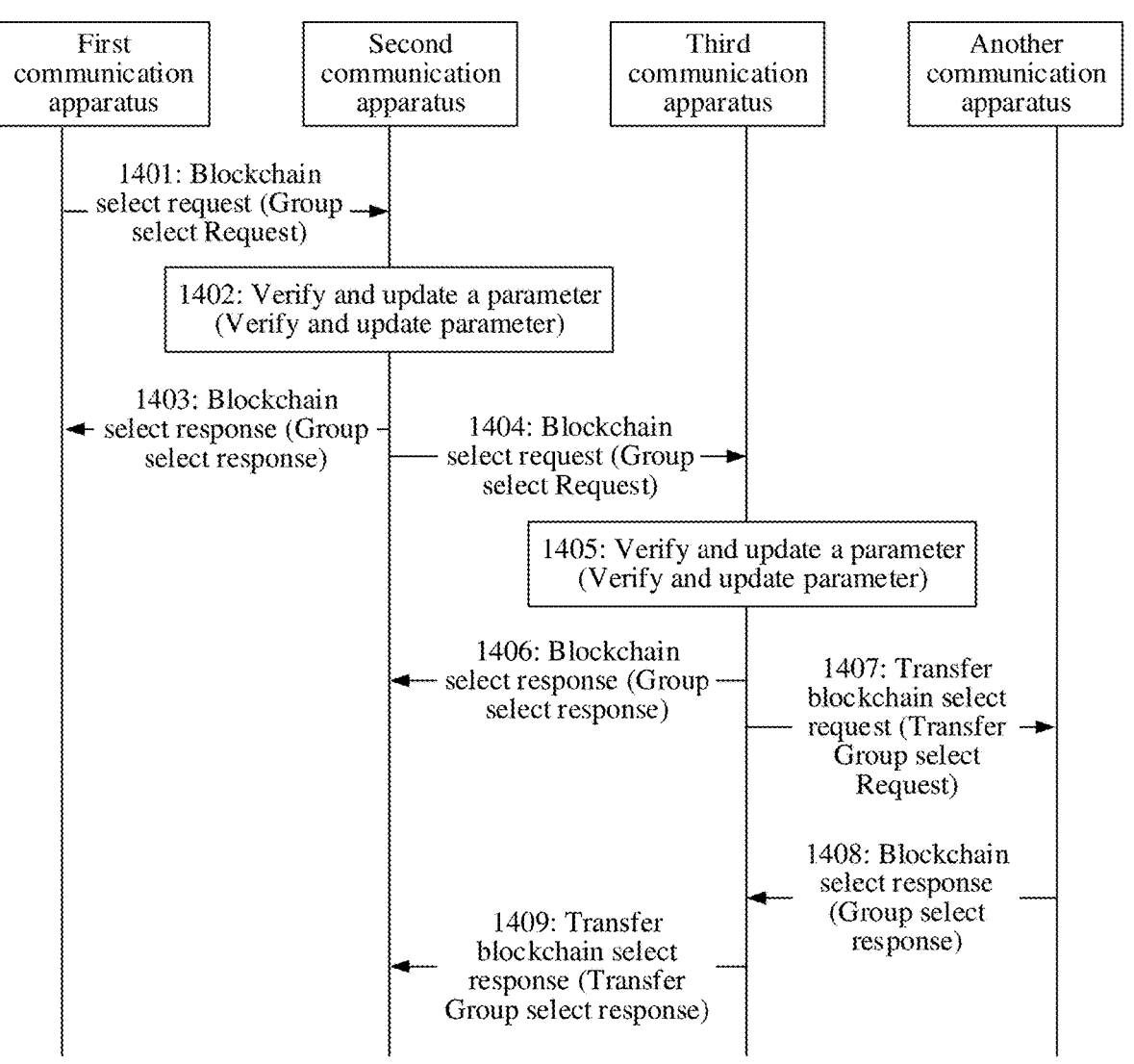
FIG. 14 is another schematic diagram of a communication method according to this application.

FIG. 14 is another schematic diagram of a communication method according to this application. The method includes the following steps.

1401: A first communication apparatus sends a group select request message to a second communication apparatus. Accordingly, the second communication apparatus receives the blockchain select request message.

Optionally, the group select request message may also be referred to as the blockchain select request message.

The blockchain select request message carries at least one of a player ID of the first communication apparatus, a group ID, a group contract ID, and R/W permission.

Optionally, when the first communication apparatus needs to initiate a blockchain configuration process, the first communication apparatus may send the blockchain select request message to the second communication apparatus in step 1401, to indicate to request blockchain configuration.

1402: The second communication apparatus verifies and updates a parameter.

Optionally, for a process in which the second communication apparatus verifies and updates the parameter, refer to the foregoing implementation process. Details are not described herein again.

1403. The second communication apparatus sends a group select response message to the first communication apparatus. Accordingly, the first communication apparatus receives the blockchain select response message.

Optionally, the group select response message may also be referred to as the blockchain response message.

Optionally, after the verification performed by the second communication apparatus in step 1402 succeeds, the second communication apparatus sends the blockchain select response message to the first communication apparatus in step 1403, to indicate that the blockchain configuration is allowed.

1404: The second communication apparatus sends a group select request message to a third communication apparatus. Accordingly, the third communication apparatus receives the blockchain select request message.

Optionally, the group select request message may also be referred to as the blockchain select request message.

Optionally, after the verification performed by the second communication apparatus in step 1402 succeeds, the second communication apparatus sends the blockchain select response message to the third communication apparatus in step 1404, to indicate to request blockchain configuration.

The blockchain select request message carries at least one of the player ID of the first communication apparatus, the group ID, the group contract ID, and the R/W permission.

1405: The third communication apparatus verifies and updates a parameter.

Optionally, for a process in which the third communication apparatus verifies and updates the parameter, refer to the foregoing implementation process. Details are not described herein again.

1406: The third communication apparatus sends a group select response message to the second communication apparatus.

Optionally, the group select response message may also be referred to as a blockchain response message.

Optionally, after the verification performed by the third communication apparatus in step 1405 succeeds, the third communication apparatus sends the blockchain select response message to the second communication apparatus in step 1406, to indicate that the blockchain configuration is allowed.

1407: The third communication apparatus sends a transfer blockchain select request message to another communication apparatus. Accordingly, the another communication apparatus receives the blockchain select request message. The blockchain select request message carries at least one of the player ID of the first communication apparatus, the group ID, the group contract ID, and the R/W permission.

Optionally, after the verification performed by the third communication apparatus in step 1405 succeeds, the third communication apparatus sends the transfer blockchain select request message to the another communication apparatus in step 1407, to indicate to request blockchain configuration.

1408: The another communication apparatus sends a group select response message to the third communication apparatus. Accordingly, the third communication apparatus receives the transfer blockchain select response message.

Optionally, the group select response message may also be referred to as the blockchain response message.

Optionally, for a process in which the another communication apparatus verifies and updates a parameter, refer to the foregoing implementation process. Details are not described herein again.

1409: The third communication apparatus sends a transfer blockchain select response message to the second communication apparatus. Accordingly, the second communication apparatus receives the transfer blockchain select response message.

In this way, when the first communication apparatus expects to initiate the blockchain configuration, the blockchain configuration process can be implemented based on the implementation solution shown in FIG. 14. Subsequently, different communication apparatuses may communicate messages based on a DCP communication protocol, where the DCP communication protocol is a protocol for blockchain communication, so that a process of blockchain-based communication between the different communication apparatuses can be implemented without a need to take a longer path via an application server or an external blockchain, and a communication path can be shortened, thereby improving communication efficiency.

In an implementation, a communication method provided in this application may be for implementing a blockchain configuration process initiated by a second communication apparatus. It should be noted that, in the implementation process shown in FIG. 15, a first communication apparatus may be a terminal device, a second communication apparatus may be a network device, a third communication apparatus may be a network device other than the second communication apparatus, and another communication apparatus may be a terminal device other than the first communication apparatus.

Figure 15:
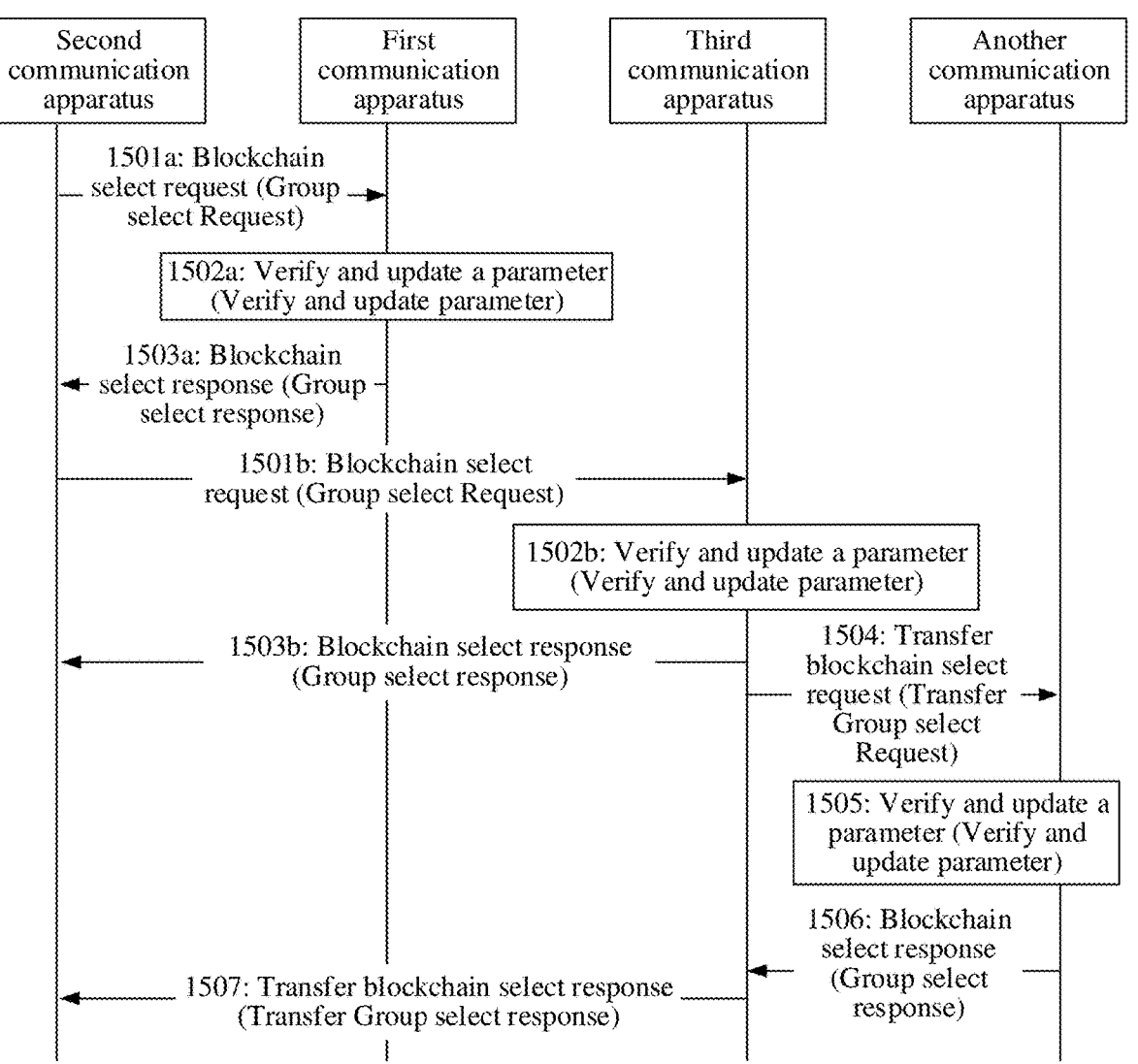
FIG. 15 is another schematic diagram of a communication method according to this application.

FIG. 15 is another schematic diagram of a communication method according to this application. The method includes the following steps.

1501*a*: A second communication apparatus sends a group select request message to a first communication apparatus. Accordingly, the first communication apparatus receives the blockchain select request message.

Optionally, the group select request message may also be referred to as the blockchain select request message.

The blockchain select request message carries at least one of a player ID of the second communication apparatus, a group ID, a group contract ID, and R/W permission.

Optionally, when the second communication apparatus needs to initiate a blockchain configuration process, the second communication apparatus may send the blockchain select request message to the first communication apparatus in step 1501*a*, to indicate to request blockchain configuration.

1502*a*: The first communication apparatus verifies and updates a parameter.

Optionally, for a process in which the first communication apparatus verifies and updates the parameter, refer to the foregoing implementation process. Details are not described herein again.

1503*a*: The first communication apparatus sends a group select response message to the second communication apparatus. Accordingly, the second communication apparatus receives the blockchain select response message.

Optionally, the group select response message may also be referred to as the blockchain response message.

Optionally, after the verification performed by the first communication apparatus in step 1502*a* succeeds, the first communication apparatus sends the blockchain select response message to the second communication apparatus in step 1503*a*, to indicate that the blockchain configuration is allowed.

1501*b*. The second communication apparatus sends a group select request message to a third communication apparatus. Accordingly, the third communication apparatus receives the blockchain select request message.

Optionally, the group select request message may also be referred to as the blockchain select request message.

The blockchain select request message carries at least one of the player ID of the second communication apparatus, the group ID, the group contract ID, and the R/W permission.

Optionally, when the second communication apparatus needs to initiate a blockchain configuration process, the second communication apparatus may send the blockchain select request message to the third communication apparatus in step 1501*b*, to indicate to request blockchain configuration.

1502*b*: The third communication apparatus verifies and updates a parameter.

Optionally, for a process in which the third communication apparatus verifies and updates the parameter, refer to the foregoing implementation process. Details are not described herein again.

1503*b*: The third communication apparatus sends a group select response to the second communication apparatus. Accordingly, the second communication apparatus receives the blockchain select response message.

Optionally, the group select response message may also be referred to as the blockchain response message.

Optionally, after the verification performed by the third communication apparatus in step 1502*b* succeeds, the third communication apparatus sends the blockchain select response message to the second communication apparatus in step 1503*b*, to indicate that the blockchain configuration is allowed.

1504: The third communication apparatus sends a transfer blockchain select request message to another communication apparatus. Accordingly, the another communication apparatus receives the blockchain select request message. The blockchain select request message carries at least one of the player ID of the second communication apparatus, the group ID, the group contract ID, and the R/W permission.

Optionally, after the verification performed by the third communication apparatus in step 1502*b* succeeds, the third communication apparatus sends the transfer blockchain select request message to the another communication apparatus in step 1504, to indicate to request blockchain configuration.

1505: The another communication apparatus verifies and updates a parameter.

Optionally, for a process in which the another communication apparatus verifies and updates the parameter, refer to the foregoing implementation process. Details are not described herein again.

1506: The another communication apparatus sends a group select response message to the third communication apparatus. Accordingly, the third communication apparatus receives the transfer blockchain select response message.

Optionally, the group select response message may also be referred to as the blockchain response message.

1507: The third communication apparatus sends a transfer blockchain select response message to the second communication apparatus. Accordingly, the second communication apparatus receives the transfer blockchain select response message.

In this way, when the second communication apparatus expects to initiate the blockchain configuration, the blockchain configuration process can be implemented based on the implementation solution shown in FIG. 15. Subsequently, different communication apparatuses may communicate messages based on a DCP communication protocol, where the DCP communication protocol is a protocol for blockchain communication, so that a process of blockchain-based communication between the different communication apparatuses can be implemented without a need to take a longer path via an application server or an external blockchain, and a communication path can be shortened, thereby improving communication efficiency.

It can be learned from the embodiments shown in FIG. 2 to FIG. 15 that, in the communication methods provided in this application, nodes (including the first communication apparatus and the second communication apparatus) in a wireless network may complete procedures such as configuration information transmission, protocol setup, and consensus data exchange by using a protocol stack having a consensus function. A blockchain does not need to be used as an external database anymore, compatibility with an existing protocol is good. A blockchain service can be directly used by adding a sublayer to current protocol layers. In addition, in a scenario in which a closed loop can be implemented between an access network and a terminal, there is no need to take a longer path via an application server or an external blockchain, and the communication path is shorter.

The foregoing describes this application from a perspective of the methods, and the following describes apparatuses in this application.

Figure 16:
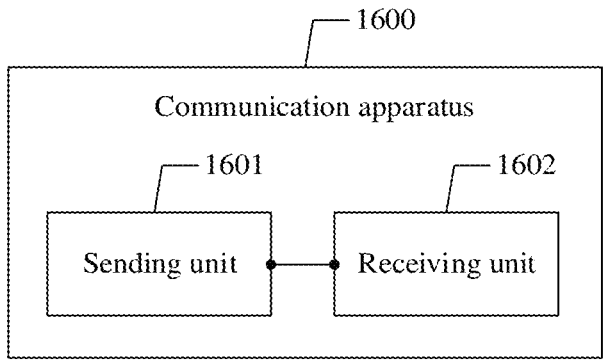
FIG. 16 is a schematic diagram of a communication apparatus according to this application.

FIG. 16 is a schematic diagram of implementation of a communication apparatus according to an embodiment of this application. The communication apparatus may be a terminal or a network device, an apparatus in the terminal device or the network device, or an apparatus that can be used in cooperation with the terminal device and the network device. The communication apparatus may perform the implementation process related to the terminal device or the network device in any one of the foregoing embodiments. In a possible implementation, the communication apparatus 1600 may include modules or units that one-to-one correspond to the methods/operations/steps/actions performed by the first communication apparatus or the second communication apparatus in the foregoing method embodiments. The unit may be implemented by a hardware circuit, software, or a combination of the hardware circuit and the software.

As shown in FIG. 16, the communication apparatus 1600 may include a sending unit 1601 (which is also referred to as a sending module, a transmit module, a transmitter, a signal transmitter, or the like) and a receiving unit 1602 (which is also referred to as a receiving module, a receiver, a signal receiver, or the like). Further optionally, the communication apparatus 1600 may further include a processing unit.

Optionally, the sending unit 1601 and the receiving unit 1602 may be integrated in a same physical/virtual module for implementation, or each may be an independently disposed physical/virtual module for implementation. This is not limited herein.

Optionally, when the communication apparatus 1600 is a chip, the sending unit 1601 and the receiving unit 1602 may alternatively be an input/output interface.

In an implementation, the communication apparatus 1600 is configured to perform the communication method related to the first communication apparatus (which is also referred to as the terminal device).

The sending unit 1601 is configured to send a first message to a second communication apparatus, where the first message is for requesting to set up data consensus protocol DCP initial access, and the first message includes an identifier of the first communication apparatus and a blockchain identifier: the receiving unit 1602 is configured to receive a second message from the second communication apparatus, where the second message indicates a consensus mode set for blockchain communication: the sending unit 1601 is configured to send a third message to the second communication apparatus, where the third message indicates first consensus mode information in the consensus mode set; and the receiving unit 1602 is configured to receive a fourth message from the second communication apparatus, where the fourth message indicates that the DCP initial access succeeds or fails.

Optionally, the third message includes the identifier of the first communication apparatus, the blockchain identifier, and an identifier of the first consensus mode information in the consensus mode set.

In a possible implementation, the fourth message indicates that the DCP initial access succeeds: the sending unit 1601 is configured to send a fifth message to the second communication apparatus, where the fifth message is for requesting to set up a DCP connection, and the fifth message includes the identifier of the first communication apparatus, the blockchain identifier, and an identifier of the first consensus mode information: the receiving unit 1602 is configured to receive a sixth message from the second communication apparatus, where the sixth message indicates a DCP connection setup response; and the sending unit 1601 is configured to send a seventh message to the second communication apparatus, where the seventh message indicates that the setup of the DCP connection is completed.

In a possible implementation, the sending unit 1601 is configured to send an eighth message to the second communication apparatus, where the eighth message is for requesting to release the DCP connection, and the eighth message includes the identifier of the first communication apparatus and the blockchain identifier: the receiving unit 1602 is configured to receive a ninth message from the second communication apparatus, where the ninth message indicates a DCP connection release response; and the sending unit 1601 is configured to send a tenth message to the second communication apparatus, where the tenth message indicates that the release of the DCP connection is completed.

In a possible implementation, the receiving unit 1602 is configured to receive an eleventh message from the second communication apparatus, where the eleventh message is for requesting to release the DCP connection, and the eleventh message includes an identifier of the second communication apparatus and the blockchain identifier; and the sending unit 1601 is configured to send a twelfth message to the second communication apparatus, where the twelfth message indicates that the release of the DCP connection is completed.

In a possible implementation, the fourth message indicates that the DCP initial access succeeds: the sending unit 1601 is configured to send a thirteenth message to the second communication apparatus, where the thirteenth message is for requesting to set up a DCP connection, and the thirteenth message includes the identifier of the first communication apparatus, the blockchain identifier, and an identifier of the first consensus mode information; and the receiving unit 1602 is configured to receive a fourteenth message from the second communication apparatus, where the fourteenth message indicates that the setup of the DCP connection fails.

In a possible implementation, the fourth message indicates that the DCP initial access succeeds: the sending unit 1601 is configured to send a fifteenth message to the second communication apparatus, where the fifteenth message is for requesting consensus data transmission, and the fifteenth message includes the identifier of the first communication apparatus and the blockchain identifier: the receiving unit 1602 is configured to receive a sixteenth message from the second communication apparatus, where the sixteenth message indicates a consensus data transmission response; and the sending unit 1601 is configured to send first consensus data to the second communication apparatus.

In a possible implementation, the fourth message indicates that the DCP initial access succeeds: the receiving unit 1602 is configured to receive a seventeenth message from the second communication apparatus, where the seventeenth message is for requesting consensus data transmission, and the seventeenth message includes the identifier of the second communication apparatus and the blockchain identifier: the sending unit 1601 is configured to send an eighteenth message to the second communication apparatus, where the eighteenth message indicates a consensus data transmission response; and the receiving unit 1602 is configured to receive second consensus data from the second communication apparatus.

In an implementation, the communication apparatus 1600 is configured to perform the communication method related to the second communication apparatus (which is also referred to as the network device).

The receiving unit 1602 is configured to receive a first message from a first communication apparatus, where the first message is for requesting to set up data consensus protocol DCP initial access, and the first message includes an identifier of the first communication apparatus and a blockchain identifier: the sending unit 1601 is configured to send a second message to the first communication apparatus, where the second message indicates a consensus mode set for blockchain communication: the receiving unit 1602 is configured to receive a third message from the first communication apparatus, where the third message indicates first consensus mode information in the consensus mode set; and the sending unit 1601 is configured to send a fourth message to the first communication apparatus, where the fourth message indicates that the DCP initial access succeeds or fails.

Optionally, the third message includes the identifier of the first communication apparatus, the blockchain identifier, and an identifier of the first consensus mode information in the consensus mode set.

In a possible implementation, the fourth message indicates that the DCP initial access succeeds: the receiving unit 1602 is configured to receive a fifth message from the first communication apparatus, where the fifth message is for requesting to set up a DCP connection, and the fifth message includes the identifier of the first communication apparatus, the blockchain identifier, and an identifier of the first consensus mode information: the sending unit 1601 is configured to send a sixth message to the first communication apparatus, where the sixth message indicates a DCP connection setup response; and the receiving unit 1602 is configured to receive a seventh message from the first communication apparatus, where the seventh message indicates that the setup of the DCP connection is completed.

In a possible implementation, the sending unit 1601 is configured to send a nineteenth message to a third communication apparatus, where the nineteenth message indicates that the setup of the DCP connection is completed, and the nineteenth message includes the identifier of the first communication apparatus, the blockchain identifier, and the identifier of the first consensus mode information.

In a possible implementation, the receiving unit 1602 is configured to receive an eighth message from the first communication apparatus, where the eighth message is for requesting to release the DCP connection, and the eighth message includes the identifier of the first communication apparatus and the blockchain identifier: the sending unit 1601 is configured to send a ninth message to the first communication apparatus, where the ninth message indicates a DCP connection release response; and the receiving unit 1602 is configured to receive a tenth message from the first communication apparatus, where the tenth message indicates that the release of the DCP connection is completed.

In a possible implementation, the sending unit 1601 is configured to send a twentieth message to a third communication apparatus, where the twentieth message is for requesting to release the DCP connection, and the twentieth message includes the identifier of the first communication apparatus and the blockchain identifier; and the receiving unit 1602 is configured to receive a twenty-first message from the third communication apparatus, where the twenty-first message indicates that the release of the DCP connection is completed.

In a possible implementation, the sending unit 1601 is configured to send an eleventh message to the first communication apparatus, where the eleventh message is for requesting to release the DCP connection, and the eleventh message includes an identifier of the second communication apparatus and the blockchain identifier; and the receiving unit 1602 is configured to receive a twelfth message from the first communication apparatus, where the twelfth message indicates that the release of the DCP connection is completed.

In a possible implementation, the sending unit 1601 is configured to send a twenty-second message to a third communication apparatus, where the twenty-second message is for requesting to release the DCP connection, and the twenty-second message includes the identifier of the first communication apparatus and the blockchain identifier; and the receiving unit 1602 is configured to receive a twenty-third message from the third communication apparatus, where the twenty-third message indicates that the release of the DCP connection is completed.

In a possible implementation, the fourth message indicates that the DCP initial access succeeds: the receiving unit 1602 is configured to receive a thirteenth message from the first communication apparatus, where the thirteenth message is for requesting to set up a DCP connection, and the thirteenth message includes the identifier of the first communication apparatus, the blockchain identifier, and an identifier of the first consensus mode information; and the sending unit 1601 is configured to send a fourteenth message to the first communication apparatus, where the fourteenth message indicates that the setup of the DCP connection fails.

In a possible implementation, the fourth message indicates that the DCP initial access succeeds: the receiving unit 1602 is configured to receive a fifteenth message from the first communication apparatus, where the fifteenth message is for requesting consensus data transmission, and the fifteenth message includes the identifier of the first communication apparatus and the blockchain identifier: the sending unit 1601 is configured to send a sixteenth message to the first communication apparatus, where the sixteenth message indicates a consensus data transmission response; and the receiving unit 1602 is configured to receive first consensus data from the first communication apparatus.

In a possible implementation, the sending unit 1601 is configured to send a twenty-fourth message to the third communication apparatus, where the twenty-fourth message is for requesting consensus data transmission, and the twenty-fourth message includes the identifier of the first communication apparatus and the blockchain identifier: the receiving unit 1602 is configured to receive a twenty-fifth message from the third communication apparatus, where the twenty-fifth message indicates a consensus data transmission response; and the sending unit 1601 is configured to send the first consensus data to the third communication apparatus.

In a possible implementation, the fourth message indicates that the DCP initial access succeeds: the sending unit

1601 is configured to send a seventeenth message to the first communication apparatus, where the seventeenth message is for requesting consensus data transmission, and the seventeenth message includes the identifier of the second communication apparatus and the blockchain identifier: the receiving unit 1602 is configured to receive an eighteenth message from the first communication apparatus, where the eighteenth message indicates a consensus data transmission response; and the sending unit 1601 is configured to send second consensus data to the first communication apparatus.

In a possible implementation, the sending unit 1601 is configured to send a twenty-sixth message to a third communication apparatus, where the twenty-sixth message is for requesting consensus data transmission, and the twenty-sixth message includes the identifier of the second communication apparatus and the blockchain identifier: the receiving unit 1602 is configured to receive a twenty-seventh message from the third communication apparatus, where the twenty-seventh message indicates a consensus data transmission response; and the sending unit 1601 is configured to send the second consensus data to the third communication apparatus.

In a possible implementation, the sending unit 1601 is configured to send a twenty-eighth message to a fourth communication apparatus, where the twenty-eighth message indicates to request to set up DCP initial access, and the twenty-eighth message includes the identifier of the first communication apparatus and the blockchain identifier: the receiving unit 1602 is configured to receive a twenty-ninth message from the fourth communication apparatus, where the twenty-ninth message is for requesting to set up DCP initial access; and the sending unit 1601 is configured to send a thirtieth message to the fourth communication apparatus, where the thirtieth message indicates a DCP initial access response, and the thirtieth message includes the identifier of the first communication apparatus, the blockchain identifier, and the identifier of the first consensus mode information.

In a possible implementation, the fourth message indicates that the DCP initial access succeeds; and the sending unit 1601 is configured to send a thirty-first message to the third communication apparatus, where the thirty-first message indicates a DCP initial access response, and the thirty-first message includes the identifier of the first communication apparatus, the blockchain identifier, and the identifier of the first consensus mode information.

In a possible implementation, the sending unit 1601 is configured to send a twenty-eighth message to a fourth communication apparatus, where the twenty-eighth message indicates to request to set up DCP initial access, and the twenty-eighth message includes the identifier of the first communication apparatus and the blockchain identifier: the receiving unit 1602 is configured to receive a twenty-ninth message from the fourth communication apparatus, where the twenty-ninth message is for requesting to set up DCP initial access; and the sending unit 1601 is configured to send a thirtieth message to the fourth communication apparatus, where the thirtieth message indicates a DCP initial access response, and the thirtieth message includes the identifier of the first communication apparatus, the blockchain identifier, and the identifier of the first consensus mode information.

In a possible implementation, the fourth message indicates that the DCP initial access succeeds; and the sending unit 1601 is configured to send a thirty-first message to the third communication apparatus, where the thirty-first message indicates a DCP initial access response, and the thirty-first message includes the identifier of the first communication apparatus, the blockchain identifier, and the identifier of the first consensus mode information.

In an implementation, the communication apparatus 1600 is configured to perform the communication method related to the first communication apparatus (which is also referred to as the terminal device).

The sending unit 1601 is configured to send a fifth message to a second communication apparatus, where the fifth message is for requesting to set up a DCP connection, and the fifth message includes an identifier of the first communication apparatus, a blockchain identifier, and an identifier of first consensus mode information: the receiving unit 1602 is configured to receive a sixth message from the second communication apparatus, where the sixth message indicates a DCP connection setup response; and the sending unit 1601 is configured to send a seventh message to the second communication apparatus, where the seventh message indicates that the setup of the DCP connection is completed.

In an implementation, the communication apparatus 1600 is configured to perform the communication method related to the second communication apparatus (which is also referred to as the network device).

The receiving unit 1602 is configured to receive a fifth message from a first communication apparatus, where the fifth message is for requesting to set up a DCP connection, and the fifth message includes an identifier of the first communication apparatus, a blockchain identifier, and an identifier of first consensus mode information: the sending unit 1601 is configured to send a sixth message to the first communication apparatus, where the sixth message indicates a DCP connection setup response; and the receiving unit 1602 is configured to receive a seventh message from the first communication apparatus, where the seventh message indicates that the setup of the DCP connection is completed.

In a possible implementation, the sending unit 1601 is configured to send a nineteenth message to a third communication apparatus, where the nineteenth message indicates that the setup of the DCP connection is completed, and the nineteenth message includes the identifier of the first communication apparatus, the blockchain identifier, and the identifier of the first consensus mode information.

In an implementation, the communication apparatus 1600 is configured to perform the communication method related to the first communication apparatus (which is also referred to as the terminal device).

The sending unit 1601 is configured to send an eighth message to a second communication apparatus, where the eighth message is for requesting to release a DCP connection, and the eighth message includes an identifier of the first communication apparatus and a blockchain identifier: the receiving unit 1602 is configured to receive a ninth message from the second communication apparatus, where the ninth message indicates a DCP connection release response; and the sending unit 1601 is configured to send a tenth message to the second communication apparatus, where the tenth message indicates that the release of the DCP connection is completed.

In an implementation, the communication apparatus 1600 is configured to perform the communication method related to the second communication apparatus (which is also referred to as the network device).

The receiving unit 1602 is configured to receive an eighth message from a first communication apparatus, where the eighth message is for requesting to release a DCP connection, and the eighth message includes an identifier of the first communication apparatus and a blockchain identifier: the sending unit 1601 is configured to send a ninth message to the first communication apparatus, where the ninth message indicates a DCP connection release response; and the receiving unit 1602 is configured to receive a tenth message from the first communication apparatus, where the tenth message indicates that the release of the DCP connection is completed.

In a possible implementation, the sending unit 1601 is configured to send a twentieth message to a third communication apparatus, where the twentieth message is for requesting to release the DCP connection, and the twentieth message includes the identifier of the first communication apparatus and the blockchain identifier; and the receiving unit 1602 is configured to receive a twenty-first message from the third communication apparatus, where the twenty-first message indicates that the release of the DCP connection is completed.

In an implementation, the communication apparatus 1600 is configured to perform the communication method related to the first communication apparatus (which is also referred to as the terminal device).

The receiving unit 1602 is configured to receive an eleventh message from a second communication apparatus, where the eleventh message is for requesting to release a DCP connection, and the eleventh message includes an identifier of the second communication apparatus and a blockchain identifier; and the sending unit 1601 is configured to send a twelfth message to the second communication apparatus, where the twelfth message indicates that the release of the DCP connection is completed.

In an implementation, the communication apparatus 1600 is configured to perform the communication method related to the second communication apparatus (which is also referred to as the network device).

The apparatus includes the sending unit 1601 and the receiving unit 1602, where the sending unit 1601 is configured to send an eleventh message to a first communication apparatus, where the eleventh message is for requesting to release a DCP connection, and the eleventh message includes an identifier of the second communication apparatus and a blockchain identifier; and the receiving unit 1602 is configured to receive a twelfth message from the first communication apparatus, where the twelfth message indicates that the release of the DCP connection is completed.

In a possible implementation, the sending unit 1601 is configured to send a twenty-second message to a third communication apparatus, where the twenty-second message is for requesting to release the DCP connection, and the twenty-second message includes an identifier of the first communication apparatus and the blockchain identifier; and the receiving unit 1602 is configured to receive a twenty-third message from the third communication apparatus, where the twenty-third message indicates that the release of the DCP connection is completed.

In an implementation, the communication apparatus 1600 is configured to perform the communication method related to the first communication apparatus (which is also referred to as the terminal device).

The sending unit 1601 is configured to send a thirteenth message to a second communication apparatus, where the thirteenth message is for requesting to set up a DCP connection, and the thirteenth message includes an identifier of the first communication apparatus, a blockchain identifier, and an identifier of first consensus mode information; and the receiving unit 1602 is configured to receive a fourteenth message from the second communication apparatus, where the fourteenth message indicates that the setup of the DCP connection fails.

In an implementation, the communication apparatus 1600 is configured to perform the communication method related to the second communication apparatus (which is also referred to as the network device).

The receiving unit 1602 is configured to receive a thirteenth message from a first communication apparatus, where the thirteenth message is for requesting to set up a DCP connection, and the thirteenth message includes an identifier of the first communication apparatus, a blockchain identifier, and an identifier of the first consensus mode information; and the sending unit 1601 is configured to send a fourteenth message to the first communication apparatus, where the fourteenth message indicates that the setup of the DCP connection fails.

In an implementation, the communication apparatus 1600 is configured to perform the communication method related to the first communication apparatus (which is also referred to as the terminal device).

The sending unit 1601 is configured to send a fifteenth message to a second communication apparatus, where the fifteenth message is for requesting consensus data transmission, and the fifteenth message includes an identifier of the first communication apparatus and a blockchain identifier: the receiving unit 1602 is configured to receive a sixteenth message from the second communication apparatus, where the sixteenth message indicates a consensus data transmission response; and the sending unit 1601 is configured to send first consensus data to the second communication apparatus.

In an implementation, the communication apparatus 1600 is configured to perform the communication method related to the second communication apparatus (which is also referred to as the network device).

The receiving unit 1602 is configured to receive a fifteenth message from a first communication apparatus, where the fifteenth message is for requesting consensus data transmission, and the fifteenth message includes an identifier of the first communication apparatus and a blockchain identifier: the sending unit 1601 is configured to send a sixteenth message to the first communication apparatus, where the sixteenth message indicates a consensus data transmission response; and the receiving unit 1602 is configured to receive first consensus data from the first communication apparatus.

In a possible implementation, the sending unit 1601 is configured to send a twenty-fourth message to a third communication apparatus, where the twenty-fourth message is for requesting consensus data transmission, and the twenty-fourth message includes the identifier of the first communication apparatus and the blockchain identifier: the receiving unit 1602 is configured to receive a twenty-fifth message from the third communication apparatus, where the twenty-fifth message indicates a consensus data transmission response; and the sending unit 1601 is configured to send the first consensus data to the third communication apparatus.

In an implementation, the communication apparatus 1600 is configured to perform the communication method related to the first communication apparatus (which is also referred to as the terminal device).

The receiving unit 1602 is configured to receive a seventeenth message from a second communication apparatus, where the seventeenth message is for requesting consensus data transmission, and the seventeenth message includes an identifier of the second communication apparatus and a blockchain identifier: the sending unit 1601 is configured to send an eighteenth message to the second communication apparatus, where the eighteenth message indicates a consensus data transmission response; and the receiving unit 1602 is configured to receive second consensus data from the second communication apparatus.

In an implementation, the communication apparatus 1600 is configured to perform the communication method related to the second communication apparatus (which is also referred to as the network device).

The sending unit 1601 is configured to send a seventeenth message to a first communication apparatus, where the seventeenth message is for requesting consensus data transmission, and the seventeenth message includes an identifier of the second communication apparatus and a blockchain identifier: the receiving unit 1602 is configured to receive an eighteenth message from the first communication apparatus, where the eighteenth message indicates a consensus data transmission response; and the sending unit 1601 is configured to send second consensus data to the first communication apparatus.

In a possible implementation, the sending unit 1601 is configured to send a twenty-sixth message to a third communication apparatus, where the twenty-sixth message is for requesting consensus data transmission, and the twenty-sixth message includes the identifier of the second communication apparatus and the blockchain identifier; and the second communication apparatus receives a twenty-seventh message from the third communication apparatus, where the twenty-seventh message indicates a consensus data transmission response; and the sending unit 1601 is configured to send the second consensus data to the third communication apparatus.

It should be noted that, for details of content such as an information execution process of the units in the communication apparatus 1600, refer to the descriptions in the foregoing method embodiments of this application. Details are not described herein again.

Figure 17:
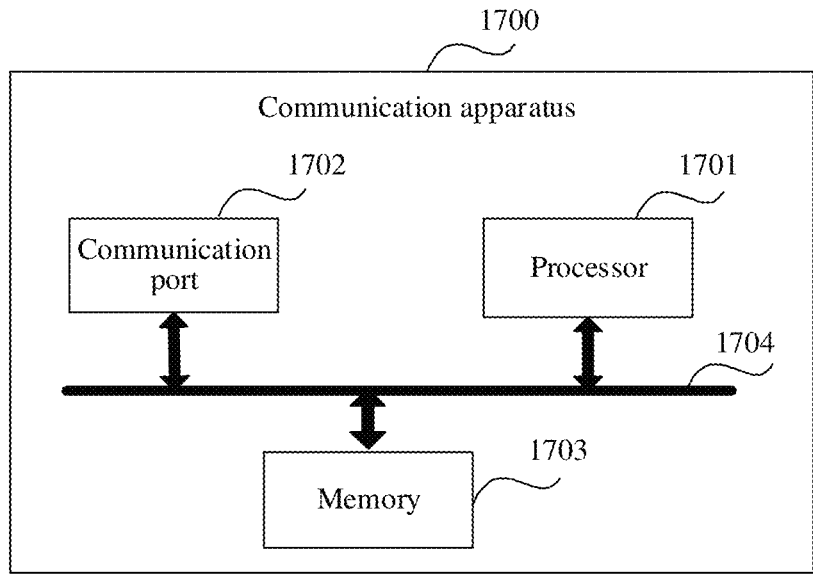
FIG. 17 is another schematic diagram of a communication apparatus according to this application.

FIG. 17 shows a communication apparatus in the foregoing embodiments according to an embodiment of this application. The communication apparatus 1700 may be the first communication apparatus (which is also referred to as the terminal device) shown in any one of the foregoing embodiments, or the communication apparatus 1700 may be some components (for example, a processor, a chip, or a chip system) in the first communication apparatus (which is also referred to as the terminal device) shown in any one of the foregoing embodiments.

FIG. 17 is a schematic diagram of a possible logical structure of the communication apparatus 1700. The communication apparatus 1700 may include but is not limited to at least one processor 1701. Optionally, the apparatus further includes a communication port 1702. Further optionally, the apparatus may further include a memory 1703 and a bus 1704. In this embodiment of this application, the at least one processor 1701 is configured to perform control processing on an action of the communication apparatus 1700.

For example, the communication apparatus 1700 may be configured to perform the method described in any one of the embodiments shown in FIG. 2 to FIG. 15. FIG. 2 is used as an example. The communication apparatus 1700 may send the first message in step S501, the communication apparatus 1700 may further receive the second message in step S502, the communication apparatus 1700 may further send the third message in step S503, and the communication apparatus 1700 may further receive the fourth message in step S504.

In addition, the processor 1701 may be a central processing unit, a general purpose processor, a digital signal processor, an application-specific integrated circuit, a field programmable gate array or another programmable logic device, a transistor logic device, a hardware component, or any combination thereof. The processor 1701 may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. It may be clearly understood by a person skilled in the art that, for the purpose of convenient and brief description, for a detailed working process of the foregoing system, apparatus, and unit, refer to a corresponding process in the foregoing method embodiments. Details are not described herein again.

It should be noted that the communication apparatus 1700 shown in FIG. 17 may be configured to implement other steps implemented by the terminal device in the foregoing corresponding method embodiments, and implement the technical effects corresponding to the terminal device. For all specific implementations of the communication apparatus 1700 shown in FIG. 17, refer to the descriptions in the foregoing method embodiments. Details are not described one by one herein again.

Figure 18:
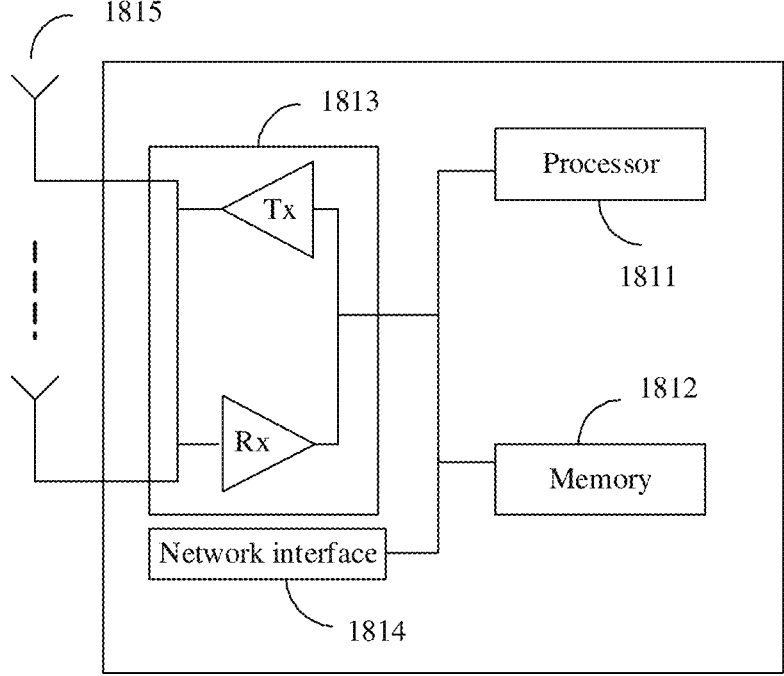
FIG. 18 is another schematic diagram of a communication apparatus according to this application.

FIG. 18 is a schematic diagram of a structure of the second communication apparatus (which is also referred to as the network device) in the foregoing embodiments or a part of components (for example, a processor, a chip, or a chip system) in the second communication apparatus (which is also referred to as the network device) according to an embodiment of this application. In the following, an example in which the example diagram of the structure shown in FIG. 18 is the schematic diagram of the structure of the network device is used for description.

For example, the network device may include an access network device or a core network device.

For example, the schematic diagram of the structure of the network device shown in FIG. 18 may be for performing the method in any one of the embodiments shown in FIG. 2 to FIG. 15. FIG. 2 is used as an example. The network device may receive the first message in step S501, the network device may further send the second message in step S502, the network device may further receive the third message in step S503, and the network device may further send the fourth message in step S504.

As shown in FIG. 18, the network device includes at least one processor 1811. Optionally, the network device may further include a network interface 1814.

Further optionally, the network device further includes a memory 1812, a transceiver 1813, and one or more antennas 1815. The processor 1811, the memory 1812, the transceiver 1813, and the network interface 1814 are connected to each other, for example, through a bus. In this embodiment of this application, the connection may include various types of interfaces, transmission lines, buses, or the like. This is not limited in this embodiment. The antenna 1815 is connected to the transceiver 1813. The network interface 1814 is configured to enable the network device to communicate with another communication device through a communication link. For example, the network interface 1814 may include a network interface between the network device and a core network device, for example, an S1 interface. The network interface may include a network interface between the network device and another network device (for example, another network device or core network device), for example, an X2 or Xn interface.

The processor 1811 is mainly configured to: process a communication protocol and communication data, control the entire network device, execute a software program, and process data of the software program, for example, is configured to support the network device in performing actions described in embodiments. The network device may include a baseband processor and a central processing unit. The baseband processor is mainly configured to process the communication protocol and the communication data. The central processing unit is mainly configured to: control the entire terminal device, execute the software program, and process the data of the software program. Functions of the baseband processor and the central processing unit may be integrated into the processor 1811 in FIG. 18. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to enhance processing capabilities of the terminal device, and components of the terminal device may be connected through various buses. The baseband processor may alternatively be expressed as a baseband processing circuit or a baseband processing chip. The central processing unit may alternatively be expressed as a central processing circuit or a central processing chip. A function of processing the communication protocol and the communication data may be embedded in the processor, or may be stored in the memory in a form of the software program. The processor executes the software program to implement a baseband processing function.

The memory is mainly configured to store the software program and the data. The memory 1812 may exist independently, and is connected to the processor 1811. Optionally, the memory 1812 and the processor 1811 may be integrated together, for example, integrated into one chip. The memory 1812 can store program code for executing the technical solutions in embodiments of this application, and the processor 1811 controls the execution. Various types of executed computer program code may also be considered as driver programs of the processor 1811.

FIG. 18 shows only one memory and one processor. In an actual terminal device, there may be a plurality of processors and a plurality of memories. The memory may also be referred to as a storage medium, a storage device, or the like. The memory may be a storage element on a same chip as the processor, that is, an on-chip storage element, or may be an independent storage element. This is not limited in this embodiment of this application.

The transceiver 1813 may be configured to support receiving or sending of a radio frequency signal between the network device and a terminal, and the transceiver 1813 may be connected to the antenna 1815. The transceiver 1813 includes a transmitter Tx and a receiver Rx. The one or more antennas 1815 may receive a radio frequency signal. The receiver Rx in the transceiver 1813 is configured to: receive the radio frequency signal from the antenna, convert the radio frequency signal into a digital baseband signal or a digital intermediate frequency signal, and provide the digital baseband signal or the digital intermediate frequency signal for the processor 1811, so that the processor 1811 further processes the digital baseband signal or the digital intermediate frequency signal, for example, performs demodulation processing and decoding processing. In addition, the transmitter Tx in the transceiver 1813 is further configured to: receive a modulated digital baseband signal or digital intermediate frequency signal from the processor 1811, convert the modulated digital baseband signal or digital intermediate frequency signal into a radio frequency signal, and send the radio frequency signal through the one or more antennas 1815. The receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal, to obtain the radio frequency signal. A sequence of the frequency up-mixing processing and the digital-to-analog conversion processing is adjustable. The digital baseband signal and the digital intermediate frequency signal may be collectively referred to as a digital signal.

The transceiver may also be referred to as a transceiver unit, a transceiver apparatus, or the like. Optionally, a component that is configured to implement a receiving function and that is in the transceiver unit may be considered as a receiving unit, and a component that is configured to implement a sending function and that is in the transceiver unit may be considered as a sending unit. That is, the transceiver unit includes the receiving unit and the sending unit. The receiving unit may also be referred to as a receiver, an input port, a receiving circuit, or the like. The sending unit may be referred to as a transmitter, an output port, a transmitting circuit, or the like.

It should be noted that the network device shown in FIG. 18 may be configured to implement the steps implemented by the network device in the foregoing method embodiments, and implement the technical effects corresponding to the network device. For all specific implementations of the network device shown in FIG. 18, refer to the descriptions in the foregoing method embodiments. Details are not described one by one herein again.

An embodiment of this application further provides a computer-readable storage medium that stores one or more computer-executable instructions. When the computer-executable instructions are executed by a processor, the processor performs the method in the possible implementations of the terminal device in the foregoing embodiments.

An embodiment of this application further provides a computer-readable storage medium that stores one or more computer-executable instructions. When the computer-executable instructions are executed by a processor, the processor performs the method in the possible implementations of the network device in the foregoing embodiments.

An embodiment of this application further provides a computer program product (which is also referred to as a computer program) that stores computer instructions. When the computer program product is executed by a processor, the processor performs the method in the possible implementations of the foregoing terminal device.

An embodiment of this application further provides a computer program product that stores computer instructions. When the computer program product is executed by a processor, the processor performs the method in the possible implementations of the foregoing network device.

An embodiment of this application further provides a chip system. The chip system includes at least one processor, configured to support a terminal device in implementing the function in the possible implementations of the foregoing terminal device. Optionally, the chip system further includes an interface circuit. The interface circuit provides program instructions and/or data for the at least one processor. In a possible design, the chip system may further include a memory. The memory is configured to store program instructions and data that are necessary for the terminal device. The chip system may consist of a chip, or may include the chip and another discrete device.

An embodiment of this application further provides a chip system. The chip system includes at least one processor, configured to support a network device in implementing the function in the possible implementations of the foregoing network device. Optionally, the chip system further includes an interface circuit. The interface circuit provides program instructions and/or data for the at least one processor. In a possible design, the chip system may further include a memory. The memory is configured to store program instructions and data that are necessary for the network device. The chip system may consist of a chip, or may include the chip and another discrete device. The network device may be the network device in the foregoing method embodiments.

An embodiment of this application further provides a communication system. A network system architecture includes the terminal device and the network device in any one of the foregoing embodiments.

In the several embodiments provided in this application, it should be understood that the disclosed system, apparatus, and method may be implemented in other manners. For example, the foregoing apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit. When the integrated unit is implemented in the form of the software functional unit and sold or used as an independent product, the integrated unit may be stored in a computer-readable storage medium. Based on such an understanding, the technical solutions in this application essentially, the part contributing, or all or some of the technical solutions may be implemented in the form of a software product. The computer software product is stored in a storage medium and includes several instructions for instructing a computer device (which may be a personal computer, a server, a network device, or the like) to perform all or some of the steps of the methods in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of embodiments of this application, but the protection scope of embodiments of this application is not limited thereto. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A communication method applied to a first communication apparatus, the method comprising:

sending a first message to a second communication apparatus, wherein the first message is for requesting to set up data consensus protocol (DCP) initial access, and the first message comprises an identifier of the first communication apparatus and a blockchain identifier;

receiving a second message from the second communication apparatus, wherein the second message indicates a consensus mode set for blockchain communication;

sending a third message to the second communication apparatus, wherein the third message indicates first consensus mode information selected by the first communication apparatus from the consensus mode set, wherein the consensus mode set comprises a plurality of different consensus modes each comprising at least a blockchain type and a consensus algorithm; and receiving a fourth message from the second communication apparatus, wherein the fourth message indicates that the DCP initial access succeeds or fails.

2. The communication method according to claim 1, wherein the fourth message indicates that the DCP initial access succeeds; and after receiving the fourth message from the second communication apparatus, the method further comprises:

sending a fifth message to the second communication apparatus, wherein the fifth message is for requesting to set up a DCP connection, and the fifth message comprises the identifier of the first communication apparatus, the blockchain identifier, and an identifier of the first consensus mode information;

receiving a sixth message from the second communication apparatus, wherein the sixth message indicates a DCP connection setup response; and sending a seventh message to the second communication apparatus, wherein the seventh message indicates that setting up of the DCP connection is completed.

3. The communication method according to claim 1, wherein the fourth message indicates that the DCP initial access succeeds; and after receiving the fourth message from the second communication apparatus, the method further comprises:

sending a thirteenth message to the second communication apparatus, wherein the thirteenth message is for requesting to set up a DCP connection, and the thirteenth message comprises the identifier of the first communication apparatus, the blockchain identifier, and an identifier of the first consensus mode information; and receiving a fourteenth message from the second communication apparatus, wherein the fourteenth message indicates that setting up of the DCP connection fails.

4. The communication method according to claim 1, wherein the fourth message indicates that the DCP initial access succeeds; and after receiving the fourth message from the second communication apparatus, the method further comprises:

sending a fifteenth message to the second communication apparatus, wherein the fifteenth message is for requesting consensus data transmission, and the fifteenth message comprises the identifier of the first communication apparatus and the blockchain identifier;

receiving a sixteenth message from the second communication apparatus, wherein the sixteenth message indicates a consensus data transmission response; and sending first consensus data to the second communication apparatus.

5. The communication method according to claim 1, wherein the fourth message indicates that the DCP initial access succeeds; and after receiving the fourth message from the second communication apparatus, the method further comprises:

receiving a seventeenth message from the second communication apparatus, wherein the seventeenth message is for requesting consensus data transmission, and the seventeenth message comprises the identifier of the second communication apparatus and the blockchain identifier;

sending an eighteenth message to the second communication apparatus, wherein the eighteenth message indicates a consensus data transmission response; and receiving second consensus data from the second communication apparatus.

6. The communication method according to claim 1, wherein the first message further comprises permission information and contract information.

7. The communication method according to claim 1, wherein the DCP is for completing at least one of blockchain configuration information broadcasting, node access chain confirmation, data consensus connection management, consensus algorithm selection, or consensus data transmission.

8. The communication method according to claim 1, wherein each consensus mode further comprises information indicating at least one of a chain structure, an incentive mechanism, a contract template, a resource type, a packet delay budget, a packet error rate, energy consumption, or a computation amount.

9. A communication method applied to a second communication apparatus, the method comprising:

receiving a first message from a first communication apparatus, wherein the first message is for requesting to set up data consensus protocol (DCP) initial access, and the first message comprises an identifier of the first communication apparatus and a blockchain identifier;

sending a second message to the first communication apparatus, wherein the second message indicates a consensus mode set for blockchain communication;

receiving a third message from the first communication apparatus, wherein the third message indicates first consensus mode information selected by the first communication apparatus from the consensus mode set, wherein the consensus mode set comprises a plurality of different consensus modes each comprising at least a blockchain type and a consensus algorithm; and sending a fourth message to the first communication apparatus, wherein the fourth message indicates that the DCP initial access succeeds or fails.

10. The communication method according to claim 9, wherein the fourth message indicates that the DCP initial access succeeds; and after sending the fourth message to the first communication apparatus, the method further comprises:

receiving a fifth message from the first communication apparatus, wherein the fifth message is for requesting to set up a DCP connection, and the fifth message comprises the identifier of the first communication apparatus, the blockchain identifier, and an identifier of the first consensus mode information;

sending a sixth message to the first communication apparatus, wherein the sixth message indicates a DCP connection setup response; and receiving a seventh message from the first communication apparatus, wherein the seventh message indicates that setting up of the DCP connection is completed.

11. The communication method according to claim 9, wherein the fourth message indicates that the DCP initial access succeeds; and after sending the fourth message to the first communication apparatus, the method further comprises:

receiving a thirteenth message from the first communication apparatus, wherein the thirteenth message is for requesting to set up a DCP connection, and the thirteenth message comprises the identifier of the first communication apparatus, the blockchain identifier, and an identifier of the first consensus mode information; and sending a fourteenth message to the first communication apparatus, wherein the fourteenth message indicates that setting up of the DCP connection fails.

12. The communication method according to claim 9, wherein the fourth message indicates that the DCP initial access succeeds; and after sending the fourth message to the first communication apparatus, the method further comprises:

receiving a fifteenth message from the first communication apparatus, wherein the fifteenth message is for requesting consensus data transmission, and the fifteenth message comprises the identifier of the first communication apparatus and the blockchain identifier;

sending a sixteenth message to the first communication apparatus, wherein the sixteenth message indicates a consensus data transmission response; and receiving consensus data from the first communication apparatus.

13. The communication method according to claim 9, wherein the fourth message indicates that the DCP initial access succeeds; and after sending the fourth message to the first communication apparatus, the method further comprises:

sending a seventeenth message to the first communication apparatus, wherein the seventeenth message is for requesting consensus data transmission, and the seventeenth message comprises the identifier of the second communication apparatus and the blockchain identifier;

receiving an eighteenth message from the first communication apparatus, wherein the eighteenth message indicates a consensus data transmission response; and sending consensus data to the first communication apparatus.

14. The communication method according to claim 9, wherein the DCP is for completing at least one of blockchain configuration information broadcasting, node access chain confirmation, data consensus connection management, consensus algorithm selection, or consensus data transmission.

15. The communication method according to claim 9, wherein each consensus mode further comprises information indicating at least one of a chain structure, an incentive mechanism, a contract template, a resource type, a packet delay budget, a packet error rate, energy consumption, or a computation amount.

16. A communication apparatus, comprising:

at least one processor; and a memory storing a program or instructions that, when executed by the at least one processor, cause the communication apparatus to:

send a first message to a second communication apparatus, wherein the first message is for requesting to set up data consensus protocol (DCP) initial access, and the first message comprises an identifier of the communication apparatus and a blockchain identifier;

receive a second message from the second communication apparatus, wherein the second message indicates a consensus mode set for blockchain communication;

send a third message to the second communication apparatus, wherein the third message indicates first consensus mode information selected by the communication apparatus from the consensus mode set, wherein the consensus mode set comprises a plurality of different consensus modes each comprising at least a blockchain type and a consensus algorithm; and receive a fourth message from the second communication apparatus, wherein the fourth message indicates that the DCP initial access succeeds or fails.

17. The communication apparatus according to claim 16, wherein the fourth message indicates that the DCP initial access succeeds; and after receiving the fourth message from the second communication apparatus, the communication apparatus is further caused to:

send a fifth message to the second communication apparatus, wherein the fifth message is for requesting to set up a DCP connection, and the fifth message comprises the identifier of the communication apparatus, the blockchain identifier, and an identifier of the first consensus mode information;

receive a sixth message from the second communication apparatus, wherein the sixth message indicates a DCP connection setup response; and send a seventh message to the second communication apparatus, wherein the seventh message indicates that setting up of the DCP connection is completed.

18. The communication apparatus according to claim 16, wherein the fourth message indicates that the DCP initial access succeeds; and after receiving the fourth message from the second communication apparatus, the communication apparatus is further caused to:

send a thirteenth message to the second communication apparatus, wherein the thirteenth message is for requesting to set up a DCP connection, and the thirteenth message comprises the identifier of the communication apparatus, the blockchain identifier, and an identifier of the first consensus mode information; and receive a fourteenth message from the second communication apparatus, wherein the fourteenth message indicates that setting up of the DCP connection fails.

19. The communication apparatus according to claim 16, wherein the fourth message indicates that the DCP initial access succeeds; and after receiving the fourth message from the second communication apparatus, the communication apparatus is further caused to:

send a fifteenth message to the second communication apparatus, wherein the fifteenth message is for requesting consensus data transmission, and the fifteenth message comprises the identifier of the communication apparatus and the blockchain identifier;

receive a sixteenth message from the second communication apparatus, wherein the sixteenth message indicates a consensus data transmission response; and send first consensus data to the second communication apparatus.

20. The communication apparatus according to claim 16, wherein the fourth message indicates that the DCP initial access succeeds; and after receiving the fourth message from the second communication apparatus, the communication apparatus is further caused to:

receive a seventeenth message from the second communication apparatus, wherein the seventeenth message is for requesting consensus data transmission, and the seventeenth message comprises the identifier of the second communication apparatus and the blockchain identifier;

send an eighteenth message to the second communication apparatus, wherein the eighteenth message indicates a consensus data transmission response; and receive second consensus data from the second communication apparatus.

* * * * *